US012660934B2

(12) United States Patent
Saycocie et al.

(10) Patent No.: US 12,660,934 B2
(45) Date of Patent: Jun. 23, 2026

(54) CONTROLLING A MATTRESS CLIMATE-CONTROL SYSTEM BASED ON THERMAL EVENT

(71) Applicant: Sleep Number Corporation, Minneapolis, MN (US)

(72) Inventors: John Saycocie, Champlin, MN (US); Reuben Wesley Meline, Maple Grove, MN (US); Bruce William Gaunt, Minneapolis, MN (US); Cory Lee Grabinger, Maple Grove, MN (US); Wade Daniel Palashewski, Andover, MN (US); Nick Reynolds, Farmington, MN (US)

(73) Assignee: Sleep Number Corporation

( * ) Notice: Subject to any disclaimer, the term of this patent is extended or adjusted under 35 U.S.C. 154(b) by 179 days.

(21) Appl. No.: 18/368,677

(22) Filed: Sep. 15, 2023

(65) Prior Publication Data

US 2024/0090678 A1 Mar. 21, 2024

Related U.S. Application Data

(60) Provisional application No. 63/407,416, filed on Sep. 16, 2022.

(51) Int. Cl.
*A47C 21/04* (2006.01)
*A47C 21/00* (2006.01)
(Continued)

(52) U.S. Cl.
CPC .......... *A47C 21/048* (2013.01); *A47C 21/044* (2013.01); *A47C 21/003* (2013.01); *A47C 31/008* (2013.01); *G08B 17/10* (2013.01)

(58) Field of Classification Search
CPC ..... A47C 21/003; A47C 21/04; A47C 21/044; A47C 21/048; A47C 31/001; A47C 31/008; A61G 2203/46
See application file for complete search history.

(56) References Cited

U.S. PATENT DOCUMENTS 7,484,256 B2 2/2009 Murphy et al.
7,832,038 B2 11/2010 Murphy et al.
(Continued)

FOREIGN PATENT DOCUMENTS

CN 2131381 5/1993
CN 1842228 B * 8/2010 ............ A47J 47/005
(Continued)

OTHER PUBLICATIONS

International Preliminary Report on Patentability in International Appln. No. PCT/US2023/032845, mailed on Mar. 27, 2025, 9 pages.

(Continued)

*Primary Examiner* — David E Sosnowski
(74) *Attorney, Agent, or Firm* — Norton Rose Fulbright US LLP

(57) ABSTRACT

A method and bed system for controlling a mattress climate-control system based on a thermal event. The bed system includes a mattress, a mattress climate-control system, a mechanical thermal detector, and a controller. The mattress climate-control system controls a climate at the mattress. The mechanical thermal detector is positioned at the mattress. A condition of the mechanical thermal detector changes in response to a thermal event at the mattress. The controller is connected to the mattress climate-control system. The controller perform operations including detecting the condition of the mechanical thermal detector and oper-
(Continued)

ating the mattress climate-control system based on the condition of the mechanical thermal detector.

9 Claims, 28 Drawing Sheets

(51) Int. Cl.
*A47C 31/00* (2006.01)
*G08B 17/10* (2006.01)

(56) References Cited

U.S. PATENT DOCUMENTS

| | | | |
|---|---|---|---|
| 7,877,827 | B2 | 2/2011 | Comiskey et al. |
| 7,996,936 | B2 | 8/2011 | Comiskey et al. |
| 8,065,763 | B2 | 11/2011 | Brykalski et al. |
| 8,181,290 | B2 | 5/2012 | Brykalski et al. |
| 8,191,187 | B2 | 6/2012 | Brykalski et al. |
| 8,332,975 | B2 | 12/2012 | Brykalski et al. |
| 8,402,579 | B2 | 3/2013 | Comiskey et al. |
| 8,418,286 | B2 | 4/2013 | Brykalski et al. |
| 8,621,687 | B2 | 1/2014 | Brykalski et al. |
| 8,732,874 | B2 | 5/2014 | Brykalski et al. |
| 8,782,830 | B2 | 7/2014 | Brykalski et al. |
| 8,893,329 | B2 | 11/2014 | Petrovski et al. |
| 9,125,497 | B2 | 9/2015 | Brykalski et al. |
| 9,131,781 | B2 | 9/2015 | Zaiss et al. |
| 9,603,459 | B2 | 3/2017 | Brykalski et al. |
| 9,622,588 | B2 | 4/2017 | Brykalski et al. |
| 9,814,641 | B2 | 11/2017 | Brykalski et al. |
| 9,974,394 | B2 | 5/2018 | Brykalski et al. |
| 10,194,752 | B2 | 2/2019 | Zaiss et al. |
| 10,226,134 | B2 | 3/2019 | Brykalski et al. |
| 10,405,667 | B2 | 9/2019 | Comiskey et al. |
| 10,675,198 | B2 | 6/2020 | Brykalski et al. |
| 10,772,438 | B2 | 9/2020 | Griffith et al. |
| 11,020,298 | B2 | 6/2021 | Brykalski et al. |
| 11,045,371 | B2 | 6/2021 | Brykalski et al. |
| 11,083,308 | B2 | 8/2021 | Zaiss et al. |
| 11,103,081 | B2 | 8/2021 | Sherman et al. |
| 11,297,953 | B2 | 4/2022 | Brykalski et al. |
| 2008/0263774 | A1 | 10/2008 | Lee |
| 2011/0115635 | A1* | 5/2011 | Petrovski ............. A47C 31/008 340/584 |
| 2014/0026320 | A1 | 1/2014 | Comiskey et al. |
| 2015/0238020 | A1 | 8/2015 | Petrovski et al. |
| 2016/0066701 | A1 | 3/2016 | Diller et al. |
| 2017/0071359 | A1 | 3/2017 | Steele et al. |
| 2017/0273470 | A1 | 9/2017 | Brykalski et al. |
| 2017/0280883 | A1 | 10/2017 | Diller |
| 2020/0337470 | A1 | 10/2020 | Sayadi et al. |
| 2021/0037987 | A1 | 2/2021 | Griffith et al. |
| 2021/0038453 | A1 | 2/2021 | Brykalski et al. |
| 2021/0204706 | A1 | 7/2021 | Karschnik et al. |
| 2021/0204709 | A1 | 7/2021 | Grabinger et al. |
| 2021/0204710 | A1 | 7/2021 | Grabinger et al. |
| 2021/0204711 | A1 | 7/2021 | Karschnik et al. |
| 2021/0204712 | A1 | 7/2021 | Karschnik et al. |
| 2021/0204713 | A1 | 7/2021 | Karschnik et al. |
| 2021/0204714 | A1 | 7/2021 | Karschnik et al. |
| 2021/0204715 | A1 | 7/2021 | Karschnik et al. |
| 2021/0204716 | A1 | 7/2021 | Karschnik et al. |
| 2021/0204719 | A1 | 7/2021 | Grabinger et al. |
| 2021/0204720 | A1 | 7/2021 | Karschnik et al. |
| 2021/0322237 | A1 | 10/2021 | Brykalski et al. |
| 2021/0322238 | A1 | 10/2021 | Brykalski et al. |
| 2021/0401185 | A1 | 12/2021 | Zaiss et al. |
| 2022/0232990 | A1 | 7/2022 | Brykalski et al. |
| 2022/0261020 | A1 | 8/2022 | Molina et al. |
| 2022/0273115 | A1 | 9/2022 | Pedersen et al. |
| 2022/0287473 | A1 | 9/2022 | Karschnik et al. |
| 2023/0063576 | A1 | 3/2023 | Grabinger et al. |
| 2023/0066140 | A1 | 3/2023 | Karschnik et al. |
| 2023/0111398 | A1 | 4/2023 | Grabinger et al. |
| 2023/0142653 | A1 | 5/2023 | Brykalski et al. |
| 2023/0240450 | A1 | 8/2023 | Griffith et al. |
| 2023/0276948 | A1 | 9/2023 | Karschnik et al. |
| 2023/0372169 | A1 | 11/2023 | Molina et al. |
| 2023/0404278 | A1 | 12/2023 | Karschnik et al. |
| 2023/0404279 | A1 | 12/2023 | Karschnik et al. |
| 2024/0009049 | A1 | 1/2024 | Brykalski et al. |
| 2025/0311860 | A1* | 10/2025 | Carlson-Sanchez .......................... A47C 21/044 |

FOREIGN PATENT DOCUMENTS

| | | | | | |
|---|---|---|---|---|---|
| EP | 0469312 | A2 * | 2/1992 | ............... G01K 7/04 |
| KR | 20070015487 | A * | 2/2007 | ............... H05B 3/56 |
| KR | 20100004209 | | 1/2010 | |
| KR | 101567526 | | 11/2015 | |
| KR | 101567526 | B1 * | 11/2015 | ............... D04H 1/00 |
| KR | 20190056617 | A * | 5/2019 | ............... H05B 3/54 |
| WO | WO-2024059250 | A1 * | 3/2024 | ........... A47C 31/001 |

OTHER PUBLICATIONS

U.S. Appl. No. 15/685,912, Petrovski et al., filed Aug. 24, 2017.
U.S. Appl. No. 15/973,279, Brykalski et al., filed May 7, 2018.
U.S. Appl. No. 18/369,396, VerBockel et al., filed Sep. 18, 2023.
International Search Report and Written Opinion in International Appln. No. PCT/US2023/032845, mailed on Jan. 24, 2024, 18 pages.

* cited by examiner

CONTROLLING A MATTRESS CLIMATE-CONTROL SYSTEM BASED ON THERMAL EVENT

CROSS-REFERENCE TO RELATED APPLICATIONS

This application claims the benefit of U.S. Provisional Application Ser. No. 63/407,416, filed Sep. 16, 2022. The disclosure of the prior application is considered part of (and is incorporated by reference in) the disclosure of this application.

TECHNICAL FIELD

The present document relates to bed systems, and more particularly to techniques and components for controlling bed systems.

BACKGROUND

In general, a bed is a piece of furniture used as a location to sleep or relax. Many modern beds include a soft mattress on a bed frame. The mattress may include springs, foam material, and/or an air chamber to support the weight of one or more occupants. Various features and systems have been used in conjunction with beds, including heating and cooling systems for heating and cooling a user of a bed. A thermal event such as a fire in the mattress may warrant a mechanism for controlling various mattress components such climate-control systems for heating and cooling the mattress in reliable, secured, and efficient ways in response to the thermal event occurring at the mattress.

SUMMARY

Some embodiments described herein include a bed system with fire protection capabilities. The bed system can include a mattress climate-control system configured to supply conditioned air (e.g., heated or cooled air) to a mattress to achieve a desired temperature of the mattress. A mechanical thermal detector and a controller can be used to detect a thermal event (such as a fire, including an incipient fire, a free burning fire, a smoldering fire, or other potentially dangerous thermal event) at the mattress and operate the mattress climate-control system based on the thermal event. Any thermal event that has a temperature greater than or equal to a threshold temperature will be detected by the mechanical thermal detector. For example, the mechanical thermal detector can be positioned at the mattress. A condition of the mechanical thermal detector can change in response to the thermal event. The controller detects the condition of the mechanical thermal detector and based on the condition of the mechanical thermal detector, operates the mattress climate-control system to disable one or more functions or components of the mattress climate-control system.

Some embodiments described herein include a bed system including a mattress, a mattress climate-control system, a mechanical thermal detector, and a controller. The mattress climate-control system controls a climate at the mattress. The mechanical thermal detector is positioned at the mattress. A condition of the mechanical thermal detector changes in response to a thermal event. The controller is connected to the mattress climate-control system. The controller perform operations including detecting the condition of the mechanical thermal detector and operating the mattress climate-control system based on the condition of the mechanical thermal detector.

Embodiments described herein can include one or more optional features. For example, the mattress climate-control system can include a heater coupled to the mattress to heat at least a portion of the mattress. For example, the mattress climate-control system can include a fan coupled to the mattress to supply or draw air to a top of the mattress.

In some embodiments, the mechanical thermal detector includes a thermal wire assembly. For example, the thermal wire assembly can include a first wire, a second wire spiral wrapped about the first wire, and a coating separating the first wire from the second wire. For example, the thermal wire assembly can, based on a temperature of the mattress exceeding approximately 190° F., cause the first wire and the second wire to contact each other. For example, the coating can melt when a temperature of the coating exceeds approximately 190° F. For example, the coating melting can allow the first wire and the second wire to contact each other.

In some implementations, the condition of the mechanical thermal detector includes a resistance of the thermal wire assembly and operating the mattress climate-control system includes, based on the resistance being less than a first resistance threshold, disabling the mattress climate-control system. In some cases, the first resistance threshold represents that the mechanical thermal detector is short-circuited. In some cases, the mechanical thermal detector is short-circuited based on the first wire and the second wire contacting each other. In some cases, the mechanical thermal detector includes a resistor electrically coupled between terminating ends of the first wire and the second wire.

For example, the condition of the mechanical thermal detector can include a resistance of the thermal wire assembly and operating the mattress climate-control system includes, based on the resistance exceeding a second resistance threshold, disabling the mattress climate-control system. In some cases, the second resistance threshold represents that the mechanical thermal detector is open-circuited. In some cases, operating the mattress climate-control system includes, based on the resistance exceeding the first resistance threshold and being less than the second resistance threshold, enabling the mattress climate-control system, where the second resistance threshold is greater than the first resistance threshold. In some cases, the second resistance threshold can be approximately 4 kΩ. In some cases, the resistance exceeding the second resistance threshold represents that the mechanical thermal detector is open-circuited. In some cases, operating the mattress climate-control system includes, based on the resistance of the thermal wire assembly exceeding the second resistance threshold, disabling the mattress climate-control system. In some cases, the resistance of the thermal wire assembly exceeding the second resistance threshold represents that the thermal wire assembly is electrically disconnected from the controller. In some implementations, the bed system includes a smoke detector positioned at the mattress. For example, the smoke can detect a smoke condition at the mattress, transmit a signal representing the smoke condition to the controller and the controller can, based on the smoke condition, perform operations including operating the mattress climate-control system.

In some cases, operating the mattress climate-control system includes, based on the smoke condition indicating no smoke, enabling operation of the mattress climate-control system by a user. In some cases, operating the mattress climate-control system includes, based on the smoke condition indicating a presence of smoke, disabling operation of the mattress climate-control system. In some cases, operating the mattress climate-control system includes, based on the smoke condition indicating the smoke detector is not operating, disabling operation of the mattress climate-control system.

In some implementations, the operations further include transmitting, from the controller and to a user computing device, a report indicating an occurrence of the thermal event.

Other embodiments described herein include a mattress having a thermal wire, a resistor, and a controller. The thermal wire is positioned to receive heat from the mattress. The resistor is electrically coupled between first terminating ends of the thermal wire. The controller is electrically coupled to second terminating ends of the thermal wire. The controller performs operations including detecting a change in a resistance of the thermal wire and the resistor and operating a heater and a fan of the mattress based on the change in the resistance.

Embodiments described herein can include one or more optional features. For example, the mattress can include a terminal block and a conductor wire. The terminal block can be electrically coupled to the second terminating ends of the thermal wire. The conductor wire can be electrically coupled to the terminal block and the controller.

For example, the controller can include circuits to perform operations. The operations can include determining a voltage based on the resistance of the thermal wire and the resistor. When the voltage is between approximately 1.05 and 2.45 V, the operations can include enabling operation of the fan and the heater by a user. When the voltage is less than approximately 1.05 V, the operations can include disabling operation of the fan and the heater. When the voltage is greater than approximately 2.45 V, the operations can include disabling operation of the fan and the heater. However, any suitable voltage threshold may be used.

Other embodiments described herein include a method including detecting a thermal event in a mattress with a mechanical thermal detector and disabling a mattress climate-control system positioned in the mattress based on detecting the thermal event.

Embodiments described herein can include one or more optional features. For example, detecting the thermal event can include sensing a condition of the thermal event. In some implementations, the condition of the thermal event can be a change in a resistance of the mechanical thermal detector, where the mechanical thermal detector includes a thermal wire assembly having two spiral wound wires with first ends terminating on opposite ends of a resistor.

For example, the method can include enabling the mattress climate-control system by a user based on the change in the resistance indicating resistive termination. For example, the resistance indicating resistive termination of the thermal wire assembly can be between approximately 3.1 kΩ and 3.5 kΩ. However, any suitable resistance threshold may be used.

In some implementations, disabling a mattress climate-control system includes disabling a mattress climate-control system based on the change in the resistance indicating that the thermal wire assembly is short-circuited. In some implementations, disabling a mattress climate-control system comprises disabling a mattress climate-control system based on the change in resistance indicating that the thermal wire assembly is open-circuited.

For example, the method can further include comprising transmitting a signal indicating an occurrence of thermal event to a user computing device.

The devices, system, and techniques described herein may provide one or more of the following advantages. Some embodiments described herein include a mattress with one or more mechanical thermal sensors to detect a thermal event and a controller to operate a climate-control system based on detecting the thermal event.

The time to detect a thermal event can be decreased. For example, by positioning one or more mechanical thermal detectors in the mattress close to where the thermal event may occur, the time to detect the thermal event can be decreased.

The time to operate the climate-control system in response to the thermal event can be decreased. For example, by positioning one or more mechanical thermal detectors in the mattress close to where the thermal event may occur, the time to operate the climate-control system in response to the controller detecting the change in condition of the mechanical thermal detector can be decreased.

User safety can be improved. For example, when the user is on the mattress and the thermal event occurs on the mattress, the climate-control system can be transitioned to an OFF state, reducing an air flow or a heat input into the mattress, reducing a condition or a magnitude of the thermal event.

Mattress damage as a result of the thermal event can be reduced. For example, by positioning one or more mechanical thermal detectors in the mattress close to where the thermal event may occur, the time to detect the thermal event can be decreased.

The details of one or more implementations are set forth in the accompanying drawings and the description below. Other features, aspects and potential advantages will be apparent from the accompanying description and figures.

DESCRIPTION OF DRAWINGS

Like reference symbols in the various drawings indicate like elements.

DETAILED DESCRIPTION

Figure 1:
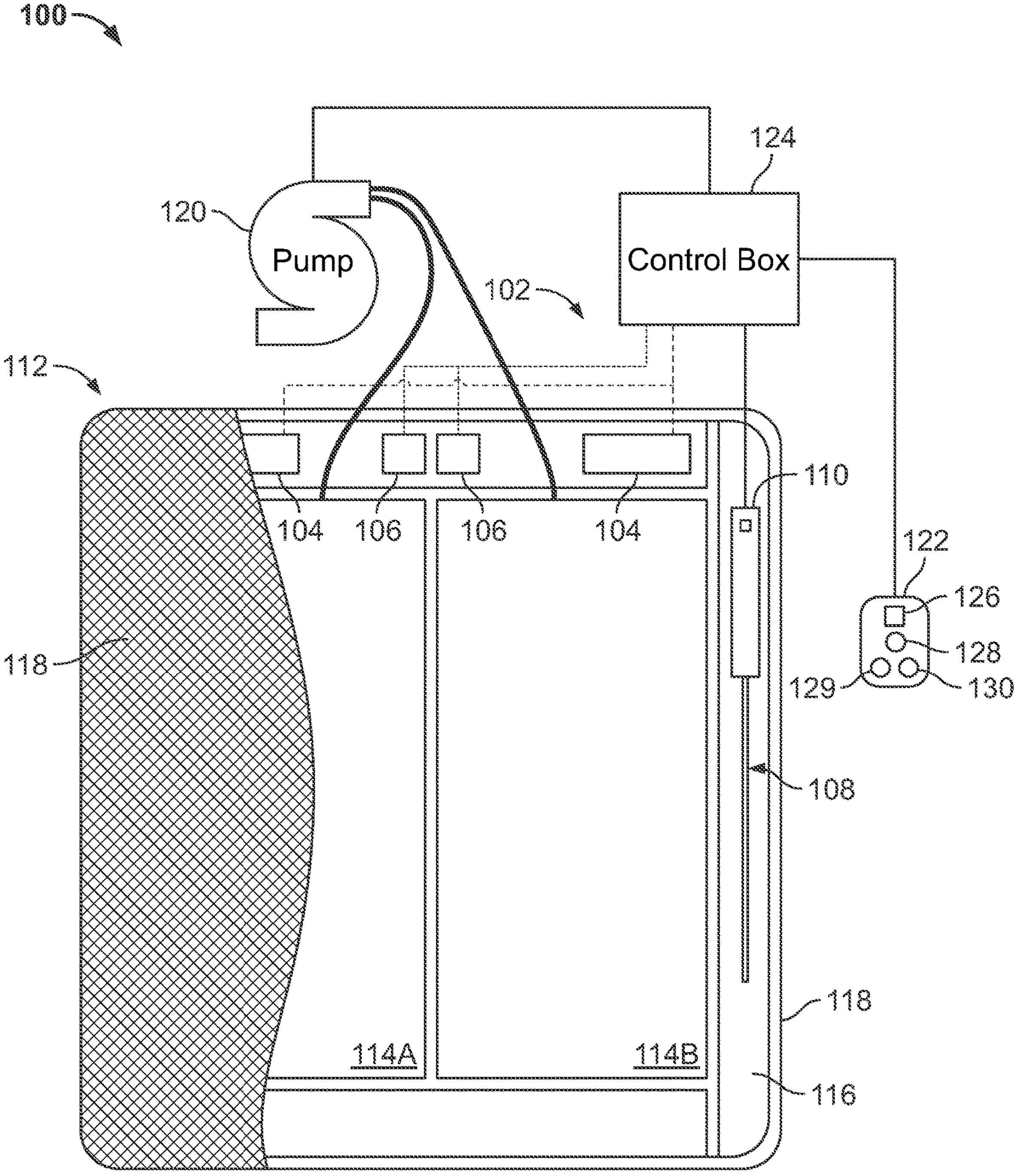
FIG. 1 shows an example air bed system including an example mechanical thermal detector and a controller.

FIG. 1 shows an example air bed system 100 that includes a bed 112, a climate-control system 102 with heaters 104 and fans 106, a mechanical thermal detector 108, and a controller 110. The climate-control system 102 controls a climate of the air bed system 100 by heating with the heaters 104 or moving air with the fans 106 to cool the bed 112. One or more mechanical thermal detectors 108 are positioned at the bed 112 (a mattress). A condition of the mechanical thermal detector 108 changes in response to a thermal event at the mattress. For example, the thermal event can be a change or an increase in a temperature of the air bed system 100 which changes the condition of the mechanical thermal detector 108. The controller 110 is operatively coupled to the climate-control system 102. The controller 110 detects the condition of the mechanical thermal detector 108 and based on the condition of the mechanical thermal detector 108, operates the climate-control system 102, for example, by selectively operating or disabling one or more features or components of the climate-control system 102. While the climate-control system 102 is shown and described as part of an air bed system (the air bed system 100) with air chambers 114, the climate-control system 102 can also be used with non-air bed systems (e.g. systems without inflatable air chambers). Accordingly, the air bed system 100 could be modified to be a non-air bed system that includes none, one, or several of the features and components described with respect to the air bed system 100. The climate-control system 102, the mechanical thermal detector 108, and the controller 110 are described in more detail in reference to FIGS. 2 and 19-23.

The bed 112 can be a mattress that includes at least one air chamber 114 surrounded by a resilient border 116 and encapsulated by bed ticking 118. The resilient border 116 can comprise any suitable material, such as foam. In some embodiments, the resilient border 116 can combine with a top layer or layers of foam (not shown in FIG. 1) to form an upside down foam tub. In other embodiments, mattress structure can be varied as suitable for the application.

As illustrated in FIG. 1, the bed 112 can be a two chamber design having first and second fluid chambers, such as a first air chamber 114A and a second air chamber 114B. Sometimes, the bed 112 can include chambers for use with fluids other than air that are suitable for the application. For example, the fluids can include liquid. In some embodiments, such as single beds or kids' beds, the bed 112 can include a single air chamber 114A or 114B or multiple air chambers 114A and 114B. Although not depicted, sometimes, the bed 112 can include additional air chambers.

The first and second air chambers 114A and 114B can be in fluid communication with a pump 120. The pump 120 can be in electrical communication with a remote control 122 via control box 124. The control box 124 can include a wired or wireless communications interface for communicating with one or more devices, including the remote control 122. The control box 124 can be configured to operate the pump 120 to cause increases and decreases in the fluid pressure of the first and second air chambers 114A and 114B based upon commands input by a user using the remote control 122. In some implementations, the control box 124 is integrated into a housing of the pump 120. Moreover, sometimes, the pump 120 can be in wireless communication (e.g., via a home network, WIFI, BLUETOOTH, or other wireless network) with a mobile device via the control box 124. The mobile device can include but is not limited to the user's smartphone, cell phone, laptop, tablet, computer, wearable device, home automation device, or other computing device. A mobile application can be presented at the mobile device and provide functionality for the user to control the bed 112 and view information about the bed 112. The user can input commands in the mobile application presented at the mobile device. The inputted commands can be transmitted to the control box 124, which can operate the pump 120 based upon the commands.

The remote control 122 can include a display 126, an output selecting mechanism 128, a pressure increase button 129, and a pressure decrease button 130. The remote control 122 can include one or more additional output selecting mechanisms and/or buttons. The display 126 can present information to the user about settings of the bed 112. For example, the display 126 can present pressure settings of both the first and second air chambers 114A and 114B or one of the first and second air chambers 114A and 114B. Sometimes, the display 126 can be a touch screen, and can receive input from the user indicating one or more commands to control pressure in the first and second air chambers 114A and 114B and/or other settings of the bed 112. The remote control 122 can control the climate-control system 102 by operating the heaters 104 and the fans 106. For example, the remote control 122 can, based on the user inputs, turn on, turn off, increase, or decrease a heat output from the heaters 104. For example, the remote control 122 can, based on the user inputs, turn on, turn off, increase a speed, or decrease the speed of the fans 106.

The output selecting mechanism 128 can allow the user to switch air flow generated by the pump 120 between the first and second air chambers 114A and 114B, thus enabling control of multiple air chambers with a single remote control 122 and a single pump 120. For example, the output selecting mechanism 128 can by a physical control (e.g., switch or button) or an input control presented on the display 126. Alternatively, separate remote control units can be provided for each air chamber 114A and 114B and can each include the ability to control multiple air chambers. Pressure increase and decrease buttons 129 and 130 can allow the user to increase or decrease the pressure, respectively, in the air chamber selected with the output selecting mechanism 128. Adjusting the pressure within the selected air chamber can cause a corresponding adjustment to the firmness of the respective air chamber. In some embodiments, the remote control 122 can be omitted or modified as appropriate for an application.

Figure 2:
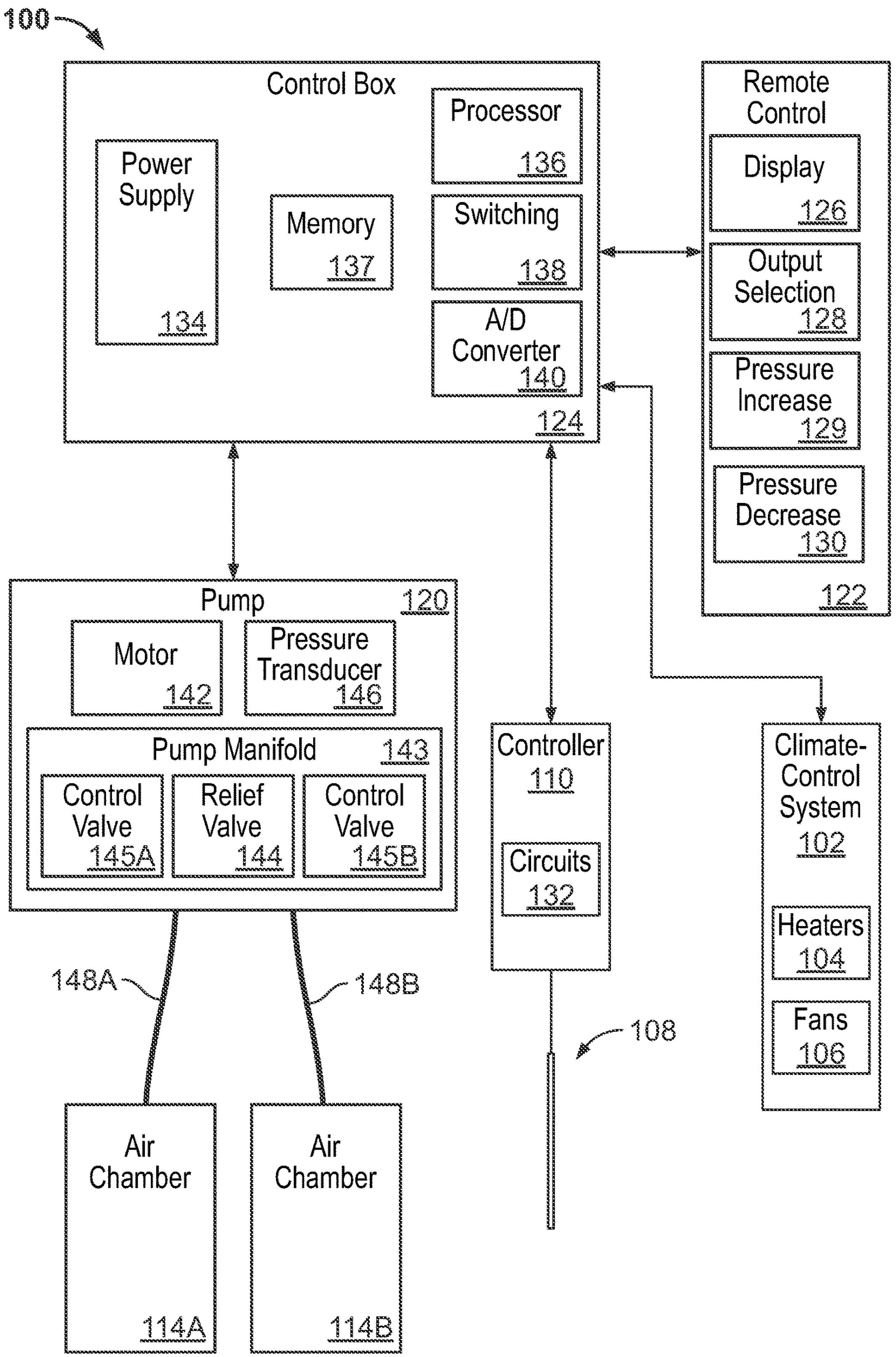
FIG. 2 is a block diagram of an example of various components of an air bed system.

FIG. 2 is a block diagram of an example of various components of an air bed system. These components can be used in the example air bed system 100. The control box 124 can include a power supply 134, a processor 136, a memory 137, a switching mechanism 138, and an analog to digital (A/D) converter 140. The switching mechanism 138 can be, for example, a relay or a solid state switch. In some implementations, the switching mechanism 138 can be located in the pump 120 rather than the control box 124. The pump 120 and the remote control 122 can be in two-way communication with the control box 124. The pump 120 includes a motor 142, a pump manifold 143, a relief valve 144, a first control valve 145A, a second control valve 145B, and a pressure transducer 146. The pump 120 is fluidly connected with the first air chamber 114A and the second air chamber 114B via a first tube 148A and a second tube 148B, respectively. The first and second control valves 145A and 145B can be controlled by switching mechanism 138, and are operable to regulate the flow of fluid between the pump 120 and first and second air chambers 114A and 114B, respectively.

In some implementations, the pump 120 and the control box 124 can be provided and packaged as a single unit. In some implementations, the pump 120 and the control box 124 can be provided as physically separate units. The control box 124, the pump 120, or both can be integrated within or otherwise contained within a bed frame, foundation, or bed support structure that supports the bed 112. Sometimes, the control box 124, the pump 120, or both can be located outside of a bed frame, foundation, or bed support structure (as shown in the example in FIG. 1).

The air bed system 100 in FIG. 2 includes the two air chambers 114A and 114B and the single pump 120 of the bed 112 depicted in FIG. 1. However, other implementations can include an air bed system having two or more air chambers and one or more pumps incorporated into the air bed system to control the air chambers. For example, a separate pump can be associated with each air chamber. As another example, a pump can be associated with multiple chambers. A first pump can be associated with air chambers that extend longitudinally from a left side to a midpoint of the air bed system 100 and a second pump can be associated with air chambers that extend longitudinally from a right side to the midpoint of the air bed system 100. Separate pumps can allow each air chamber to be inflated or deflated independently and/or simultaneously. Additional pressure transducers can also be incorporated into the air bed system 100 such that a separate pressure transducer can be associated with each air chamber.

As an illustrative example, in use, the processor 136 can send a decrease pressure command to one of air chambers 114A or 114B, and the switching mechanism 138 can convert the low voltage command signals sent by the processor 136 to higher operating voltages sufficient to operate the relief valve 144 of the pump 120 and open the respective control valve 145A or 145B. Opening the relief valve 144 can allow air to escape from the air chamber 114A or 114B through the respective air tube 148A or 148B. During deflation, the pressure transducer 146 can send pressure readings to the processor 136 via the A/D converter 140. The A/D converter 140 can receive analog information from pressure transducer 146 and can convert the analog information to digital information useable by the processor 136. The processor 136 can send the digital signal to the remote control 122 to update the display 126 to convey the pressure information to the user. The processor 136 can also send the digital signal to other devices in wired or wireless communication with the air bed system, including but not limited to mobile devices described herein. The user can then view pressure information associated with the air bed system at their device instead of at, or in addition to, the remote control 122.

As another example, the processor 136 can send an increase pressure command. The pump motor 142 can be energized in response to the increase pressure command and send air to the designated one of the air chambers 114A or 114B through the air tube 148A or 148B via electronically operating the corresponding control valve 145A or 145B. While air is being delivered to the designated air chamber 114A or 114B to increase the chamber firmness, the pressure transducer 146 can sense pressure within the pump manifold 143. The pressure transducer 146 can send pressure readings to the processor 136 via the A/D converter 140. The processor 136 can use the information received from the A/D converter 140 to determine the difference between the actual pressure in air chamber 114A or 114B and the desired pressure. The processor 136 can send the digital signal to the remote control 122 to update display 126.

Generally speaking, during an inflation or deflation process, the pressure sensed within the pump manifold 143 can provide an approximation of the actual pressure within the respective air chamber that is in fluid communication with the pump manifold 143. An example method includes turning off the pump 120, allowing the pressure within the air chamber 114A or 114B and the pump manifold 143 to equalize, then sensing the pressure within the pump manifold 143 with the pressure transducer 146. Providing a sufficient amount of time to allow the pressures within the pump manifold 143 and chamber 114A or 114B to equalize can result in pressure readings that are accurate approximations of actual pressure within air chamber 114A or 114B. In some implementations, the pressure of the air chambers 114A and/or 114B can be continuously monitored using multiple pressure sensors (not shown). The pressure sensors can be positioned within the air chambers. The pressure sensors can also be fluidly connected to the air chambers, such as along the air tubes 148A and 148B.

In some implementations, information collected by the pressure transducer 146 can be analyzed to determine various states of a user laying on the bed 112. For example, the processor 136 can use information collected by the pressure transducer 146 to determine a heartrate or a respiration rate for the user. As an illustrative example, the user can be laying on a side of the bed 112 that includes the chamber 114A. The pressure transducer 146 can monitor fluctuations in pressure of the chamber 114A, and this information can be used to determine the user's heartrate and/or respiration rate. As another example, additional processing can be performed using the collected data to determine a sleep state of the user (e.g., awake, light sleep, deep sleep). For example, the processor 136 can determine when the user falls asleep and, while asleep, the various sleep states (e.g., sleep stages) of the user. Based on the determined heartrate, respiration rate, and/or sleep states of the user, the processor 136 can determine information about the user's sleep quality. The processor 136 can, for example, determine how well the user slept during a particular sleep cycle. The processor 136 can also determine user sleep cycle trends. Accordingly, the processor 136 can generate recommendations to improve the user's sleep quality and overall sleep cycle. Information that is determined about the user's sleep cycle (e.g., heartrate, respiration rate, sleep states, sleep quality, recommendations to improve sleep quality, etc.) can be transmitted to the user's mobile device and presented in a mobile application, as described above.

Additional information associated with the user of the air bed system 100 that can be determined using information collected by the pressure transducer 146 includes user motion, presence on a surface of the bed 112, weight, heart arrhythmia, snoring, partner snore, and apnea. One or more other health conditions of the user can also be determined based on the information collected by the pressure transducer 146. Taking user presence detection for example, the pressure transducer 146 can be used to detect the user's presence on the bed 112, e.g., via a gross pressure change determination and/or via one or more of a respiration rate signal, heartrate signal, and/or other biometric signals. Detection of the user's presence can be beneficial to determine, by the processor 136, adjustment(s) to make to settings of the bed 112 (e.g., adjusting a firmness when the user is present to a user-preferred firmness setting) and/or peripheral devices (e.g., turning off lights when the user is present, activating a heating or cooling system, etc.).

For example, a simple pressure detection process can identify an increase in pressure as an indication that the user is present. As another example, the processor 136 can determine that the user is present if the detected pressure increases above a specified threshold (so as to indicate that a person or other object above a certain weight is positioned on the bed 112). As yet another example, the processor 136 can identify an increase in pressure in combination with detected slight, rhythmic fluctuations in pressure as corresponding to the user being present. The presence of rhythmic fluctuations can be identified as being caused by respiration or heart rhythm (or both) of the user. The detection of respiration or a heartbeat can distinguish between the user being present on the bed and another object (e.g., a suitcase, a pet, a pillow, etc.) being placed thereon.

In some implementations, pressure fluctuations can be measured at the pump 120. For example, one or more pressure sensors can be located within one or more internal cavities of the pump 120 to detect pressure fluctuations within the pump 120. The fluctuations detected at the pump 120 can indicate pressure fluctuations in the chambers 114A and/or 114B. One or more sensors located at the pump 120 can be in fluid communication with the chambers 114A and/or 114B, and the sensors can be operative to determine pressure within the chambers 114A and/or 114B. The control box 124 can be configured to determine at least one vital sign (e.g., heartrate, respiratory rate) based on the pressure within the chamber 114A or the chamber 114B.

The control box 124 can also analyze a pressure signal detected by one or more pressure sensors to determine a heartrate, respiration rate, and/or other vital signs of the user lying or sitting on the chamber 114A and/or 114B. More specifically, when a user lies on the bed 112 and is positioned over the chamber 114A, each of the user's heart beats, breaths, and other movements (e.g., hand, arm, leg, foot, or other gross body movements) can create a force on the bed 112 that is transmitted to the chamber 114A. As a result of this force input, a wave can propagate through the chamber 114A and into the pump 120. A pressure sensor located at the pump 120 can detect the wave, and thus the pressure signal outputted by the sensor can indicate a heartrate, respiratory rate, or other information regarding the user.

With regard to sleep state, the air bed system 100 can determine the user's sleep state by using various biometric signals such as heartrate, respiration, and/or movement of the user. While the user is sleeping, the processor 136 can receive one or more of the user's biometric signals (e.g., heartrate, respiration, motion, etc.) and can determine the user's present sleep state based on the received biometric signals. In some implementations, signals indicating fluctuations in pressure in one or both of the chambers 114A and 114B can be amplified and/or filtered to allow for more precise detection of heartrate and respiratory rate.

Sometimes, the processor 136 can receive additional biometric signals of the user from one or more other sensors or sensor arrays positioned on or otherwise integrated into the air bed system 100. For example, one or more sensors can be attached or removably attached to a top surface of the air bed system 100 and configured to detect signals such as heartrate, respiration rate, and/or motion. The processor 136 can combine biometric signals received from pressure sensors located at the pump 120, the pressure transducer 146, and/or the sensors positioned throughout the air bed system 100 to generate accurate and more precise information about the user and their sleep quality.

Sometimes, the control box 124 can perform a pattern recognition algorithm or other calculation based on the amplified and filtered pressure signal(s) to determine the user's heartrate and/or respiratory rate. For example, the algorithm or calculation can be based on assumptions that a heartrate portion of the signal has a frequency in a range of 0.5-4.0 Hz and that a respiration rate portion of the signal has a frequency in a range of less than 1 Hz. Sometimes, the control box 124 can use one or more machine learning models to determine the user's health information. The models can be trained using training data that includes training pressure signals and expected heartrates and/or respiratory rates. Sometimes, the control box 124 can determine user health information by using a lookup table that corresponds to sensed pressure signals.

The control box 124 can also be configured to determine other characteristics of the user based on the received pressure signal, such as blood pressure, tossing and turning movements, rolling movements, limb movements, weight, presence or lack of presence of the user, and/or the identity of the user.

For example, the pressure transducer 146 can be used to monitor the air pressure in the chambers 114A and 114B of the bed 112. If the user on the bed 112 is not moving, the air pressure changes in the air chamber 114A or 114B can be relatively minimal, and can be attributable to respiration and/or heartbeat. When the user on the bed 112 is moving, however, the air pressure in the mattress can fluctuate by a much larger amount. The pressure signals generated by the pressure transducer 146 and received by the processor 136 can be filtered and indicated as corresponding to motion, heartbeat, or respiration. The processor 136 can attribute such fluctuations in air pressure to the user's sleep quality. Such attributions can be determined based on applying one or more machine learning models and/or algorithms to the pressure signals. For example, if the user shifts and turns a lot during a sleep cycle (for example, in comparison to historic trends of the user's sleep cycles), the processor 136 can determine that the user experienced poor sleep during that particular sleep cycle.

In some implementations, rather than performing the data analysis in the control box 124 with the processor 136, a digital signal processor (DSP) can be provided to analyze the data collected by the pressure transducer 146. Alternatively, the collected data can be sent to a cloud-based computing system for remote analysis.

In some implementations, the example air bed system 100 further includes a temperature controller configured to increase, decrease, or maintain a temperature of the bed 112, for example for the comfort of the user. For example, a pad (e.g., mat, layer, etc.) can be placed on top of or be part of the bed 112, or can be placed on top of or be part of one or both of the chambers 114A and 114B. Air can be pushed through the pad and vented to cool off the user on the bed 112. Additionally or alternatively, the pad can include a heating element used to keep the user warm. In some implementations, the temperature controller can receive temperature readings from the pad. The temperature controller can determine whether the temperature readings are less than or greater than some threshold range and/or value. Based on this determination, the temperature controller can actuate components to push air through the pad to cool off the user or active the heating element. In some implementations, separate pads are used for different sides of the bed 112 (e.g., corresponding to the locations of the chambers 114A and 114B) to provide for differing temperature control for the different sides of the bed 112. Each pad can be selectively controlled by the temperature controller to provide cooling or heating preferred by each user on the different sides of the bed 112. For example, a first user on a left side of the bed 112 can prefer to have their side of the bed 112 cooled during the night while a second user on a right side of the bed 112 can prefer to have their side of the bed 112 warmed during the night.

In some implementations, the user of the air bed system 100 can use an input device, such as the remote control 122 or a mobile device as described above, to input a desired temperature for a surface of the bed 112 (or for a portion of the surface of the bed 112, for example at a foot region, a lumbar or waist region, a shoulder region, and/or a head region of the bed 112). The desired temperature can be encapsulated in a command data structure that includes the desired temperature and also identifies the temperature controller as the desired component to be controlled. The command data structure can then be transmitted via Bluetooth or another suitable communication protocol (e.g., WIFI, a local network, etc.) to the processor 136. In various examples, the command data structure is encrypted before being transmitted. The temperature controller can then configure its elements to increase or decrease the temperature of the pad depending on the temperature input provided at the remote control 122 by the user.

In some implementations, data can be transmitted from a component back to the processor 136 or to one or more display devices, such as the display 126 of the remote controller 122. For example, the current temperature as determined by a sensor element of a temperature controller, the pressure of the bed, the current position of the foundation or other information can be transmitted to control box 124. The control box 124 can transmit this information to the remote control 122 to be displayed to the user (e.g., on the display 126). As described above, the control box 124 can also transmit the received information to a mobile device to be displayed in a mobile application or other graphical user interface (GUI) to the user.

In some implementations, the example air bed system 100 further includes an adjustable foundation and an articulation controller configured to adjust the position of the bed 112 by adjusting the adjustable foundation supporting the bed. For example, the articulation controller can adjust the bed 112 from a flat position to a position in which a head portion of a mattress of the bed is inclined upward (e.g., to facilitate a user sitting up in bed and/or watching television). The bed 112 can also include multiple separately articulable sections. As an illustrative example, the bed 112 can include one or more of a head portion, a lumbar/waist portion, a leg portion, and/or a foot portion, all of which can be separately articulable. As another example, portions of the bed 112 corresponding to the locations of the chambers 114A and 114B can be articulated independently from each other, to allow one user positioned on the bed 112 surface to rest in a first position (e.g., a flat position or other desired position) while a second user rests in a second position (e.g., a reclining position with the head raised at an angle from the waist or another desired position). Separate positions can also be set for two different beds (e.g., two twin beds placed next to each other). The foundation of the bed 112 can include more than one zone that can be independently adjusted.

Sometimes, the bed 112 can be adjusted to one or more user-defined positions based on user input and/or user preferences. For example, the bed 112 can automatically adjust, by the articulation controller, to one or more user-defined settings. As another example, the user can control the articulation controller to adjust the bed 112 to one or more user-defined positions. Sometimes, the bed 112 can be adjusted to one or more positions that may provide the user with improved or otherwise improve sleep and sleep quality. For example, a head portion on one side of the bed 112 can be automatically articulated, by the articulation controller, when one or more sensors of the air bed system 100 detect that a user sleeping on that side of the bed 112 is snoring. As a result, the user's snoring can be mitigated so that the snoring does not wake up another user sleeping in the bed 112.

In some implementations, the bed 112 can be adjusted using one or more devices in communication with the articulation controller or instead of the articulation controller. For example, the user can change positions of one or more portions of the bed 112 using the remote control 122 described above. The user can also adjust the bed 112 using a mobile application or other graphical user interface presented at a mobile computing device of the user.

The articulation controller can also provide different levels of massage to one or more portions of the bed 112 for one or more users. The user(s) can adjust one or more massage settings for the portions of the bed 112 using the remote control 122 and/or a mobile device in communication with the air bed system 100.

The example air bed system 100 further includes the controller 110 to detect the condition of the mechanical thermal detector 108 and based on the condition of the mechanical thermal detector 108, operate the climate-control system 102. As shown in FIG. 2, the controller 110 includes circuits 132 to detect the condition of the mechanical thermal detector 108 and send signals to the control box 124 which sends command signals to operate the climate-control system 102 based on the condition of the mechanical thermal detector 108.

As an illustrative example, in use, the processor 136 receives a signal from the controller 110 representing a value of the thermal condition of the mechanical thermal detector 108. For example, the controller 110 receives the signal representing the value of the thermal condition from the mechanical thermal detector 108; compares the value of the thermal condition to multiple threshold values; and based on the result of the comparison, transmits a signal to the processor 136 indicating that the thermal event has occurred in the bed 112. The processor 136 then transmits a command signal to the climate-control system 102 to stop operation of the heaters 104 and the fans 106.

When no thermal event has occurred, and based on the result of the comparison, the controller 110 transmits a signal to the processor 136 indicating that no thermal event has occurred in the bed 112. The processor 136 then transmits a command signal to the climate-control system 102 to enable operation of the heaters 104 and the fans 106 by the user, for example, by the remote control 122. The climate-control system 102, the mechanical thermal detector 108, and the controller 110 are described in more detail in reference to FIGS. 19-23.

Figure 19:
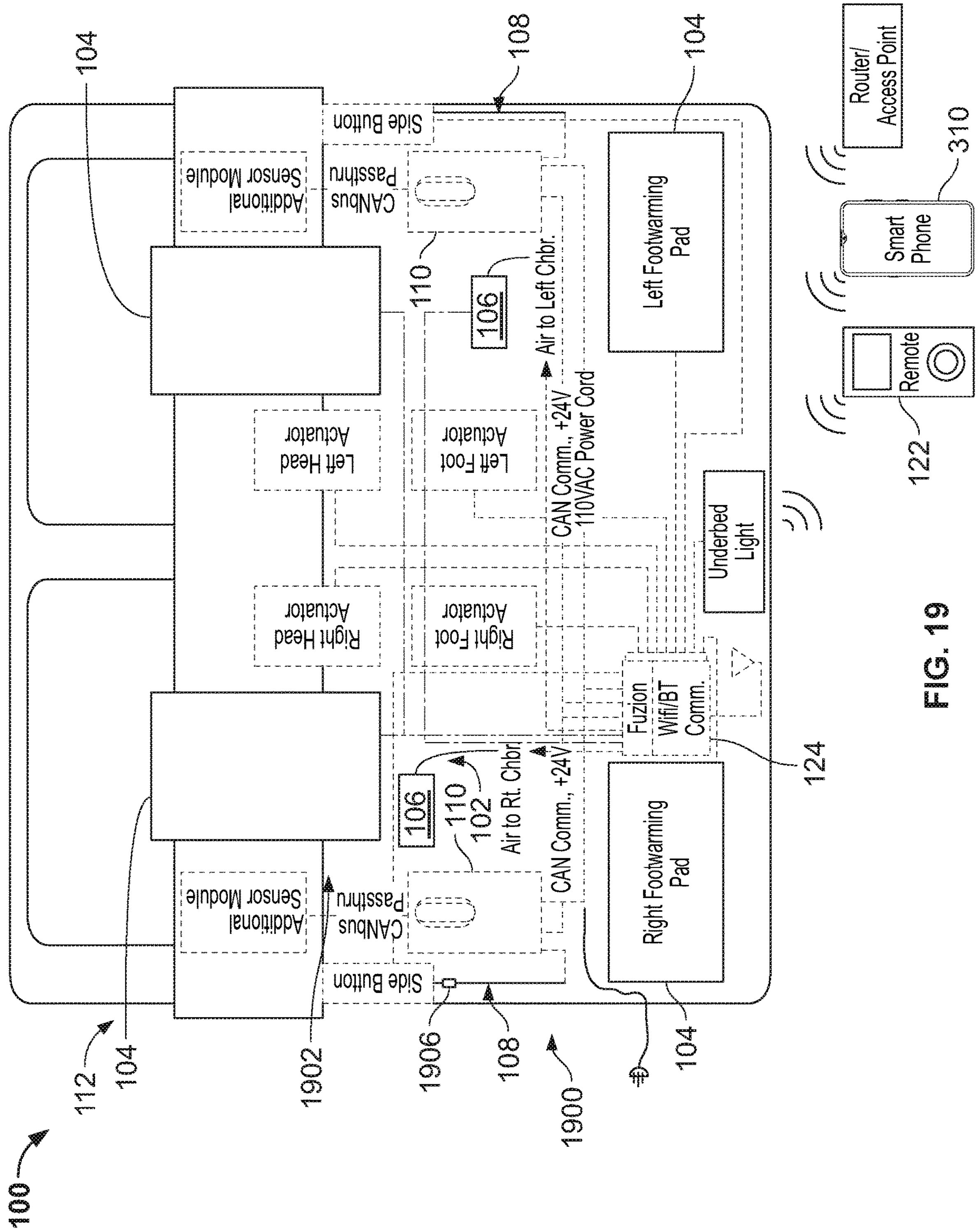
FIG. 19 is a schematic diagram of an example bed with an example climate-control system and an example thermal event protection assembly.

As shown in FIG. 19, the controller 110 is a separate module from the control box 124. The controller 110 is positioned spaced apart from the control box 124 and can be added to existing air bed systems 100. However, in some implementations, the control box 124 includes the controller 110 to detect the condition of the mechanical thermal detector 108. In other words, the controller 110 is inside the control box 124. In yet other implementations, the heaters 104 and the fans 106 each include separate controllers 110 which individually detect the condition of the mechanical thermal detectors 108. Still in other in other implementations, the controller 110 is included in the remote control 122 or the user device 310 (described in more detail in reference to FIG. 3).

Example of a Bed in a Bedroom Environment

Figure 3:
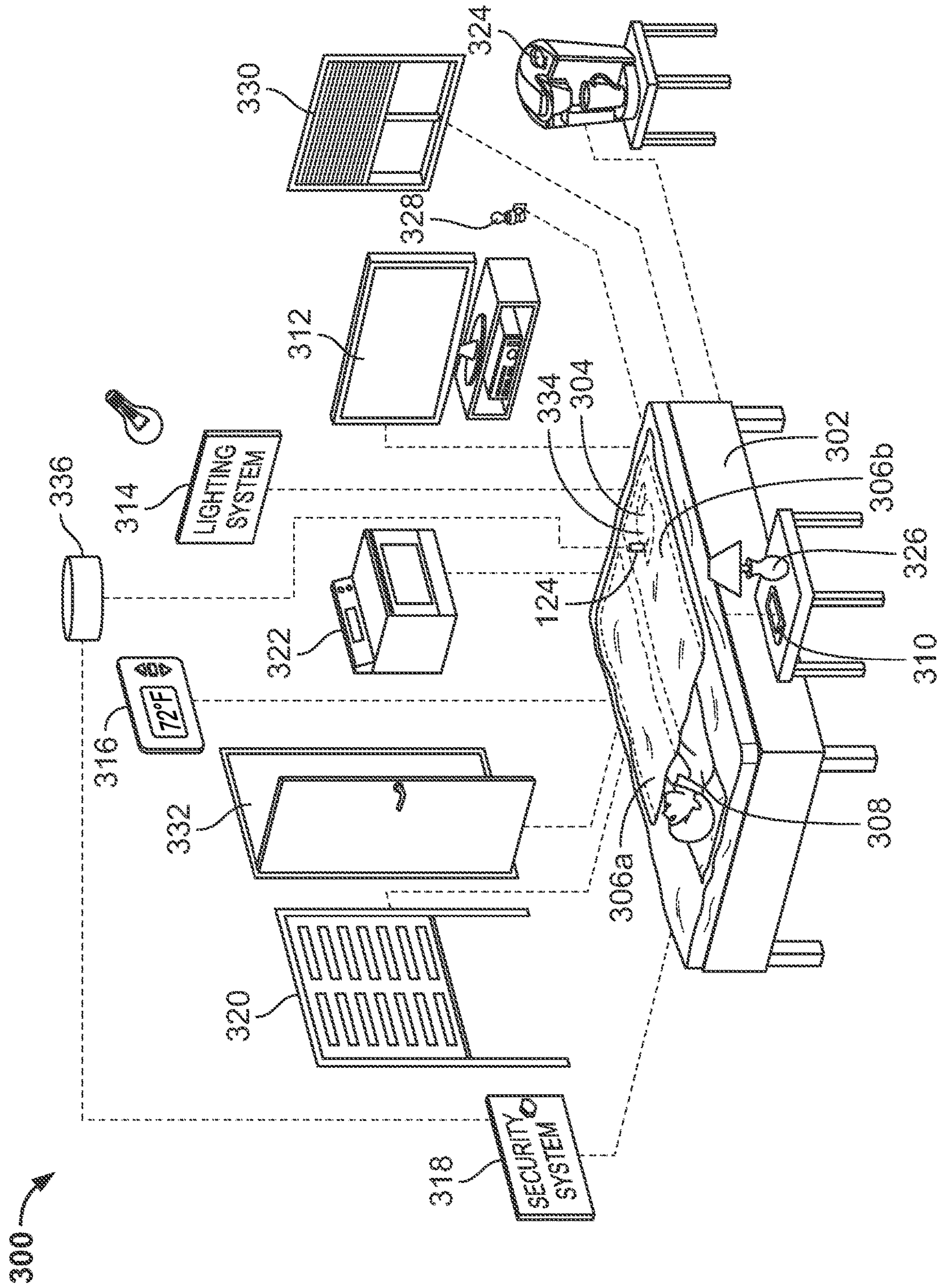
FIG. 3 shows an example environment including a bed in communication with devices located in and around a home.

FIG. 3 shows an example environment 300 including a bed 302 in communication with devices located in and around a home. In the example shown, the bed 302 includes pump 304 for controlling air pressure within two air chambers 306*a* and 306*b* (as described above). The pump 304 additionally includes circuitry 334 for controlling inflation and deflation functionality performed by the pump 304. The circuitry 334 is programmed to detect fluctuations in air pressure of the air chambers 306*a-b* and use the detected fluctuations to identify bed presence of a user 308, the user's sleep state, movement, and biometric signals (e.g., heartrate, respiration rate). The detected fluctuations can also be used to detect when the user 308 is snoring and whether the user 308 has sleep apnea or other health conditions. The detected fluctuations can also be used to determine an overall sleep quality of the user 308.

In the example shown, the pump 304 is located within a support structure of the bed 302 and the control circuitry 334 for controlling the pump 304 is integrated with the pump 304. In some implementations, the control circuitry 334 is physically separate from the pump 304 and is in wireless or wired communication with the pump 304. In some implementations, the pump 304 and/or control circuitry 334 are located outside of the bed 302. In some implementations, various control functions can be performed by systems located in different physical locations. For example, circuitry for controlling actions of the pump 304 can be located within a pump casing of the pump 304 while control circuitry 334 for performing other functions associated with the bed 302 can be located in another portion of the bed 302, or external to the bed 302. The control circuitry 334 located within the pump 304 can also communicate with control circuitry 334 at a remote location through a LAN or WAN (e.g., the internet). The control circuitry 334 can also be included in the control box 124 of FIGS. 1 and 2.

In some implementations, one or more devices other than, or in addition to, the pump 304 and control circuitry 334 can be utilized to identify user bed presence, sleep state, movement, biometric signals, and other information (e.g., sleep quality, health related) about the user 308. For example, the bed 302 can include a second pump, with each pump connected to a respective one of the air chambers 306*a-b*. For example, the pump 304 can be in fluid communication with the air chamber 306*b* to control inflation and deflation of the air chamber 306*b* as well as detect user signals for a user located over the air chamber 306*b*. The second pump can be in fluid communication with the air chamber 306*a* and used to control inflation and deflation of the air chamber 306*a* as well as detect user signals for a user located over the air chamber 306*a*.

As another example, the bed 302 can include one or more pressure sensitive pads or surface portions operable to detect movement, including user presence, motion, respiration, and heartrate. A first pressure sensitive pad can be incorporated into a surface of the bed 302 over a left portion of the bed 302, where a first user would normally be located during sleep, and a second pressure sensitive pad can be incorporated into the surface of the bed 302 over a right portion of the bed 302, where a second user would normally be located. The movement detected by the pressure sensitive pad(s) or surface portion(s) can be used by control circuitry 334 to identify user sleep state, bed presence, or biometric signals for each user. The pressure sensitive pads can also be removable rather than incorporated into the surface of the bed 302.

The bed 302 can also include one or more temperature sensors and/or array of sensors operable to detect temperatures in microclimates of the bed 302. Detected temperatures in different microclimates of the bed 302 can be used by the control circuitry 334 to determine one or more modifications to the user 308's sleep environment. For example, a temperature sensor located near a core region of the bed 302 where the user 308 rests can detect high temperature values. Such high temperature values can indicate that the user 308 is warm. To lower the user's body temperature in this microclimate, the control circuitry 334 can determine that a cooling element of the bed 302 can be activated. As another example, the control circuitry 334 can determine that a cooling unit in the home can be automatically activated to cool an ambient temperature in the environment 300.

The control circuitry 334 can also process a combination of signals sensed by different sensors that are integrated into, positioned on, or otherwise in communication with the bed 112. For example, pressure and temperature signals can be processed by the control circuitry 334 to more accurately determine one or more health conditions of the user 308 and/or sleep quality of the user 308. Acoustic signals detected by one or more microphones or other audio sensors can also be used in combination with pressure or motion sensors in order to determine when the user 308 snores, whether the user 308 has sleep apnea, and/or overall sleep quality of the user 308. Combinations of one or more other sensed signals are also possible for the control circuitry 334 to more accurately determine one or more health and/or sleep conditions of the user 308.

Accordingly, information detected by one or more sensors or other components of the bed 112 (e.g., motion information) can be processed by the control circuitry 334 and provided to one or more user devices, such as a user device 310 for presentation to the user 308 or to other users. The information can be presented in a mobile application or other graphical user interface at the user device 310. The user 308 can view different information that is processed and/or determined by the control circuitry 334 and based the signals that are detected by components of the bed 302. For example, the user 308 can view their overall sleep quality for a particular sleep cycle (e.g., the previous night), historic trends of their sleep quality, and health information. The user 308 can also adjust one or more settings of the bed 302 (e.g., increase or decrease pressure in one or more regions of the bed 302, incline or decline different regions of the bed 302, turn on or off massage features of the bed 302, etc.) using the mobile application that is presented at the user device 310.

In the example depicted in FIG. 3, the user device 310 is a mobile phone; however, the user device 310 can also be any one of a tablet, personal computer, laptop, a smartphone, a smart television (e.g., a television 312), a home automation device, or other user device capable of wired or wireless communication with the control circuitry 334, one or more other components of the bed 302, and/or one or more devices in the environment 300. The user device 310 can be in communication with the control circuitry 334 of the bed 302 through a network or through direct point-to-point communication. For example, the control circuitry 334 can be connected to a LAN (e.g., through a WIFI router) and communicate with the user device 310 through the LAN. As another example, the control circuitry 334 and the user device 310 can both connect to the Internet and communicate through the Internet. For example, the control circuitry 334 can connect to the Internet through a WIFI router and the user device 310 can connect to the Internet through communication with a cellular communication system. As another example, the control circuitry 334 can communicate directly with the user device 310 through a wireless communication protocol, such as Bluetooth. As yet another example, the control circuitry 334 can communicate with the user device 310 through a wireless communication protocol, such as ZigBee, Z-Wave, infrared, or another wireless communication protocol suitable for the application. As another example, the control circuitry 334 can communicate with the user device 310 through a wired connection such as, for example, a USB connector, serial/RS232, or another wired connection suitable for the application.

As mentioned above, the user device 310 can display a variety of information and statistics related to sleep, or user 308's interaction with the bed 302. For example, a user interface displayed by the user device 310 can present information including amount of sleep for the user 308 over a period of time (e.g., a single evening, a week, a month, etc.), amount of deep sleep, ratio of deep sleep to restless sleep, time lapse between the user 308 getting into bed and falling asleep, total amount of time spent in the bed 302 for a given period of time, heartrate over a period of time, respiration rate over a period of time, or other information related to user interaction with the bed 302 by the user 308 or one or more other users. In some implementations, information for multiple users can be presented on the user device 310, for example information for a first user positioned over the air chamber **306*a* can be presented along with information for a second user positioned over the air chamber 306*b*. In some implementations, the information presented on the user device 310 can vary according to the age of the user 308 so that the information presented evolves with the age of the user 308**.

The user device 310 can also be used as an interface for the control circuitry 334 of the bed 302 to allow the user 308 to enter information and/or adjust one or more settings of the bed 302. The information entered by the user 308 can be used by the control circuitry 334 to provide better information to the user 308 or to various control signals for controlling functions of the bed 302 or other devices. For example, the user 308 can enter information such as weight, height, and age of the user 308. The control circuitry 334 can use this information to provide the user 308 with a comparison of the user 308's tracked sleep information to sleep information of other people having similar weights, heights, and/or ages as the user 308. The control circuitry 334 can also use this information to accurately determine overall sleep quality and/or health of the user 308 based on information detected by components (e.g., sensors) of the bed 302.

The user 308 may also use the user device 310 as an interface for controlling air pressure of the air chambers **306*a* and 306*b*, various recline or incline positions of the bed 302, temperature of one or more surface temperature control devices of the bed 302, or for allowing the control circuitry 334** to generate control signals for other devices (as described below).

The control circuitry 334 may also communicate with other devices or systems, including but not limited to the television 312, a lighting system 314, a thermostat 316, a security system 318, home automation devices, and/or other household devices (e.g., an oven 322, a coffee maker 324, a lamp 326, a nightlight 328). Other examples of devices and/or systems include a system for controlling window blinds 330, devices for detecting or controlling states of one or more doors 332 (such as detecting if a door is open, detecting if a door is locked, or automatically locking a door), and a system for controlling a garage door 320 (e.g., control circuitry 334 integrated with a garage door opener for identifying an open or closed state of the garage door 320 and for causing the garage door opener to open or close the garage door 320). Communications between the control circuitry 334 and other devices can occur through a network (e.g., a LAN or the Internet) or as point-to-point communication (e.g., BLUETOOTH, radio communication, or a wired connection). Control circuitry 334 of different beds 302 can also communicate with different sets of devices. For example, a kid's bed may not communicate with and/or control the same devices as an adult bed. In some embodiments, the bed 302 can evolve with the age of the user such that the control circuitry 334 of the bed 302 communicates with different devices as a function of age of the user of that bed 302.

The control circuitry 334 can receive information and inputs from other devices/systems and use the received information and inputs to control actions of the bed 302 and/or other devices. For example, the control circuitry 334 can receive information from the thermostat 316 indicating a current environmental temperature for a house or room in which the bed 302 is located. The control circuitry 334 can use the received information (along with other information, such as signals detected from one or more sensors of the bed 302) to determine if a temperature of all or a portion of the surface of the bed 302 should be raised or lowered. The control circuitry 334 can then cause a heating or cooling mechanism of the bed 302 to raise or lower the temperature of the surface of the bed 302. The control circuitry 334 can also cause a heating or cooling unit of the house or room in which the bed 302 is located to raise or lower the ambient temperature surrounding the bed 302. Thus, by adjusting the temperature of the bed 302 and/or the room in which the bed 302 is located, the user 308 can experience more improved sleep quality and comfort.

As an example, the user 308 can indicate a desired sleeping temperature of 74 degrees while a second user of the bed 302 indicates a desired sleeping temperature of 72 degrees. The thermostat 316 can transmit signals indicating room temperature at predetermined times to the control circuitry 334. The thermostat 316 can also send a continuous stream of detected temperature values of the room to the control circuitry 334. The transmitted signal(s) can indicate to the control circuitry 334 that the current temperature of the bedroom is 72 degrees. The control circuitry 334 can identify that the user 308 has indicated a desired sleeping temperature of 74 degrees, and can accordingly send control signals to a heating pad located on the user 308's side of the bed to raise the temperature of the portion of the surface of the bed 302 where the user 308 is located until the user 308's desired temperature is achieved. Moreover, the control circuitry 334 can sent control signals to the thermostat 316 and/or a heating unit in the house to raise the temperature in the room in which the bed 302 is located.

The control circuitry 334 can generate control signals to control other devices and propagate the control signals to the other devices. The control signals can be generated based on information collected by the control circuitry 334, including information related to user interaction with the bed 302 by the user 308 and/or one or more other users. Information collected from other devices other than the bed 302 can also be used when generating the control signals. For example, information relating to environmental occurrences (e.g., environmental temperature, environmental noise level, and environmental light level), time of day, time of year, day of the week, or other information can be used when generating control signals for various devices in communication with the control circuitry 334 of the bed 302.

For example, information on the time of day can be combined with information relating to movement and bed presence of the user 308 to generate control signals for the lighting system 314. The control circuitry 334 can, based on detected pressure signals of the user 308 on the bed 302, determine when the user 308 is presently in the bed 302 and when the user 308 falls asleep. Once the control circuitry 334 determines that the user has fallen asleep, the control circuitry 334 can transmit control signals to the lighting system 314 to turn off lights in the room in which the bed 302 is located, to lower the window blinds 330 in the room, and/or to activate the nightlight 328. Moreover, the control circuitry 334 can receive input from the user 308 (e.g., via the user device 310) that indicates a time at which the user 308 would like to wake up. When that time approaches, the control circuitry 334 can transmit control signals to one or more devices in the environment 300 to control devices that may cause the user 308 to wake up. For example, the control signals can be sent to a home automation device that controls multiple devices in the home. The home automation device can be instructed, by the control circuitry 334, to raise the window blinds 330, turn off the nightlight 328, turn on lighting beneath the bed 302, start the coffee maker 324, change a temperature in the house via the thermostat 316, or perform some other home automation. The home automation device can also be instructed to activate an alarm that can cause the user 308 to wake up. Sometimes, the user 308 can input information at the user device 310 that indicates what actions can be taken by the home automation device or other devices in the environment 300.

In some implementations, rather than or in addition to providing control signals for other devices, the control circuitry 334 can provide collected information (e.g., information related to user movement, bed presence, sleep state, or biometric signals) to one or more other devices to allow the one or more other devices to utilize the collected information when generating control signals. For example, the control circuitry 334 of the bed 302 can provide information relating to user interactions with the bed 302 by the user 308 to a central controller (such as control box 124 described previously) that can use the provided information to generate control signals for various devices, including the bed 302.

The central controller can, for example, be a hub device that provides a variety of information about the user 308 and control information associated with the bed 302 and other devices in the house. The central controller can include sensors that detect signals that can be used by the control circuitry 334 and/or the central controller to determine information about the user 308 (e.g., biometric or other health data, sleep quality). The sensors can detect signals including such as ambient light, temperature, humidity, volatile organic compound(s), pulse, motion, and audio. These signals can be combined with signals detected by sensors of the bed 302 to determine accurate information about the user 308's health and sleep quality. The central controller can provide controls (e.g., user-defined, presets, automated, user initiated) for the bed 302, determining and viewing sleep quality and health information, a smart alarm clock, a speaker or other home automation device, a smart picture frame, a nightlight, and one or more mobile applications that the user 308 can install and use at the central controller. The central controller can include a display screen that outputs information and receives user input. The display can output information such as the user 308's health, sleep quality, weather, security integration features, lighting integration features, heating and cooling integration features, and other controls to automate devices in the house. The central controller can operate to provide the user 308 with functionality and control of multiple different types of devices in the house as well as the user 308's bed 302.

As an illustrative example of FIG. 3, the control circuitry 334 integrated with the pump 304 can detect a feature of a mattress of the bed 302, such as an increase in pressure in the air chamber 306*b*, and use this detected increase to determine that the user 308 is present on the bed 302. The control circuitry 334 may also identify a heartrate or respiratory rate for the user 308 to identify that the increased pressure is due to a person sitting, laying, or resting on the bed 302, rather than an inanimate object (e.g., a suitcase) having been placed on the bed 302. In some implementations, the information indicating user bed presence can be combined with other information to identify a current or future likely state for the user 308. For example, a detected user bed presence at 11:00 am can indicate that the user is sitting on the bed (e.g., to tie her shoes, or to read a book)

and does not intend to go to sleep, while a detected user bed presence at 10:00 pm can indicate that the user 308 is in bed for the evening and is intending to fall asleep soon. As another example, if the control circuitry 334 detects that the user 308 has left the bed 302 at 6:30 am (e.g., indicating that the user 308 has woken up for the day), and then later detects presence of the user 308 at 7:30 am on the bed 302, the control circuitry 334 can use this information that the newly detected presence is likely temporary (e.g., while the user 308 ties her shoes before heading to work) rather than an indication that the user 308 is intending to stay on the bed 302 for an extended period of time.

If the control circuitry 334 determines that the user 308 is likely to remain on the bed 302 for an extended period of time, the control circuitry 334 can determine one or more home automation controls that can aid the user 308 in falling asleep and experience improved sleep quality throughout the user 308's sleep cycle. For example, the control circuitry 334 can communicate with security system 318 to ensure that doors are locked. The control circuitry 334 can communicate with the oven 322 to ensure that the oven 322 is turned off. The control circuitry 334 can also communicate with the lighting system 314 to dim or otherwise turn off lights in the room in which the bed 302 is located and/or throughout the house, and the control circuitry 334 can communicate with the thermostat 316 to ensure that the house is at a desired temperature of the user 308. The control circuitry 334 can also determine one or more adjustments that can be made to the bed 302 to facilitate the user 308 falling asleep and staying asleep (e.g., changing a position of one or more regions of the bed 302, foot warming, massage features, pressure/firmness in one or more regions of the bed 302, etc.).

In some implementations, the control circuitry 334 may use collected information (including information related to user interaction with the bed 302 by the user 308, environmental information, time information, and user input) to identify use patterns for the user 308. For example, the control circuitry 334 can use information indicating bed presence and sleep states for the user 308 collected over a period of time to identify a sleep pattern for the user. The control circuitry 334 can identify that the user 308 generally goes to bed between 9:30 pm and 10:00 pm, generally falls asleep between 10:00 μm and 11:00 μm, and generally wakes up between 6:30 am and 6:45 am, based on information indicating user presence and biometrics for the user 308 collected over a week or a different time period. The control circuitry 334 can use identified patterns of the user 308 to better process and identify user interactions with the bed 302.

Given the above example user bed presence, sleep, and wake patterns for the user 308, if the user 308 is detected as being on the bed 302 at 3:00 μm, the control circuitry 334 can determine that the user 308's presence on the bed 302 is temporary, and use this determination to generate different control signals than if the control circuitry 334 determined the user 308 was in bed for the evening (e.g., at 3:00 pm, a head region of the bed 302 can be raised to facilitate reading or watching TV while in the bed 302, whereas in the evening, the bed 302 can be adjusted to a flat position to facilitate falling asleep). As another example, if the control circuitry 334 detects that the user 308 got out of bed at 3:00 am, the control circuitry 334 can use identified patterns for the user 308 to determine the user has gotten up temporarily (e.g., to use the bathroom, get a glass of water). The control circuitry 334 can turn on underbed lighting to assist the user 308 in carefully moving around the bed 302 and room. By contrast, if the control circuitry 334 identifies that the user 308 got out of the bed 302 at 6:40 am, the control circuitry 334 can determine the user 308 is up for the day and generate a different set of control signals (e.g., the control circuitry 334 can turn on lamp 326 near the bed 302 and/or raise the window blinds 330). For other users, getting out of the bed 302 at 3:00 am can be a normal wake-up time, which the control circuitry 334 can learn and respond to accordingly. Moreover, if the bed 302 is occupied by two users, the control circuitry 334 can learn and respond to the patterns of each of the users.

The bed 302 can also generate control signals based on communication with one or more devices. As an illustrative example, the control circuitry 334 can receive an indication from the television 312 that the television 312 is turned on. If the television 312 is located in a different room than the bed 302, the control circuitry 334 can generate a control signal to turn the television 312 off upon making a determination that the user 308 has gone to bed for the evening or otherwise is remaining in the room with the bed 302. If presence of the user 308 is detected on the bed 302 during a particular time range (e.g., between 8:00 μm and 7:00 am) and persists for longer than a threshold period of time (e.g., 10 minutes), the control circuitry 334 can determine the user 308 is in bed for the evening. If the television 312 is on, as described above, the control circuitry 334 can generate a control signal to turn the television 312 off. The control signals can be transmitted to the television (e.g., through a directed communication link or through a network, such as WIFI). As another example, rather than turning off the television 312 in response to detection of user bed presence, the control circuitry 334 can generate a control signal that causes the volume of the television 312 to be lowered by a pre-specified amount.

As another example, upon detecting that the user 308 has left the bed 302 during a specified time range (e.g., between 6:00 am and 8:00 am), the control circuitry 334 can generate control signals to cause the television 312 to turn on and tune to a pre-specified channel (e.g., the user 308 indicated a preference for watching morning news upon getting out of bed). The control circuitry 334 can accordingly generate and transmit the control signal to the television 312 (which can be stored at the control circuitry 334, the television 312, or another location). As another example, upon detecting that the user 308 has gotten up for the day, the control circuitry 334 can generate and transmit control signals to cause the television 312 to turn on and begin playing a previously recorded program from a digital video recorder (DVR) in communication with the television 312.

As another example, if the television 312 is in the same room as the bed 302, the control circuitry 334 may not cause the television 312 to turn off in response to detection of user bed presence. Rather, the control circuitry 334 can generate and transmit control signals to cause the television 312 to turn off in response to determining that the user 308 is asleep. For example, the control circuitry 334 can monitor biometric signals of the user 308 (e.g., motion, heartrate, respiration rate) to determine that the user 308 has fallen asleep. Upon detecting that the user 308 is sleeping, the control circuitry 334 generates and transmits a control signal to turn the television 312 off. As another example, the control circuitry 334 can generate the control signal to turn off the television 312 after a threshold period of time has passed since the user 308 has fallen asleep (e.g., 10 minutes after the user has fallen asleep). As another example, the control circuitry 334 generates control signals to lower the volume of the television 312 after determining that the user 308 is asleep. As yet another example, the control circuitry 334 generates and transmits a control signal to cause the television to gradually lower in volume over a period of time and then turn off in response to determining that the user 308 is asleep. Any of the control signals described above in reference to the television 312 can also be determined by the central controller previously described.

In some implementations, the control circuitry 334 can similarly interact with other media devices, such as computers, tablets, mobile phones, smart phones, wearable devices, stereo systems, etc. For example, upon detecting that the user 308 is asleep, the control circuitry 334 can generate and transmit a control signal to the user device 310 to cause the user device 310 to turn off, or turn down the volume on a video or audio file being played by the user device 310.

The control circuitry 334 can additionally communicate with the lighting system 314, receive information from the lighting system 314, and generate control signals for controlling functions of the lighting system 314. For example, upon detecting user bed presence on the bed 302 during a certain time frame (e.g., between 8:00 pm and 7:00 am) that lasts for longer than a threshold period of time (e.g., 10 minutes), the control circuitry 334 of the bed 302 can determine that the user 308 is in bed for the evening and generate control signals to cause lights in one or more rooms other than the room in which the bed 302 is located to switch off. The control circuitry 334 can generate and transmit control signals to turn off lights in all common rooms, but not in other bedrooms. As another example, the control signals can indicate that lights in all rooms other than the room in which the bed 302 is located are to be turned off, while one or more lights located outside of the house containing the bed 302 are to be turned on. The control circuitry 334 can generate and transmit control signals to cause the nightlight 328 to turn on in response to determining user 308 bed presence or that the user 308 is asleep. The control circuitry 334 can also generate first control signals for turning off a first set of lights (e.g., lights in common rooms) in response to detecting user bed presence, and second control signals for turning off a second set of lights (e.g., lights in the room where the bed 302 is located) when detecting that the user 308 is asleep.

In some implementations, in response to determining that the user 308 is in bed for the evening, the control circuitry 334 of the bed 302 can generate control signals to cause the lighting system 314 to implement a sunset lighting scheme in the room in which the bed 302 is located. A sunset lighting scheme can include, for example, dimming the lights (either gradually over time, or all at once) in combination with changing the color of the light in the bedroom environment, such as adding an amber hue to the lighting in the bedroom. The sunset lighting scheme can help to put the user 308 to sleep when the control circuitry 334 has determined that the user 308 is in bed for the evening. Sometimes, the control signals can cause the lighting system 314 to dim the lights or change color of the lighting in the bedroom environment, but not both.

The control circuitry 334 can also implement a sunrise lighting scheme when the user 308 wakes up in the morning. The control circuitry 334 can determine that the user 308 is awake for the day, for example, by detecting that the user 308 has gotten off the bed 302 (e.g., is no longer present on the bed 302) during a specified time frame (e.g., between 6:00 am and 8:00 am). The control circuitry 334 can also monitor movement, heartrate, respiratory rate, or other biometric signals of the user 308 to determine that the user 308 is awake or is waking up, even though the user 308 has not gotten out of bed. If the control circuitry 334 detects that the user is awake or waking up during a specified timeframe, the control circuitry 334 can determine that the user 308 is awake for the day. The specified timeframe can be, for example, based on previously recorded user bed presence information collected over a period of time (e.g., two weeks) that indicates that the user 308 usually wakes up for the day between 6:30 am and 7:30 am. In response to the control circuitry 334 determining that the user 308 is awake, the control circuitry 334 can generate control signals to cause the lighting system 314 to implement the sunrise lighting scheme in the bedroom in which the bed 302 is located. The sunrise lighting scheme can include, for example, turning on lights (e.g., the lamp 326, or other lights in the bedroom). The sunrise lighting scheme can further include gradually increasing the level of light in the room where the bed 302 is located (or in one or more other rooms). The sunrise lighting scheme can also include only turning on lights of specified colors. The sunrise lighting scheme can include lighting the bedroom with blue light to gently assist the user 308 in waking up and becoming active.

The control circuitry 334 may also generate different control signals for controlling actions of components depending on a time of day that user interactions with the bed 302 are detected. For example, the control circuitry 334 can use historical user interaction information to determine that the user 308 usually falls asleep between 10:00 μm and 11:00 μm and usually wakes up between 6:30 am and 7:30 am on weekdays. The control circuitry 334 can use this information to generate a first set of control signals for controlling the lighting system 314 if the user 308 is detected as getting out of bed at 3:00 am (e.g., turn on lights that guide the user 308 to a bathroom or kitchen) and to generate a second set of control signals for controlling the lighting system 314 if the user 308 is detected as getting out of bed after 6:30 am.

In some implementations, if the user 308 is detected as getting out of bed prior to a specified morning rise time for the user 308, the control circuitry 334 can cause the lighting system 314 to turn on lights that are dimmer than lights that are turned on by the lighting system 314 if the user 308 is detected as getting out of bed after the specified morning rise time. Causing the lighting system 314 to only turn on dim lights when the user 308 gets out of bed during the night (e.g., prior to normal rise time for the user 308) can prevent other occupants of the house from being woken up by the lights while still allowing the user 308 to see in order to reach their destination in the house.

The historical user interaction information for interactions between the user 308 and the bed 302 can be used to identify user sleep and awake timeframes. For example, user bed presence times and sleep times can be determined for a set period of time (e.g., two weeks, a month, etc.). The control circuitry 334 can identify a typical time range or timeframe in which the user 308 goes to bed, a typical timeframe for when the user 308 falls asleep, and a typical timeframe for when the user 308 wakes up (and in some cases, different timeframes for when the user 308 wakes up and when the user 308 actually gets out of bed). Buffer time may be added to these timeframes. For example, if the user is identified as typically going to bed between 10:00 μm and 10:30 pm, a buffer of a half hour in each direction can be added to the timeframe such that any detection of the user getting in bed between 9:30 pm and 11:00 pm is interpreted as the user 308 going to bed for the evening. As another example, detection of bed presence of the user 308 starting from a half hour before the earliest typical time that the user 308 goes to bed extending until the typical wake up time (e.g., 6:30 am) for the user 308 can be interpreted as the user 308 going to bed for the evening. For example, if the user 308 typically goes to bed between 10:00 μm and 10:30 pm, if the user 308's bed presence is sensed at 12:30 am one night, that can be interpreted as the user 308 getting into bed for the evening even though this is outside of the user 308's typical timeframe for going to bed because it has occurred prior to the user 308's normal wake up time. In some implementations, different timeframes are identified for different times of year (e.g., earlier bed time during winter vs. summer) or at different times of the week (e.g., user 308 wakes up earlier on weekdays than on weekends).

The control circuitry 334 can distinguish between the user 308 going to bed for an extended period (e.g., for the night) as opposed to being present on the bed 302 for a shorter period (e.g., for a nap) by sensing duration of presence of the user 308 (e.g., by detecting pressure and/or temperature signals of the user 308 on the bed 302 by sensors integrated into the bed 302). In some examples, the control circuitry 334 can distinguish between the user 308 going to bed for an extended period (e.g., for the night) versus going to bed for a shorter period (e.g., for a nap) by sensing duration of the user 308's sleep. The control circuitry 334 can set a time threshold whereby if the user 308 is sensed on the bed 302 for longer than the threshold, the user 308 is considered to have gone to bed for the night. In some examples, the threshold can be about 2 hours, whereby if the user 308 is sensed on the bed 302 for greater than 2 hours, the control circuitry 334 registers that as an extended sleep event. In other examples, the threshold can be greater than or less than two hours. The threshold can be determined based on historic trends indicating how long the user usually sleeps or otherwise stays on the bed 302.

The control circuitry 334 can detect repeated extended sleep events to automatically determine a typical bed time range of the user 308, without requiring the user 308 to enter a bed time range. This can allow the control circuitry 334 to accurately estimate when the user 308 is likely to go to bed for an extended sleep event, regardless of whether the user 308 typically goes to bed using a traditional sleep schedule or a non-traditional sleep schedule. The control circuitry 334 can then use knowledge of the bed time range of the user 308 to control one or more components (including components of the bed 302 and/or non-bed peripherals) based on sensing bed presence during the bed time range or outside of the bed time range.

The control circuitry 334 can automatically determine the bed time range of the user 308 without requiring user inputs. The control circuitry 334 may also determine the bed time range automatically and in combination with user inputs (e.g., using signals sensed by sensors of the bed 302 and/or the central controller). The control circuitry 334 can set the bed time range directly according to user inputs. The control circuitry 334 can associate different bed times with different days of the week. In each of these examples, the control circuitry 334 can control components (e.g., the lighting system 314, thermostat 316, security system 318, oven 322, coffee maker 324, lamp 326, nightlight 328), as a function of sensed bed presence and the bed time range.

The control circuitry 334 can also determine control signals to be transmitted to the thermostat 316 based on user-inputted preferences and/or maintaining improved or preferred sleep quality of the user 308. For example, the control circuitry 334 can determine, based on historic sleep patterns and quality of the user 308 and by applying machine learning models, that the user 308 experiences their best sleep when the bedroom is at 74 degrees. The control circuitry 334 can receive temperature signals from devices and/or sensors in the bedroom indicating a bedroom temperature. When the temperature is below 74 degrees, the control circuitry 334 can determine control signals that cause the thermostat 316 to activate a heating unit to raise the temperature to 74 degrees in the bedroom. When the temperature is above 74 degrees, the control circuitry 334 can determine control signals that cause the thermostat 316 to activate a cooling unit to lower the temperature back to 74 degrees. Sometimes, the control circuitry 334 can determine control signals that cause the thermostat 316 to maintain the bedroom within a temperature range intended to keep the user 308 in particular sleep states and/or transition to next preferred sleep states.

Similarly, the control circuitry 334 can generate control signals to cause heating or cooling elements on the surface of the bed 302 to change temperature at various times, either in response to user interaction with the bed 302, at various pre-programmed times, based on user preference, and/or in response to detecting microclimate temperatures of the user 308 on the bed 302. For example, the control circuitry 334 can activate a heating element to raise the temperature of one side of the surface of the bed 302 to 73 degrees when it is detected that the user 308 has fallen asleep. As another example, upon determining that the user 308 is up for the day, the control circuitry 334 can turn off a heating or cooling element. The user 308 can pre-program various times at which the temperature at the bed surface should be raised or lowered. As another example, temperature sensors on the bed surface can detect microclimates of the user 308. When a detected microclimate drops below a predetermined threshold temperature, the control circuitry 334 can activate a heating element to raise the user 308's body temperature, thereby improving the user 308's comfortability, maintaining their sleep cycle, transitioning the user 308 to a next preferred sleep state, and/or maintaining or improving the user 308's sleep quality.

In response to detecting user bed presence and/or that the user 308 is asleep, the control circuitry 334 can also cause the thermostat 316 to change the temperature in different rooms to different values. Other control signals are also possible, and can be based on user preference and user input. Moreover, the control circuitry 334 can receive temperature information from the thermostat 316 and use this information to control functions of the bed 302 or other devices (e.g., adjusting temperatures of heating elements of the bed 302, such as a foot warming pad). The control circuitry 334 may also generate and transmit control signals for controlling other temperature control systems, such as floor heating elements in the bedroom or other rooms.

The control circuitry 334 can communicate with the security system 318, receive information from the security system 318, and generate control signals for controlling functions of the security system 318. For example, in response to detecting that the user 308 in is bed for the evening, the control circuitry 334 can generate control signals to cause the security system 318 to engage or disengage security functions. As another example, the control circuitry 334 can generate and transmit control signals to cause the security system 318 to disable in response to determining that the user 308 is awake for the day (e.g., user 308 is no longer present on the bed 302).

The control circuitry 334 can also receive alerts from the security system 318 and indicate the alert to the user 308. For example, the security system can detect a security breach (e.g., someone opened the door 332 without entering the security code, someone opened a window when the security system 318 is engaged) and communicate the security breach to the control circuitry 334. The control circuitry 334 can then generate control signals to alert the user 308, such as causing the bed 302 to vibrate, causing portions of the bed 302 to articulate (e.g., the head section to raise or lower), causing the lamp 326 to flash on and off at regular intervals, etc. The control circuitry 334 can also alert the user 308 of one bed 302 about a security breach in another bedroom, such as an open window in a kid's bedroom. The control circuitry 334 can send an alert to a garage door controller (e.g., to close and lock the door). The control circuitry 334 can send an alert for the security to be disengaged. The control circuitry 334 can also set off a smart alarm or other alarm device/clock near the bed 302. The control circuitry 334 can transmit a push notification, text message, or other indication of the security breach to the user device 310. Also, the control circuitry 334 can transmit a notification of the security breach to the central controller, which can then determine one or more responses to the security breach.

The control circuitry 334 can additionally generate and transmit control signals for controlling the garage door 320 and receive information indicating a state of the garage door 320 (e.g., open or closed). The control circuitry 334 can also request information on a current state of the garage door 320. If the control circuitry 334 receives a response (e.g., from the garage door opener) that the garage door 320 is open, the control circuitry 334 can notify the user 308 that the garage door is open (e.g., by displaying a notification or other message at the user device 310, outputting a notification at the central controller), and/or generate a control signal to cause the garage door opener to close the door. The control circuitry 334 can also cause the bed 302 to vibrate, cause the lighting system 314 to flash lights in the bedroom, etc. Control signals can also vary depend on the age of the user 308. Similarly, the control circuitry 334 can similarly send and receive communications for controlling or receiving state information associated with the door 332 or the oven 322.

In some implementations, different alerts can be generated for different events. For example, the control circuitry 334 can cause the lamp 326 (or other lights, via the lighting system 314) to flash in a first pattern if the security system 318 has detected a breach, flash in a second pattern if garage door 320 is on, flash in a third pattern if the door 332 is open, flash in a fourth pattern if the oven 322 is on, and flash in a fifth pattern if another bed has detected that a user 308 of that bed has gotten up (e.g., a child has gotten out of bed in the middle of the night as sensed by a sensor in the child's bed). Other examples of alerts include a smoke detector detecting smoke (and communicating this detection to the control circuitry 334), a carbon monoxide tester, a heater malfunctioning, or an alert from another device capable of communicating with the control circuitry 334 and detecting an occurrence to bring to the user 308's attention.

The control circuitry 334 can also communicate with a system or device for controlling a state of the window blinds 330. For example, in response to determining that the user 308 is up for the day or that the user 308 set an alarm to wake up at a particular time, the control circuitry 334 can generate and transmit control signals to cause the window blinds 330 to open. By contrast, if the user 308 gets out of bed prior to a normal rise time for the user 308, the control circuitry 334 can determine that the user 308 is not awake for the day and may not generate control signals that cause the window blinds 330 to open. The control circuitry 334 can also generate and transmit control signals that cause a first set of blinds to close in response to detecting user bed presence and a second set of blinds to close in response to detecting that the user 308 is asleep.

As other examples, in response to determining that the user 308 is awake for the day, the control circuitry 334 can generate and transmit control signals to the coffee maker 324 to cause the coffee maker 324 to brew coffee. The control circuitry 334 can generate and transmit control signals to the oven 322 to cause the oven 322 to begin preheating. The control circuitry 334 can use information indicating that the user 308 is awake for the day along with information indicating that the time of year is currently winter and/or that the outside temperature is below a threshold value to generate and transmit control signals to cause a car engine block heater to turn on. The control circuitry 334 can generate and transmit control signals to cause devices to enter a sleep mode in response to detecting user bed presence, or in response to detecting that the user 308 is asleep (e.g., causing a mobile phone of the user 308 to switch into sleep or night mode so that notifications are muted to not disturb the user 308's sleep). Later, upon determining that the user 308 is up for the day, the control circuitry 334 can generate and transmit control signals to cause the mobile phone to switch out of sleep/night mode.

The control circuitry 334 can also communicate with one or more noise control devices. For example, upon determining that the user 308 is in bed for the evening, or that the user 308 is asleep (e.g., based on pressure signals received from the bed 302, audio/decibel signals received from audio sensors positioned on or around the bed 302), the control circuitry 334 can generate and transmit control signals to cause noise cancelation devices to activate. The noise cancelation devices can be part of the bed 302 or located in the bedroom. Upon determining that the user 308 is in bed for the evening or that the user 308 is asleep, the control circuitry 334 can generate and transmit control signals to turn the volume on, off, up, or down, for one or more sound generating devices, such as a stereo system radio, television, computer, tablet, mobile phone, etc.

Additionally, functions of the bed 302 can be controlled by the control circuitry 334 in response to user interactions. For example, the articulation controller can adjust the bed 302 from a flat position to a position in which a head portion of a mattress of the bed 302 is inclined upward (e.g., to facilitate a user sitting up in bed, reading, and/or watching television). Sometimes, the bed 302 includes multiple separately articulable sections. Portions of the bed corresponding to the locations of the air chambers **306*a* and 306*b* can be articulated independently from each other, to allow one person to rest in a first position (e.g., a flat position) while a second person rests in a second position (e.g., a reclining position with the head raised at an angle from the waist). Separate positions can be set for two different beds (e.g., two twin beds placed next to each other). The foundation of the bed 302 can include more than one zone that can be independently adjusted. The articulation controller can also provide different levels of massage to one or more users on the bed 302 or cause the bed to vibrate to communicate alerts to the user 308** as described above.

The control circuitry 334 can adjust positions (e.g., incline and decline positions for the user 308 and/or an additional user) in response to user interactions with the bed 302 (e.g., causing the articulation controller to adjust to a first recline position in response to sensing user bed presence). The control circuitry 334 can cause the articulation controller to adjust the bed 302 to a second recline position (e.g., a less reclined, or flat position) in response to determining that the user 308 is asleep. As another example, the control circuitry 334 can receive a communication from the television 312 indicating that the user 308 has turned off the television 312, and in response, the control circuitry 334 can cause the articulation controller to adjust the bed position to a preferred user sleeping position (e.g., due to the user turning off the television 312 while the user 308 is in bed indicating the user 308 wishes to go to sleep).

In some implementations, the control circuitry 334 can control the articulation controller to wake up one user without waking another user of the bed 302. For example, the user 308 and a second user can each set distinct wakeup times (e.g., 6:30 am and 7:15 am respectively). When the wakeup time for the user 308 is reached, the control circuitry 334 can cause the articulation controller to vibrate or change the position of only a side of the bed on which the user 308 is located. When the wakeup time for the second user is reached, the control circuitry 334 can cause the articulation controller to vibrate or change the position of only the side of the bed on which the second user is located. Alternatively, when the second wakeup time occurs, the control circuitry 334 can utilize other methods (such as audio alarms, or turning on the lights) to wake the second user since the user 308 is already awake and therefore will not be disturbed when the control circuitry 334 attempts to wake the second user.

Still referring to FIG. 3, the control circuitry 334 for the bed 302 can utilize information for interactions with the bed 302 by multiple users to generate control signals for controlling functions of various other devices. For example, the control circuitry 334 can wait to generate control signals for devices until both the user 308 and a second user are detected in the bed 302. The control circuitry 334 can generate a first set of control signals to cause the lighting system 314 to turn off a first set of lights upon detecting bed presence of the user 308 and generate a second set of control signals for turning off a second set of lights in response to detecting bed presence of a second user. The control circuitry 334 can also wait until it has been determined that both users are awake for the day before generating control signals to open the window blinds 330. One or more other home automation control signals can be determined and generated by the control circuitry 334, the user device 310, and/or the central controller.

In some implementations, one or more devices in the environment 300 include a room smoke detector 336. The room smoke detector 336 detects smoke in the environment 300. Smoke in the environment 300 can indicate a thermal event in or on the mattress and/or in the environment. The room smoke detector 336 can transmits a signal to the central controller (processor 136 of the control box 124) indicating the occurrence of the thermal event. The processor 136 will then transmit the command signal to the climate-control system 102 to stop operation of the heaters 104 and the fans 106. The room smoke detector 336 can also transmit the signal indicating the occurrence of the thermal event to the security system 318.

Examples of Data Processing Systems Associated with a Bed

Described are example systems and components for data processing tasks that are, for example, associated with a bed. In some cases, multiple examples of a particular component or group of components are presented. Some examples are redundant and/or mutually exclusive alternatives. Connections between components are shown as examples to illustrate possible network configurations for allowing communication between components. Different formats of connections can be used as technically needed/desired. The connections generally indicate a logical connection that can be created with any technologically feasible format. For example, a network on a motherboard can be created with a printed circuit board, wireless data connections, and/or other types of network connections. Some logical connections are not shown for clarity (e.g., connections with power supplies and/or computer readable memory).

Figure 4A:
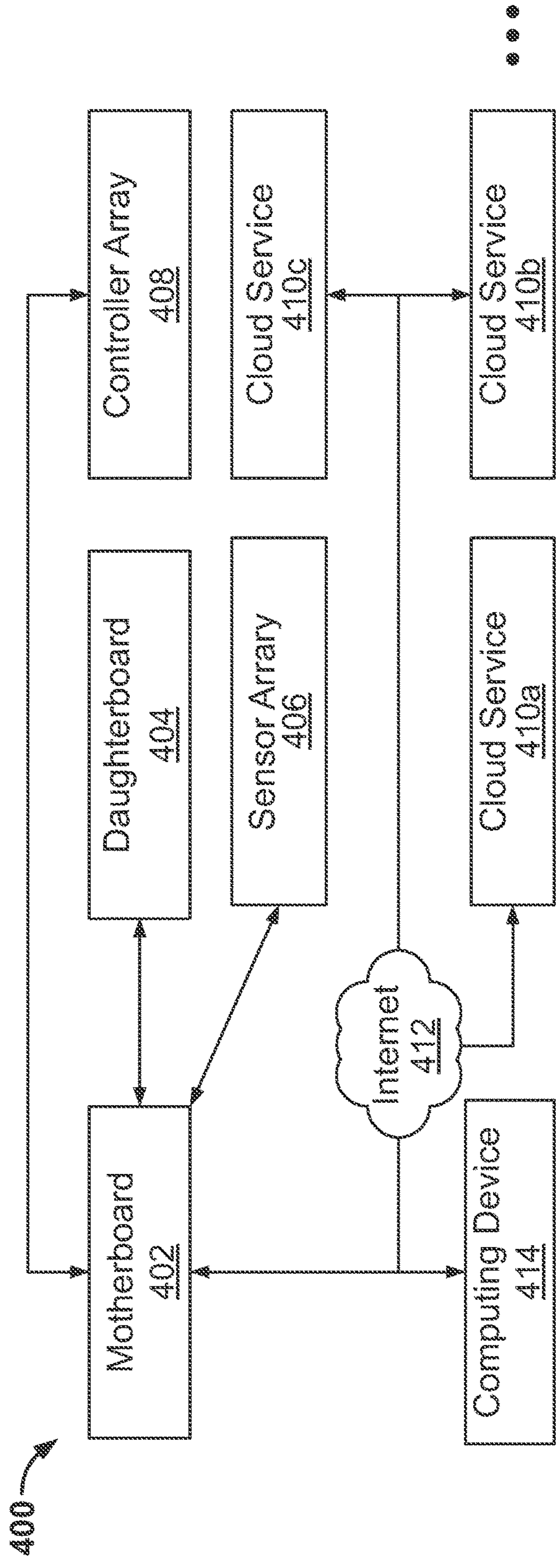
FIGS. 4A and 4B are block diagrams of example data processing systems that can be associated with a bed.

FIG. 4A is a block diagram of an example data processing system 400 that can be associated with a bed system, including those described above (e.g., see FIGS. 1-3). The system 400 includes a motherboard 402 and a daughterboard 404. The system 400 includes a sensor array 406 having one or more sensors configured to sense physical phenomenon of the environment and/or bed, and to report sensing back to the motherboard 402 (e.g., for analysis). In this implementation, the sensor array 406 can be the mechanical thermal detector 108 described herein. The sensor array 406 can include one or more different types of sensors, including but not limited to pressure, temperature, light, movement (e.g. motion), and audio. The system 400 also includes a controller array 408 that can include one or more controllers configured to control logic-controlled devices of the bed and/or environment (e.g., home automation devices, security systems light systems, and other devices described in FIG. 3). The motherboard 402 can be in communication with computing devices 414 and cloud services 410 over local networks (e.g., Internet 412) or otherwise as is technically appropriate.

In FIG. 4A, the motherboard 402 and daughterboard 404 are communicably coupled. They can be conceptually described as a center or hub of the system 400, with the other components conceptually described as spokes of the system 400. This can mean that each spoke component communicates primarily or exclusively with the motherboard 402. For example, a sensor such as the mechanical thermal detector 108 of the sensor array 406 may not be configured to, or may not be able to, communicate directly with a corresponding controller. Instead, the sensor can report a sensor reading to the motherboard 402, and the motherboard 402 can determine that, in response, a controller of the controller array 408 should adjust some parameters of a logic controlled device or otherwise modify a state of one or more peripheral devices.

One advantage of a hub-and-spoke network configuration, or a star-shaped network, is a reduction in network traffic compared to, for example, a mesh network with dynamic routing. If a particular sensor generates a large, continuous stream of traffic, that traffic is transmitted over one spoke to the motherboard 402. The motherboard 402 can marshal and condense that data to a smaller data format for retransmission for storage in a cloud service 410. Additionally or alternatively, the motherboard 402 can generate a single, small, command message to be sent down a different spoke in response to the large stream. For example, if the large stream of data is a pressure reading transmitted from the sensor array 406 a few times a second, the motherboard 402 can respond with a single command message to the controller array 408 to increase the pressure in an air chamber of the bed. In this case, the single command message can be orders of magnitude smaller than the stream of pressure readings.

As another advantage, a hub-and-spoke network configuration can allow for an extensible network that accommodates components being added, removed, failing, etc. This can allow more, fewer, or different sensors in the sensor array 406, controllers in the controller array 408, computing devices 414, and/or cloud services 410. For example, if a particular sensor fails or is deprecated by a newer version, the system 400 can be configured such that only the motherboard 402 needs to be updated about the replacement sensor. This can allow product differentiation where the same motherboard 402 can support an entry level product with fewer sensors and controllers, a higher value product with more sensors and controllers, and customer personalization where a customer can add their own selected components to the system 400.

Additionally, a line of air bed products can use the system 400 with different components. In an application in which every air bed in the product line includes both a central logic unit and a pump, the motherboard 402 (and optionally the daughterboard 404) can be designed to fit within a single, universal housing. For each upgrade of the product in the product line, additional sensors, controllers, cloud services, etc., can be added. Design, manufacturing, and testing time can be reduced by designing all products in a product line from this base, compared to a product line in which each product has a bespoke logic control system.

Each of the components discussed above can be realized in a wide variety of technologies and configurations. Below, some examples of each component are discussed. Sometimes, two or more components of the system 400 can be realized in a single alternative component; some components can be realized in multiple, separate components; and/or some functionality can be provided by different components.

Figure 4B:
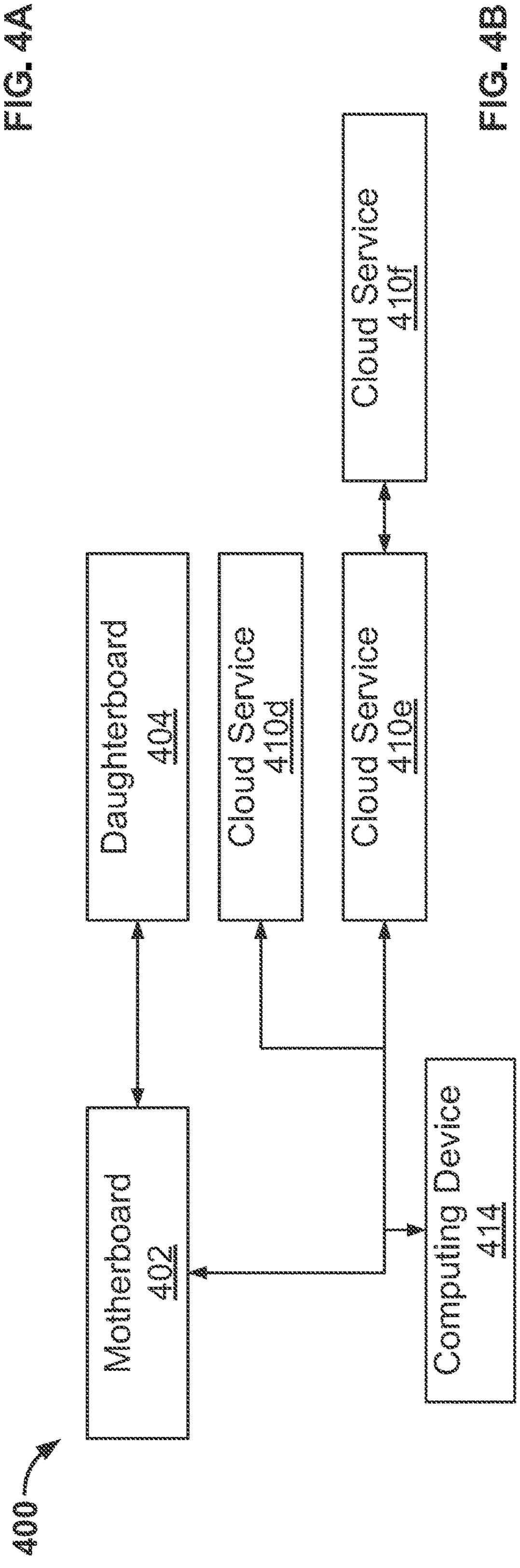

FIG. 4B is a block diagram showing communication paths of the system 400. As described, the motherboard 402 and daughterboard 404 may act as a hub of the system 400. When the daughterboard 404 communicates with cloud services 410 or other components, communications may be routed through the motherboard 402. This may allow the bed to have a single connection with the Internet 412. The computing device 414 may also have a connection to the Internet 412, possibly through the same gateway used by the bed and/or a different gateway (e.g., a cell service provider).

In FIG. 4B, cloud services 410*d* and 410*e* may be configured such that the motherboard 402 communicates with the cloud service directly (e.g., without having to use another cloud service 410 as an intermediary). Additionally or alternatively, some cloud services 410 (e.g., 410*f*) may only be reachable by the motherboard 402 through an intermediary cloud service (e.g., 410*e*). While not shown here, some cloud services 410 may be reachable either directly or indirectly by the pump motherboard 402.

Additionally, some or all of the cloud services 410 may communicate with other cloud services, including the transfer of data and/or remote function calls according to any technologically appropriate format. For example, one cloud service 410 may request a copy for another cloud service's 410 data (e.g., for purposes of backup, coordination, migration, calculations, data mining). Many cloud services 410 may also contain data that is indexed according to specific users tracked by the user account cloud 410*c* and/or the bed data cloud 410*a*. These cloud services 410 may communicate with the user account cloud 410*c* and/or the bed data cloud 410*a* when accessing data specific to a particular user or bed.

Figure 5:
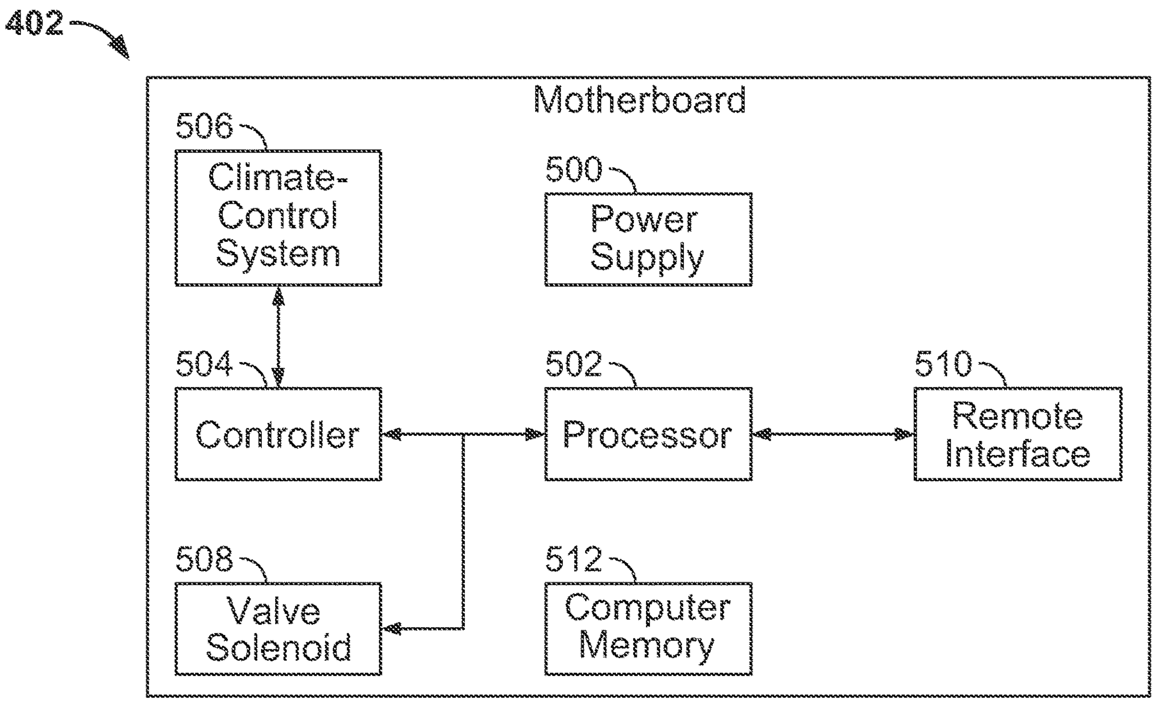
FIGS. 5 and 6 are block diagrams of examples of motherboards that can be used in a data processing system associated with a bed.

FIG. 5 is a block diagram of an example motherboard 402 in a data processing system associated with a bed system (e.g., refer to FIGS. 1-3). In this example, compared to other examples described below, this motherboard 402 consists of relatively fewer parts and can be limited to provide a relatively limited feature set.

The motherboard 402 includes a power supply 500, a processor 502, and computer memory 512. In general, the power supply 500 includes hardware used to receive electrical power from an outside source and supply it to components of the motherboard 402. The power supply may include a battery pack and/or wall outlet adapter, an AC to DC converter, a DC to AC converter, a power conditioner, a capacitor bank, and/or one or more interfaces for providing power in the current type, voltage, etc., needed by other components of the motherboard 402.

The processor 502 is generally a device for receiving input, performing logical determinations, and providing output. The processor 502 can be a central processing unit, a microprocessor, general purpose logic circuitry, application-specific integrated circuitry, a combination of these, and/or other hardware.

The memory 512 is generally one or more devices for storing data, which may include long term stable data storage (e.g., on a hard disk), short term unstable (e.g., on Random Access Memory), or any other technologically appropriate configuration.

The motherboard 402 includes a controller 504 (such as control box 124) and a system 506, such as the climate-control system 102 with heaters 104 and fans 106. The controller 504 can receive commands from the processor 502 to control functioning of the system 506. For example, the controller 504 can receive a command to increase or decrease the speed of the fan 106 pressure of an air chamber by 15 revolutions per minute (RPM) or increase or decrease the heat output of the heaters 104 by 100 watts.

When the system 506 is a pump motor, the controller 504 can receive commands from the processor 502 to control functioning of the system 506. For example, the controller 504 can receive a command to increase pressure of an air chamber by 0.3 pounds per square inch (PSI). The controller 504, in response, engages a valve so that the pump motor 506 pumps air into the selected air chamber, and can engage system 506 for a length of time that corresponds to 0.3 PSI or until a sensor indicates that pressure has been increased by 0.3 PSI. Sometimes, the message can specify that the chamber should be inflated to a target PSI, and the pump controller 504 can engage the system 506 until the target PSI is reached.

A valve solenoid 508 can control which air chamber a pump is connected to. In some cases, the solenoid 508 can be controlled by the processor 502 directly. In some cases, the solenoid 508 can be controlled by the pump controller 504.

A remote interface 510 of the motherboard 402 can allow the motherboard 402 to communicate with other components of a data processing system. For example, the motherboard 402 can be able to communicate with one or more daughterboards, with peripheral sensors, and/or with peripheral controllers through the remote interface 510. The remote interface 510 can provide any technologically appropriate communication interface, including but not limited to multiple communication interfaces such as WIFI, Bluetooth, and copper wired networks.

Figure 6:
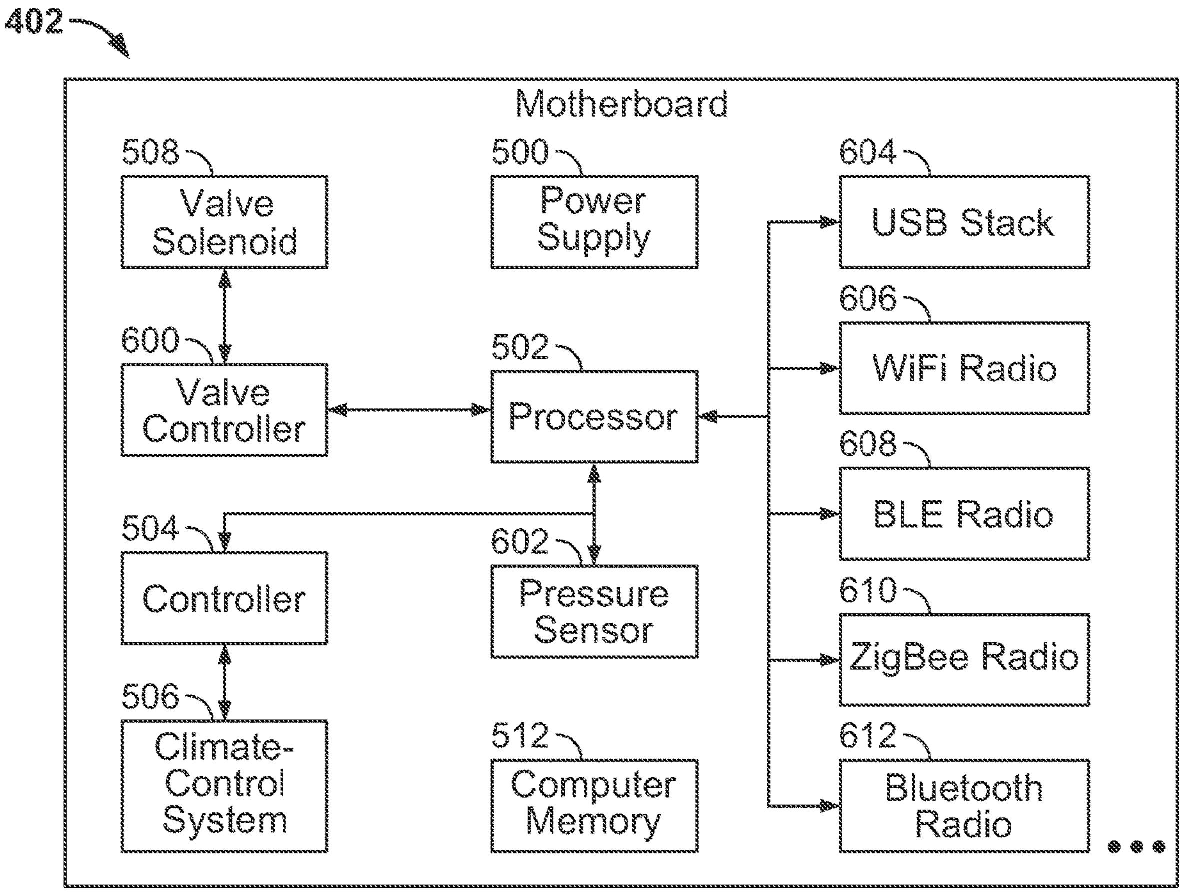

FIG. 6 is a block diagram of another example motherboard 402. Compared to the motherboard 402 in FIG. 5, the motherboard 402 in FIG. 6 can contain more components and provide more functionality in some applications.

This motherboard 402 can further include a valve controller 600, a pressure sensor 602, a universal serial bus (USB) stack 604, a WiFi radio 606, a Bluetooth Low Energy (BLE) radio 608, a ZigBee radio 610, a Bluetooth radio 612, and a computer memory 512.

The valve controller 600 can convert commands from the processor 502 into control signals for the valve solenoid 508. For example, the processor 502 can issue a command to the valve controller 600 to connect the pump to a particular air chamber out of a group of air chambers in an air bed. The valve controller 600 can control the position of the valve solenoid 508 so the pump is connected to the indicated air chamber.

The pressure sensor 602 can read pressure readings from one or more air chambers of the air bed. The pressure sensor 602 can also preform digital sensor conditioning. As described herein, multiple pressure sensors 602 can be included as part of the motherboard 402 or otherwise in communication with the motherboard 402.

The motherboard 402 can include a suite of network interfaces 604, 606, 608, 610, 612, etc., including but not limited to those shown in FIG. 6. These network interfaces can allow the motherboard to communicate over a wired or wireless network with any devices, including but not limited to peripheral sensors, peripheral controllers, computing devices, and devices and services connected to the Internet 412.

Figure 7:
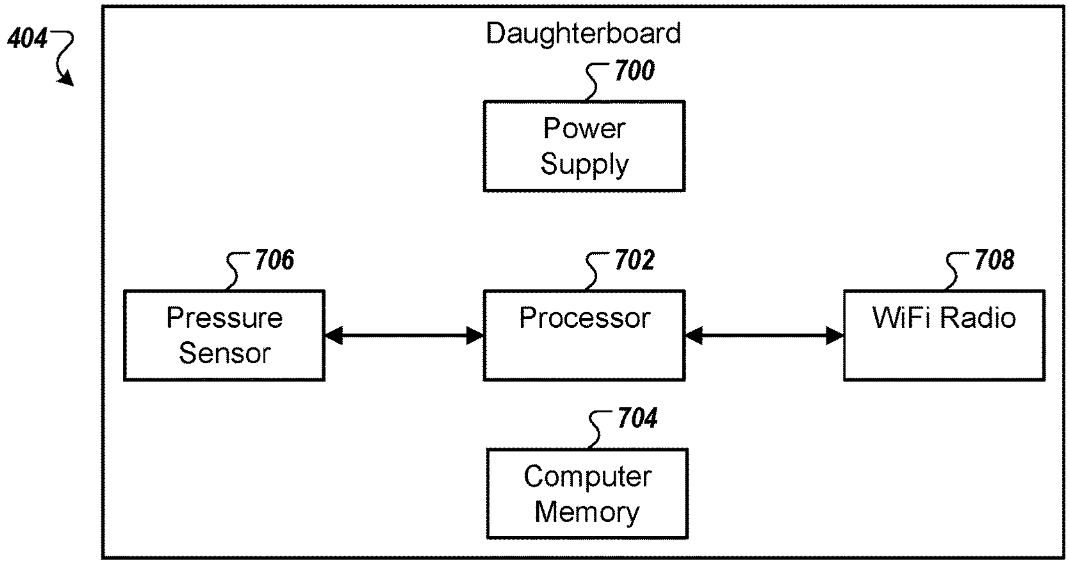
FIG. 7 is a block diagram of an example of a daughterboard that can be used in a data processing system associated with a bed.

FIG. 7 is a block diagram of an example daughterboard 404 used in a data processing system associated with a bed system described herein. One or more daughterboards 404 can be connected to the motherboard 402. Some daughterboards 404 can be designed to offload particular and/or compartmentalized tasks from the motherboard 402. This can be advantageous if the particular tasks are computationally intensive, proprietary, or subject to future revisions. For example, the daughterboard 404 can be used to calculate a particular sleep data metric. This metric can be computationally intensive, and calculating the metric on the daughterboard 404 can free up resources of the motherboard 402 while the metric is calculated. The sleep metric may be subject to future revisions. To update the system 400 with the new metric, it is possible that only the daughterboard 404 calculates the metric to be replaced. In this case, the same motherboard 402 and other components can be used, saving the need to perform unit testing of additional components instead of just the daughterboard 404.

The daughterboard 404 includes a power supply 700, a processor 702, computer readable memory 704, a pressure sensor 706, and a WiFi radio 708. The processor 702 can use the pressure sensor 706 to gather information about pressure of air bed chambers. The processor 702 can perform an algorithm to calculate a sleep metric (e.g., sleep quality, bed presence, whether the user fell asleep, a heartrate, a respiration rate, movement, etc.). Sometimes, the sleep metric can be calculated from only air chamber pressure. The sleep metric can also be calculated using signals from a variety of sensors (e.g., movement, pressure, temperature, and/or audio sensors). The processor 702 can receive that data from sensors that may be internal to the daughterboard 404, accessible via the WiFi radio 708, or otherwise in communication with the processor 702. Once the sleep metric is calculated, the processor 702 can report that sleep metric to, for example, the motherboard 402. The motherboard 402 can generate instructions for outputting the sleep metric to the user or using the sleep metric to determine other user information or controls to control the bed and/or peripheral devices.

Figure 8:
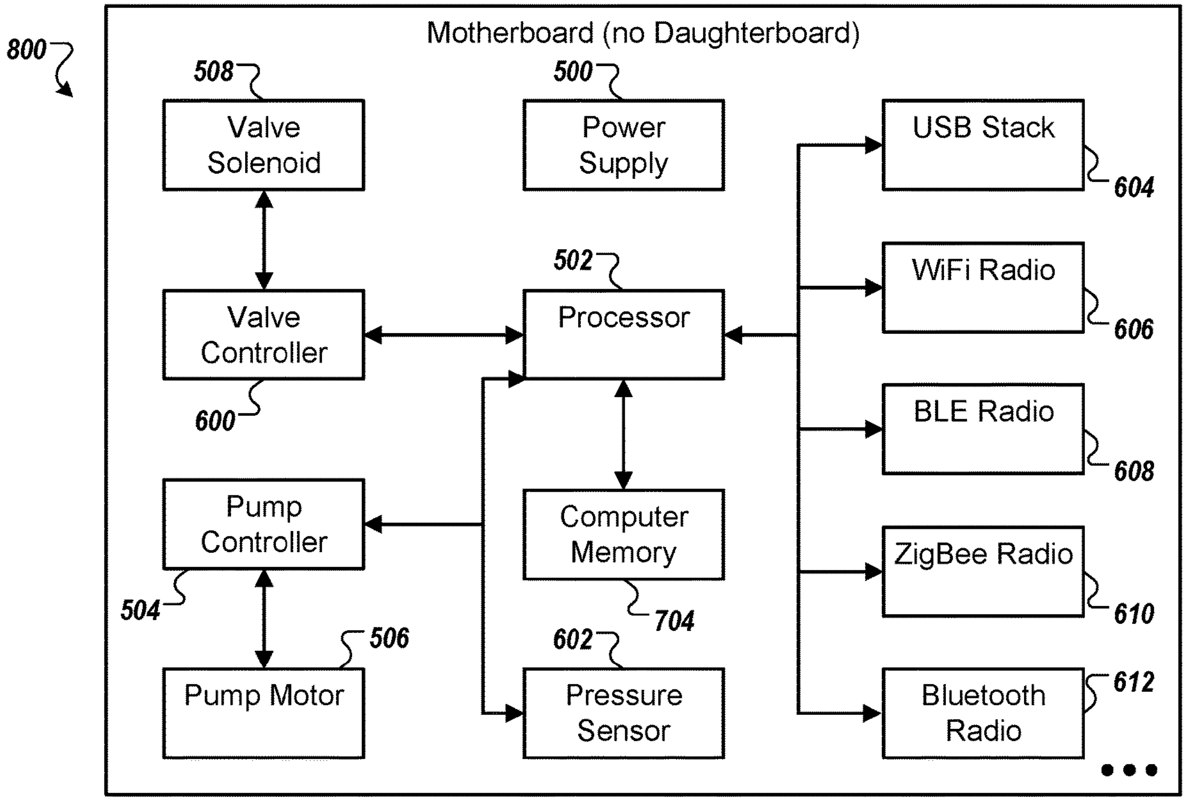
FIG. 8 is a block diagram of an example of a motherboard with no daughterboard that can be used in a data processing system associated with a bed.

FIG. 8 is a block diagram of an example motherboard 800 with no daughterboard used in a data processing system associated with a bed system. In this example, the motherboard 800 can perform most, all, or more of the features described with reference to the motherboard 402 in FIG. 6 and the daughterboard 404 in FIG. 7.

Figure 9A:
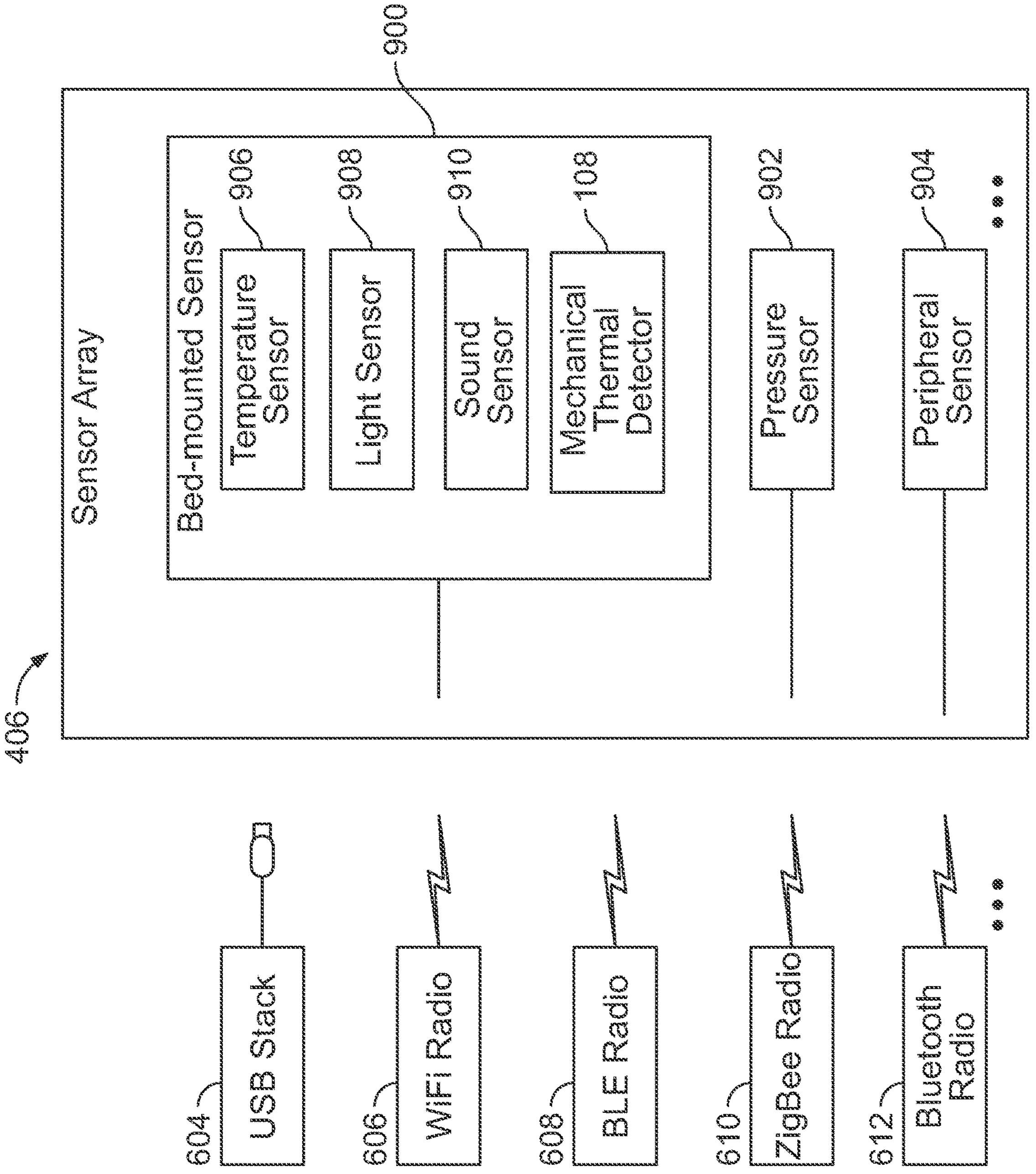
FIG. 9A is a block diagram of an example of a sensory array that can be used in a data processing system associated with a bed.

FIG. 9A is a block diagram of an example sensory array 406 used in a data processing system associated with a bed system described herein. The sensor array 406 is a conceptual grouping of some or all peripheral sensors that communicate with the motherboard 402 but are not native to the motherboard 402. The peripheral sensors 902, 904, 906, 908, 910, and the mechanical thermal detector of the sensor array 406 communicate with the motherboard 402 through one or more network interfaces 604, 606, 608, 610, and 612 of the motherboard, as is appropriate for the configuration of the particular sensor. For example, a sensor that outputs a reading over a USB cable can communicate through the USB stack 604.

Some peripheral sensors of the sensor array 406 can be bed mounted sensors 900 (e.g., temperature sensor 906, light sensor 908, sound sensor 910, and the mechanical thermal detector 108). The bed mounted sensors 900 can be embedded into a bed structure and sold with the bed, or later affixed to the structure (e.g., part of a pressure sensing pad that is removably installed on a top surface of the bed, part of a temperature sensing or heating pad that is removably installed on the top surface of the bed, integrated into the top surface, attached along connecting tubes between a pump and air chambers, within air chambers, attached to a headboard, attached to one or more regions of an adjustable foundation). One or more of the sensors 902 can be load cells or force sensors as described in FIG. 9C. Other sensors 902 and 904 may not be mounted to the bed and can include a pressure sensor 902 and/or peripheral sensor 904. For example, the sensors 902 and 904 can be integrated or otherwise part of a user mobile device (e.g., mobile phone, wearable device). The sensors 902 and 904 can also be part of a central controller for controlling the bed and peripheral devices. Sometimes, the sensors 902 and 904 can be part of one or more home automation devices or other peripheral devices.

Sometimes, some or all of the bed mounted sensors 900 and/or sensors 902 and 904 share networking hardware (e.g., a conduit that contains wires from each sensor, a multi-wire cable or plug that, when affixed to the motherboard 402, connect all the associated sensors with the motherboard 402). One, some, or all the sensors 902, 904, 906, 908, 910, and the mechanical thermal detector 108 can sense features of a mattress (e.g., pressure, temperature, light, sound, thermal events, and/or other features) and features external to the mattress. Sometimes, pressure sensor 902 can sense pressure of the mattress while some or all the sensors 902, 904, 906, 908, and 910 sense features of the mattress and/or features external to the mattress.

Figure 9B:
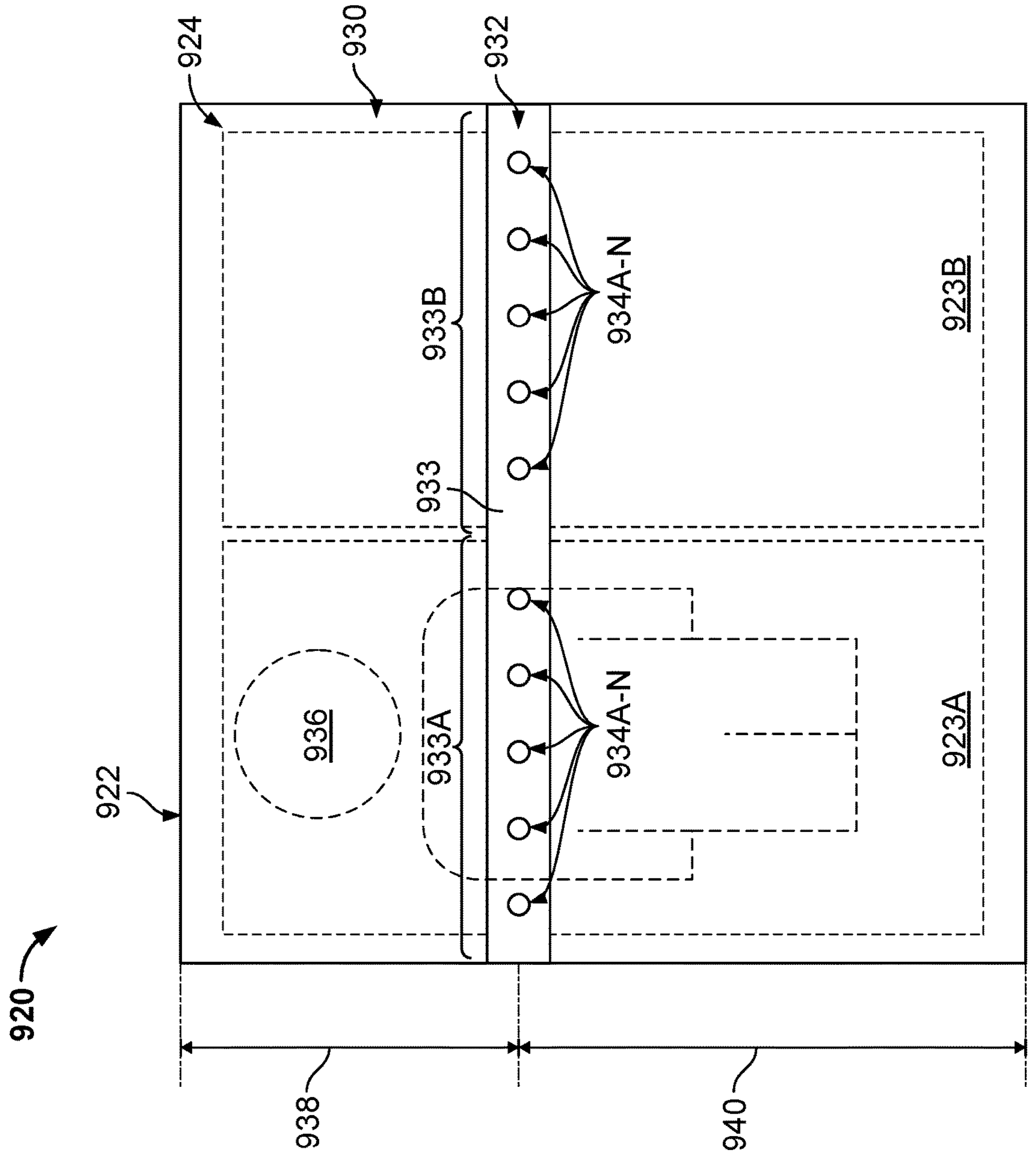
FIG. 9B is a schematic top view of a bed having an example of a sensor strip with one or more sensors that can be used in a data processing system associated with the bed.

FIG. 9B is a schematic top view of a bed 920 having a sensor strip 932 with sensors 934A-N used in a data processing system associated with the bed 920. The bed 920 includes a mattress 922 (e.g., refer to FIG. 1). The mattress 922 can have a foam tub 930 beneath a top of the mattress 922. The foam tub 930 can have air chamber 923A and/or 923B, similar to those described herein.

The sensor strip 932 can be attached across the mattress top 924 from one lateral side to an opposing lateral side (e.g., from left to right). The sensor strip 932 can be attached proximate to a head section of the mattress 922 to measure temperature and/or humidity values around a chest area of a user 936. The sensor strip 932 can also be placed at a center point (e.g., midpoint) of the mattress 922 such that the distances 938 and 940 are equal to each other. The sensor strip 932 can be placed at other locations to capture temperature and/or humidity values at the top of the mattress 922.

The sensors 934A-N can be any one or more of the temperature sensors 906 described in FIG. 9A. The sensor strip 932 can also include a carrier strip 933 having a first strip portion 933A and a second strip portion 933B. The carrier strip 933 can be releasably attached to the foam tub layer 920 and extend between the opposite lateral ends of the foam tub 920. The sensor strip 932 can have first sensors 934A-N and second sensors 934A-N. Each of the first and second sensors 934A-N can have five sensors each. For example, a sensor strip 932 for a king or queen size mattress can have a total of ten sensors. When the user 936 is positioned on top of the mattress 922 over the air chamber 923A, the first sensors 934A-N can measure temperature and/or humidity of the mattress top 924 above the air chamber 923A. Those values can be used to, for example, determine a conditioned airflow to supply to the air chamber 923A. Temperature and/or humidity values measured by the second sensors 934A-N can be used to, for example, determine a conditioned airflow to supply to the air chamber 923B. The bed system 920 can provide for custom airflow to different portions of the mattress 922 based on body temperatures of users and/or temperatures of different portions of the mattress top 924.

Sometimes, two separate sensor strips can be attached to the mattress 922 (e.g., a first sensor strip over the air chamber 923A and a second sensor strip, separate from the first sensor strip, over the air chamber 923B). The first and second sensor strips can be attached to a center of the mattress top 924 via fastening elements, such as adhesive. The sensor strip 932 can also be easily replaced with another sensor strip.

Figure 9C:
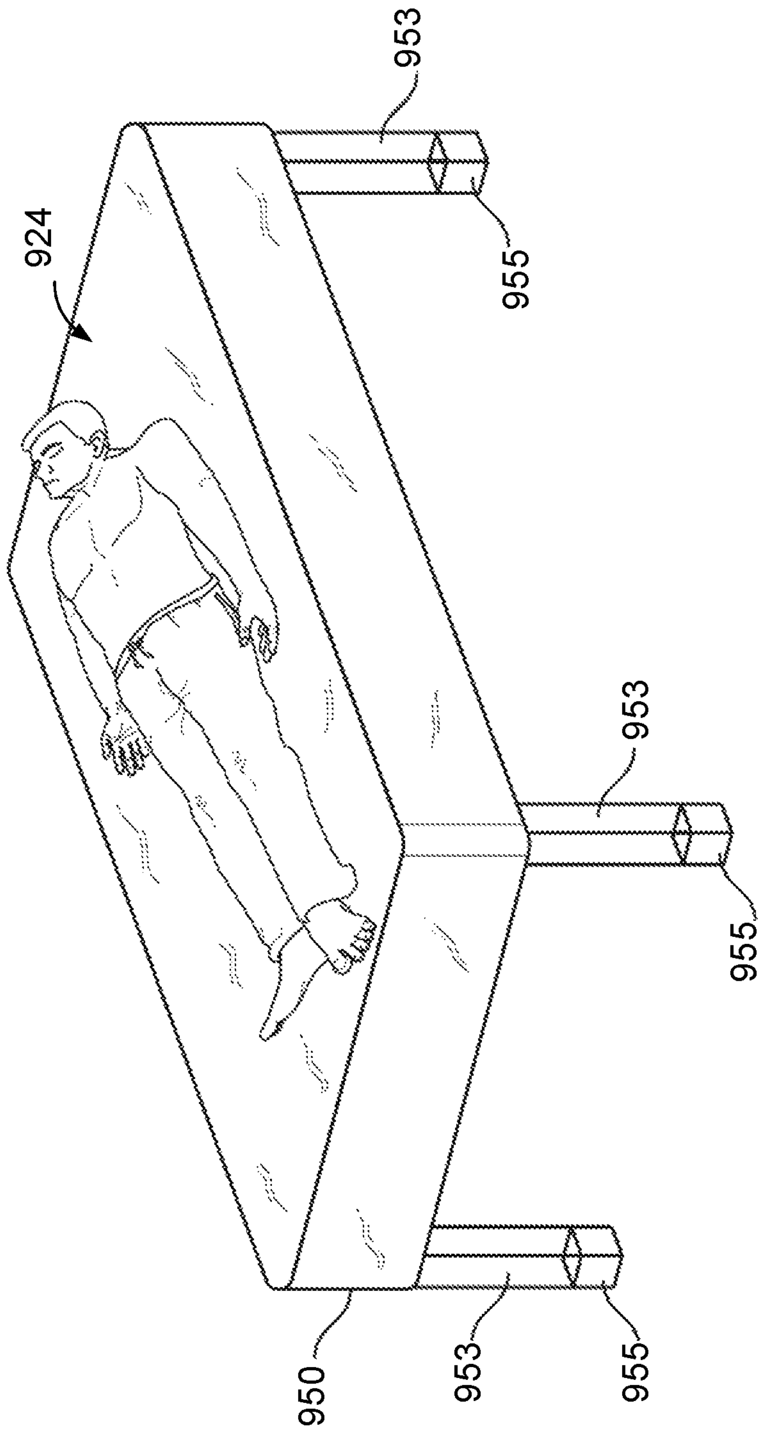
FIG. 9C is a schematic diagram of an example bed with force sensors located at the bottom of legs of the bed.

FIG. 9C is a schematic diagram of an example bed with force sensors 955 located at the bottom of legs 953 of the bed (e.g., in four, six, eight, or another number of legs). The force sensors 955 may also be located elsewhere on the bed with similar effect (e.g., between the legs 953 and platform 950). When a strain gauge is used as the force sensors 955, the force sensor(s) 955 can be positioned nearer centers of the legs 953. The force sensors 955 can be load cells.

Figure 10:
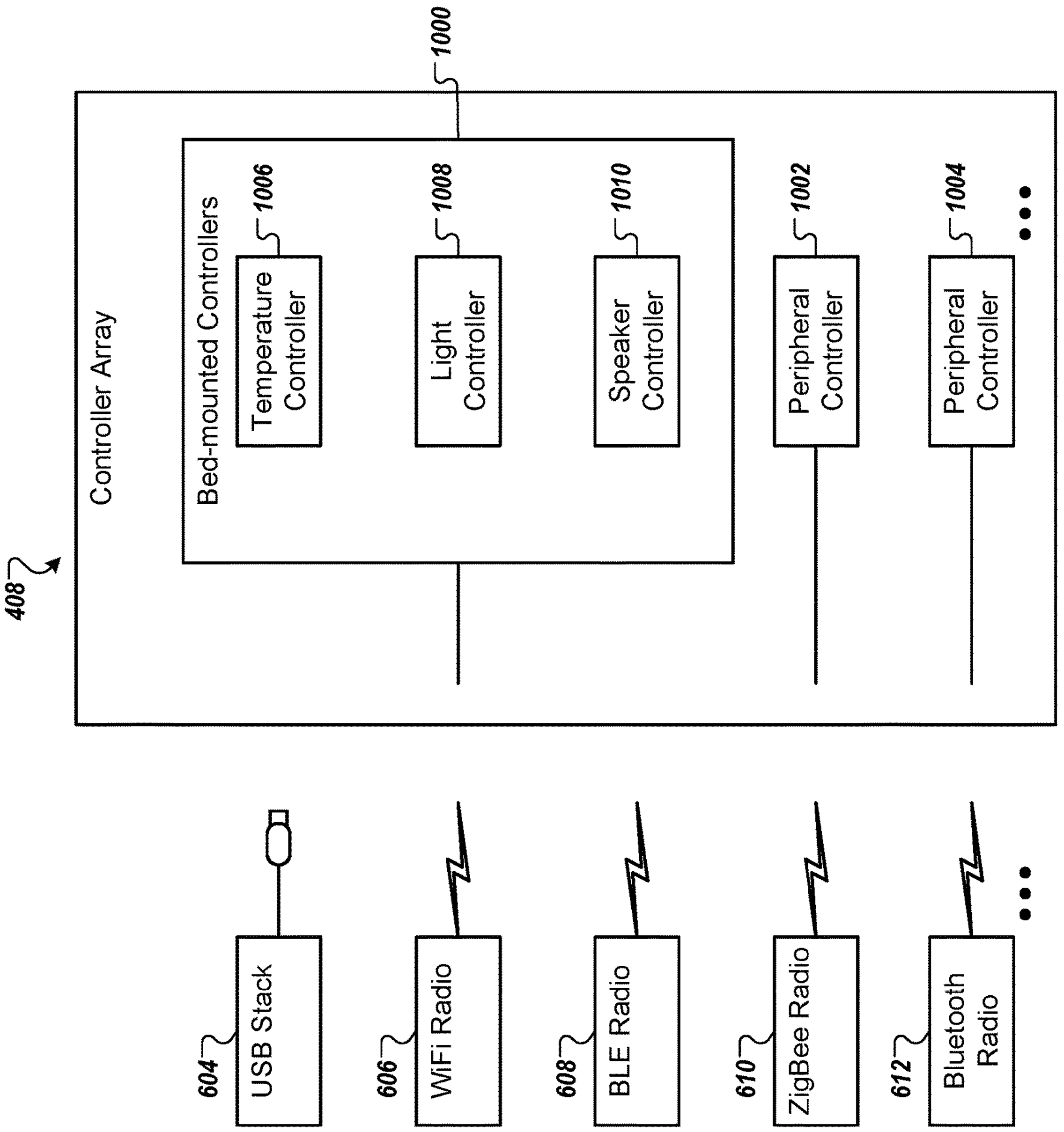
FIG. 10 is a block diagram of an example of a control array that can be used in a data processing system associated with a bed

FIG. 10 is a block diagram of an example controller array 408 used in a data processing system associated with a bed system. The controller array 408 is a conceptual grouping of some or all peripheral controllers that communicate with the motherboard 402 but are not native to the motherboard 402. The peripheral controllers can communicate with the motherboard 402 through one or more of the network interfaces 604, 606, 608, 610, and 612 of the motherboard, as is appropriate for the configuration of the particular controller. Some of the controllers can be bed mounted controllers 1000, such as a temperature controller 1006, a light controller 1010, and a speaker controller 1010, as described in reference to bed-mounted sensors in FIG. 9A. Peripheral controllers 1002 and 1004 can be in communication with the motherboard 402, but optionally not mounted to the bed.

Figure 11:
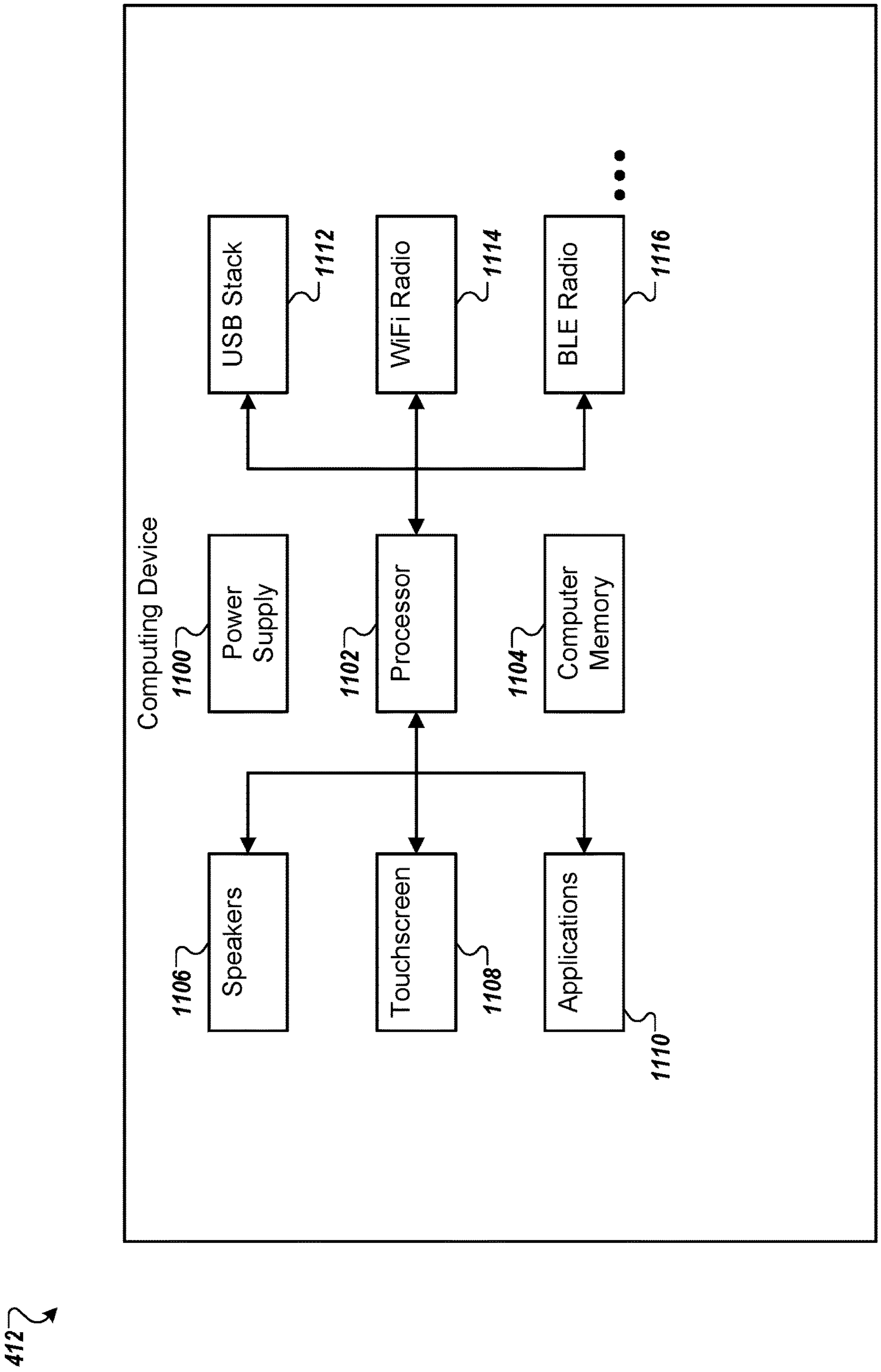
FIG. 11 is a block diagram of an example of a computing device that can be used in a data processing system associated with a bed.

FIG. 11 is a block diagram of an example computing device 412 used in a data processing system associated with a bed system. The computing device 412 can include computing devices used by a user of a bed including but not limited to mobile computing devices (e.g., mobile phones, tablet computers, laptops, smart phones, wearable devices), desktop computers, home automation devices, and/or central controllers or other hub devices.

The computing device 412 includes a power supply 1100, a processor 1102, and computer readable memory 1104. User input and output can be transmitted by speakers 1106, a touchscreen 1108, or other not shown components (e.g., a pointing device or keyboard). The computing device 412 can run applications 1110 including, for example, applications to allow the user to interact with the system 400. These applications can allow a user to view information about the bed (e.g., sensor readings, sleep metrics), information about themselves (e.g., health conditions detected based on signals sensed at the bed), and/or configure the system 400 behavior (e.g., set desired firmness, set desired behavior for peripheral devices). The computing device 412 can be used in addition to, or to replace, the remote control 122 described above.

Figure 12:
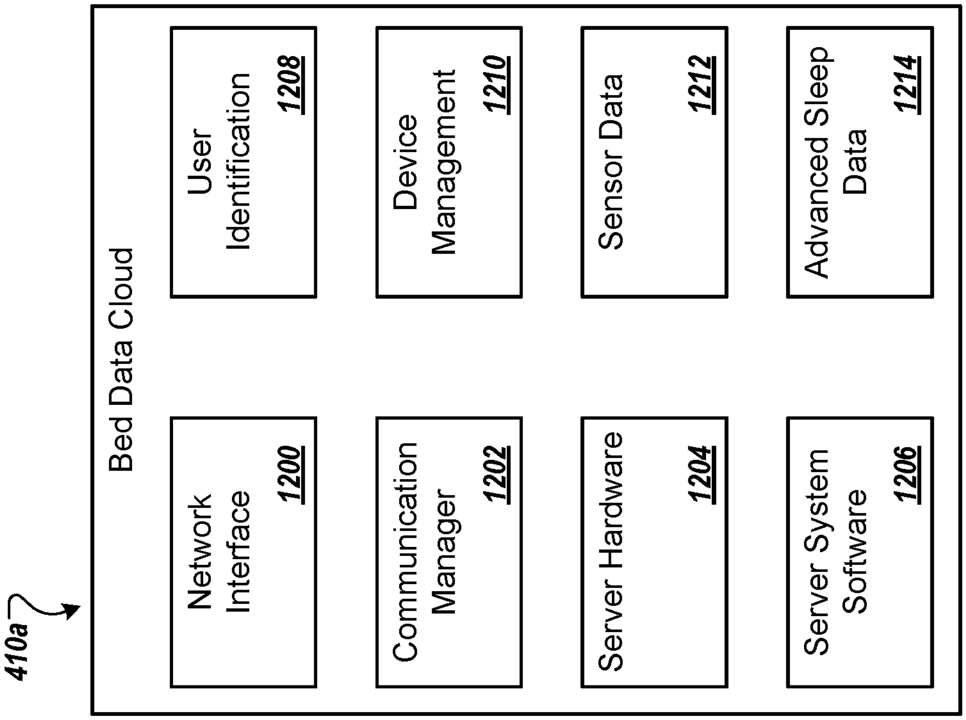

FIG. 12 is a block diagram of an example bed data cloud service 410*a* used in a data processing system associated with a bed system. Here, the bed data cloud service 410*a* is configured to collect sensor data and sleep data from a particular bed, and to match the data with one or more users that used the bed when the data was generated.

The bed data cloud service 410*a* includes a network interface 1200, a communication manager 1202, server hardware 1204, and server system software 1206. The bed data cloud service 410*a* is also shown with a user identification module 1208, a device management 1210 module, a sensor data module 1210, and an advanced sleep data module 1214. The network interface 1200 includes hardware and low level software to allow hardware devices (e.g., components of the service 410*a*) to communicate over networks (e.g., with each other, with other destinations over the Internet 412). The network interface 1200 can include network cards, routers, modems, and other hardware.

The communication manager 1202 generally includes hardware and software that operate above the network interface 1200 such as software to initiate, maintain, and tear down network communications used by the service 410*a* (e.g., TCP/IP, SSL or TLS, Torrent, and other communication sessions over local or wide area networks). The communication manager 1202 can also provide load balancing and other services to other elements of the service 410*a*. The server hardware 1204 generally includes physical processing devices used to instantiate and maintain the service 410*a*. This hardware includes, but is not limited to, processors (e.g., central processing units, ASICs, graphical processers) and computer readable memory (e.g., random access memory, stable hard disks, tape backup). One or more servers can be configured into clusters, multi-computer, or datacenters that can be geographically separate or connected. The server system software 1206 generally includes software that runs on the server hardware 1204 to provide operating environments to applications and services (e.g., operating systems running on real servers, virtual machines instantiated on real servers to create many virtual servers, server level operations such as data migration, redundancy, and backup).

The user identification 1208 can include, or reference, data related to users of beds with associated data processing systems. The users may include customers, owners, or other users registered with the service 410*a* or another service. Each user can have a unique identifier, user credentials, contact information, billing information, demographic information, or any other technologically appropriate information.

The device manager 1210 can include, or reference, data related to beds or other products associated with data processing systems. The beds can include products sold or registered with a system associated with the service 410*a*.

Each bed can have a unique identifier, model and/or serial number, sales information, geographic information, delivery information, a listing of associated sensors and control peripherals, etc. An index or indexes stored by the service 410*a* can identify users associated with beds. This index can record sales of a bed to a user, users that sleep in a bed, etc.

The sensor data 1212 can record raw or condensed sensor data recorded by beds with associated data processing systems. For example, a bed's data processing system can have temperature, pressure, motion, audio, and/or light sensors. Readings from these sensors, either in raw form or in a format generated from the raw data (e.g. sleep metrics), can be communicated by the bed's data processing system to the service 410*a* for storage in the sensor data 1212. An index or indexes stored by the service 410*a* can identify users and/or beds associated with the sensor data 1212.

The service 410*a* can use any of its available data (e.g., sensor data 1212) to generate advanced sleep data 1214. The advanced sleep data 1214 includes sleep metrics and other data generated from sensor readings (e.g., health information). Some of these calculations can be performed in the service 410*a* instead of locally on the bed's data processing system because the calculations can be computationally complex or require a large amount of memory space or processor power that may not be available on the bed's data processing system. This can help allow a bed system to operate with a relatively simple controller while being part of a system that performs relatively complex tasks and computations.

For example, the service 410*a* can retrieve one or more machine learning models from a remote data store and use those models to determine the advanced sleep data 1214. The service 410*a* can retrieve one or more models to determine overall sleep quality of the user based on currently detected sensor data 1212 and/or historic sensor data. The service 410*a* can retrieve other models to determine whether the user is snoring based on the detected sensor data 1212. The service 410*a* can retrieve other models to determine whether the user experiences a health condition based on the data 1212.

Figure 13:
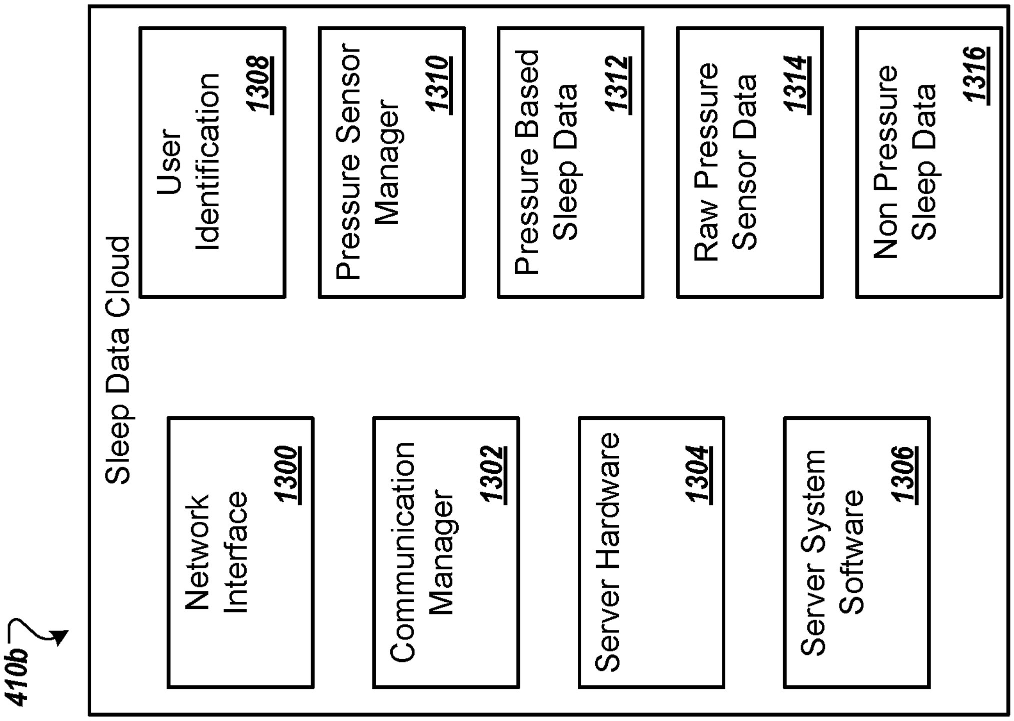
FIGS. 12-16 are block diagrams of example cloud services that can be used in a data processing system associated with a bed.

FIG. 13 is a block diagram of an example sleep data cloud service 410*b* used in a data processing system associated with a bed system. Here, the sleep data cloud service 410*b* is configured to record data related to users' sleep experience. The service 410*b* includes a network interface 1300, a communication manager 1302, server hardware 1304, and server system software 1306. The service 410*b* also includes a user identification module 1308, a pressure sensor manager 1310, a pressure based sleep data module 1312, a raw pressure sensor data module 1314, and a non-pressure sleep data module 1316. Sometimes, the service 410*b* can include a sensor manager for each sensor. The service 410*b* can also include a sensor manager that relates to multiple sensors in beds (e.g., a single sensor manager can relate to pressure, temperature, light, movement, and audio sensors in a bed).

The pressure sensor manager 1310 can include, or reference, data related to the configuration and operation of pressure sensors in beds. This data can include an identifier of the types of sensors in a particular bed, their settings and calibration data, etc. The pressure based sleep data 1312 can use raw pressure sensor data 1314 to calculate sleep metrics tied to pressure sensor data. For example, user presence, movements, weight change, heartrate, and breathing rate can be determined from raw pressure sensor data 1314. An index or indexes stored by the service 410*b* can identify users associated with pressure sensors, raw pressure sensor data, and/or pressure based sleep data. The non-pressure sleep data 1316 can use other sources of data to calculate sleep metrics. User-entered preferences, light sensor readings, and sound sensor readings can be used to track sleep data. User presence can also be determined from a combination of raw pressure sensor data 1314 and non-pressure sleep data 1316 (e.g., raw temperature data). Sometimes, bed presence can be determined using only the temperature data. Changes in temperature data can be monitored to determine bed presence or absence in a temporal interval (e.g., window of time) of a given duration. The temperature and/or pressure data can also be combined with other sensing modalities or motion sensors that reflect different forms of movement (e.g., load cells) to accurately detect user presence. For example, the temperature and/or pressure data can be provided as input to a bed presence classifier, which can determine user bed presence based on real-time or near real-time data collected at the bed. The classifier can be trained to differentiate the temperature data from the pressure data, identify peak values in the temperature and pressure data, and generate a bed presence indication based on correlating the peak values. The peak values can be within a threshold distance from each other to then generate an indication that the user is in the bed. An index or indexes stored by the service 410*b* can identify users associated with sensors and/or the data 1316.

Figure 14:
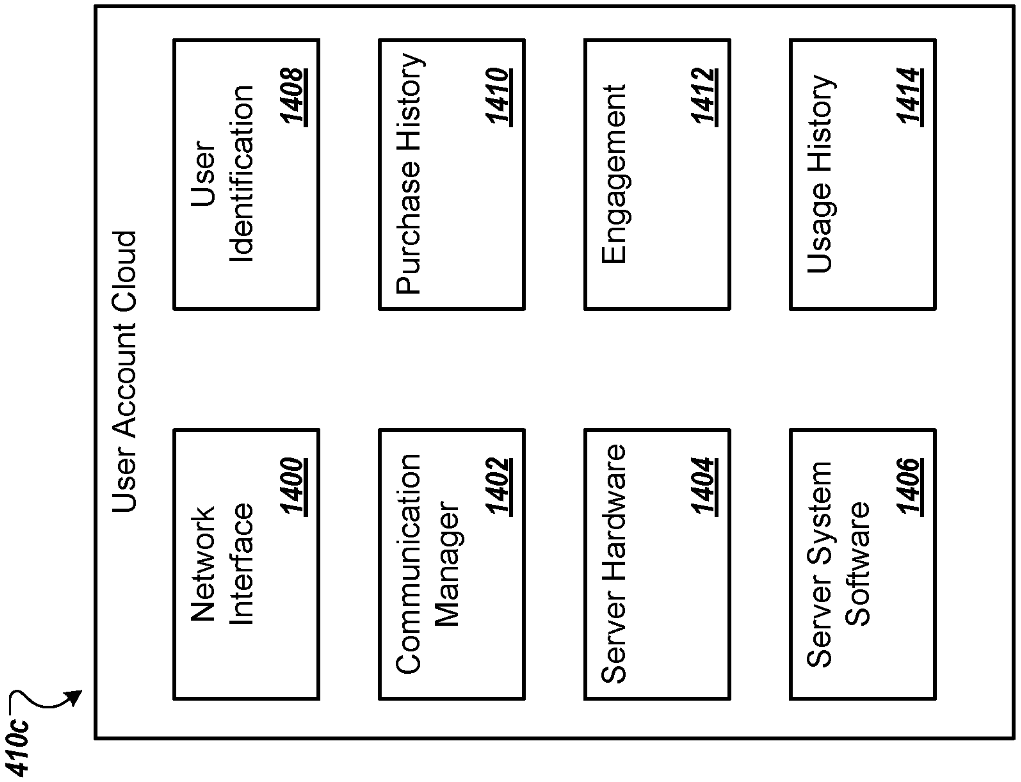

FIG. 14 is a block diagram of an example user account cloud service 410*c* used in a data processing system associated with a bed system. Here, the service 410*c* is configured to record a list of users and to identify other data related to those users. The service 410*c* includes a network interface 1400, a communication manager 1402, server hardware 1404, and server system software 1406. The service 410*c* also includes a user identification module 1408, a purchase history module 1410, an engagement module 1412, and an application usage history module 1414.

The user identification module 1408 can include, or reference, data related to users of beds with associated data processing systems, as described above. The purchase history module 1410 can include, or reference, data related to purchases by users. The purchase data can include a sale's contact information, billing information, and salesperson information associated with the user's purchase of the bed system. An index or indexes stored by the service 410*c* can identify users associated with a bed purchase.

The engagement module 1412 can track user interactions with the manufacturer, vendor, and/or manager of the bed/cloud services. This data can include communications (e.g., emails, service calls), data from sales (e.g., sales receipts, configuration logs), and social network interactions. The data can also include servicing, maintenance, or replacements of components of the user's bed system. The usage history module 1414 can contain data about user interactions with applications and/or remote controls of the bed. A monitoring and configuration application can be distributed to run on, for example, computing devices 412 described herein. The application can log and report user interactions for storage in the application usage history module 1414. An index or indexes stored by the service 410*c* can also identify users associated with each log entry. User interactions stored in the module 1414 can optionally be used to determine or predict user preferences and/or settings for the user's bed and/or peripheral devices that can improve the user's overall sleep quality.

Figure 15:
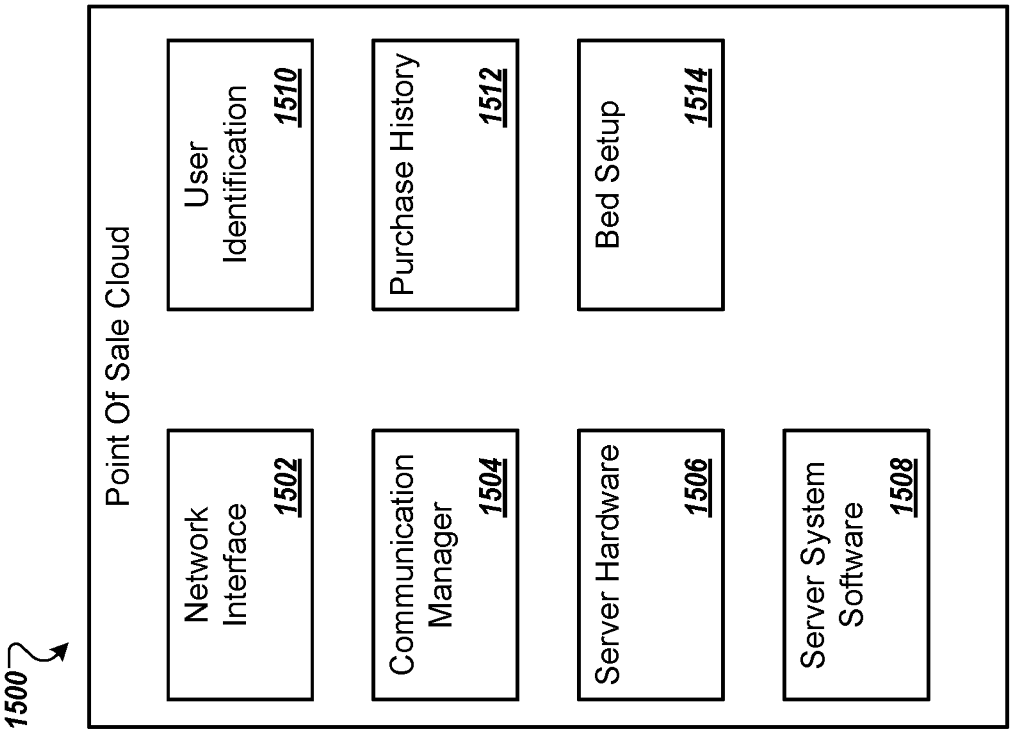

FIG. 15 is a block diagram of an example point of sale cloud service 1500 used in a data processing system associated with a bed system. Here, the service 1500 can record data related to users' purchases, specifically purchases of bed systems described herein. The service 1500 is shown with a network interface 1502, a communication manager 1504, server hardware 1506, and server system software 1508. The service 1500 also includes a user identification module 1510, a purchase history module 1512, and a bed setup module 1514.

The purchase history module 1512 can include, or reference, data related to purchases made by users identified in the module 1510, such as data of a sale, price, and location of sale, delivery address, and configuration options selected by the users at the time of sale. The configuration options can include selections made by the user about how they wish their newly purchased beds to be setup and can include expected sleep schedule, a listing of peripheral sensors and controllers that they have or will install, etc.

The bed setup module 1514 can include, or reference, data related to installations of beds that users purchase. The bed setup data can include a date and address to which a bed is delivered, a person who accepts delivery, configuration that is applied to the bed upon delivery (e.g., firmness settings), name(s) of bed user(s), which side of the bed each user will use, etc. Data recorded in the service 1500 can be referenced by a user's bed system at later times to control functionality of the bed system and/or to send control signals to peripheral components. This can allow a salesperson to collect information from the user at the point of sale that later facilitates bed system automation. Sometimes, some or all aspects of the bed system can be automated with little or no user-entered data required after the point of sale. Sometimes, data recorded in the service 1500 can be used in connection with other, user-entered data.

Figure 16:
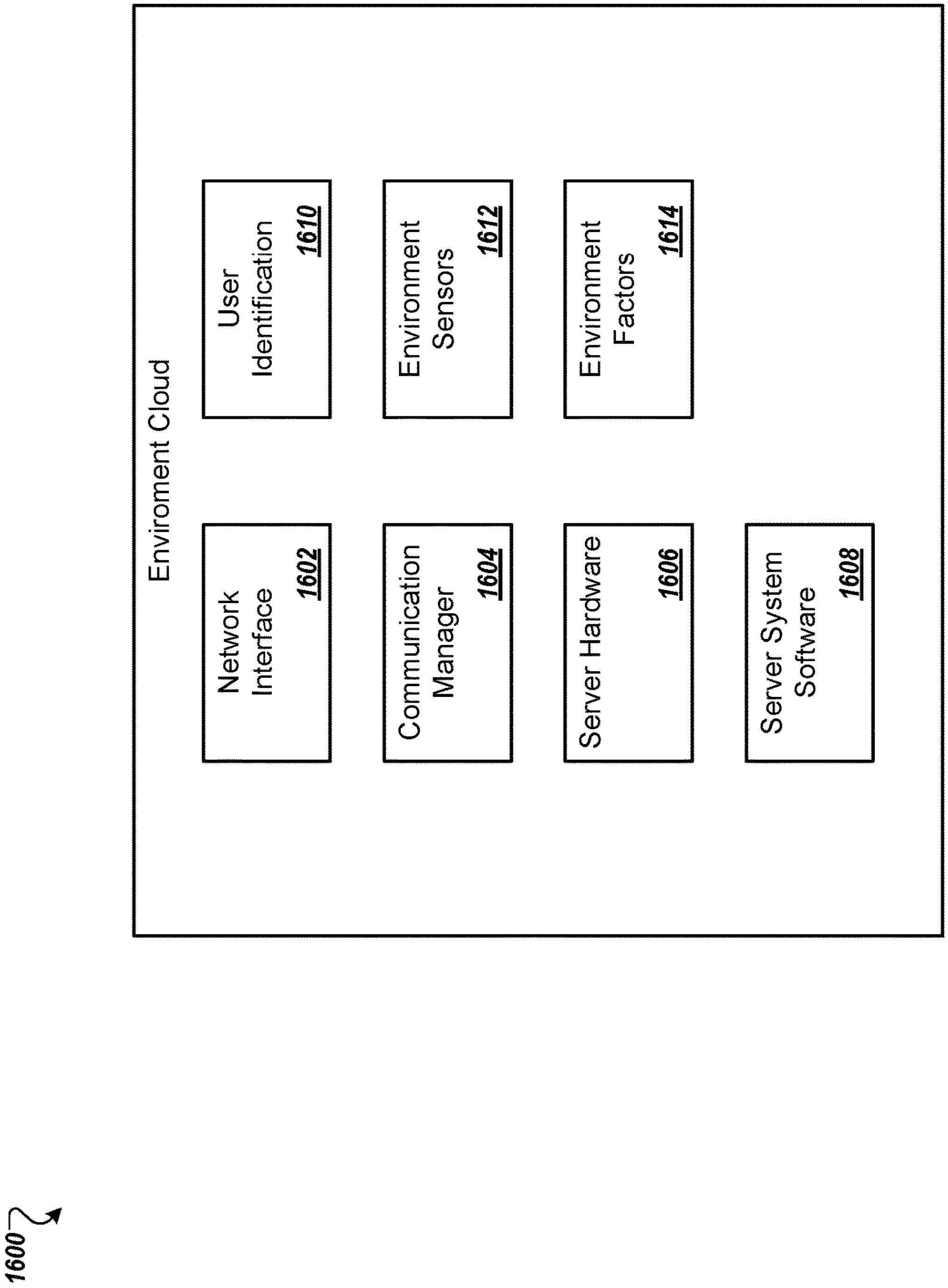

FIG. 16 is a block diagram of an example environment cloud service 1600 used in a data processing system associated with a bed system. Here, the service 1600 is configured to record data related to users' home environment. The service 1600 includes a network interface 1602, a communication manager 1604, server hardware 1606, and server system software 1608. The service 1600 also includes a user identification module 1610, an environmental sensors module 1612, and an environmental factors module 1614. The environmental sensors module 1612 can include a listing and identification of sensors that users identified in the module 1610 to have installed in and/or surrounding their bed (e.g., light, noise/audio, vibration, thermostats, movement/motion sensors, and room smoke detector 336). The module 1612 can also store historical readings or reports from the environmental sensors. The module 1612 can be accessed at a later time and used by one or more cloud services described herein to determine sleep quality and/or health information of the users. The environmental factors module 1614 can include reports generated based on data in the module 1612. For example, the module 1614 can generate and retain a report indicating frequency and duration of instances of increased lighting when the user is asleep based on light sensor data that is stored in the environment sensors module 1612.

In the examples discussed here, each cloud service 410 is shown with some of the same components. These same components can be partially or wholly shared between services, or they can be separate. Sometimes, each service can have separate copies of some or all the components that are the same or different in some ways. These components are provided as illustrative examples. In other examples, each cloud service can have different number, types, and styles of components that are technically possible.

Figure 17:
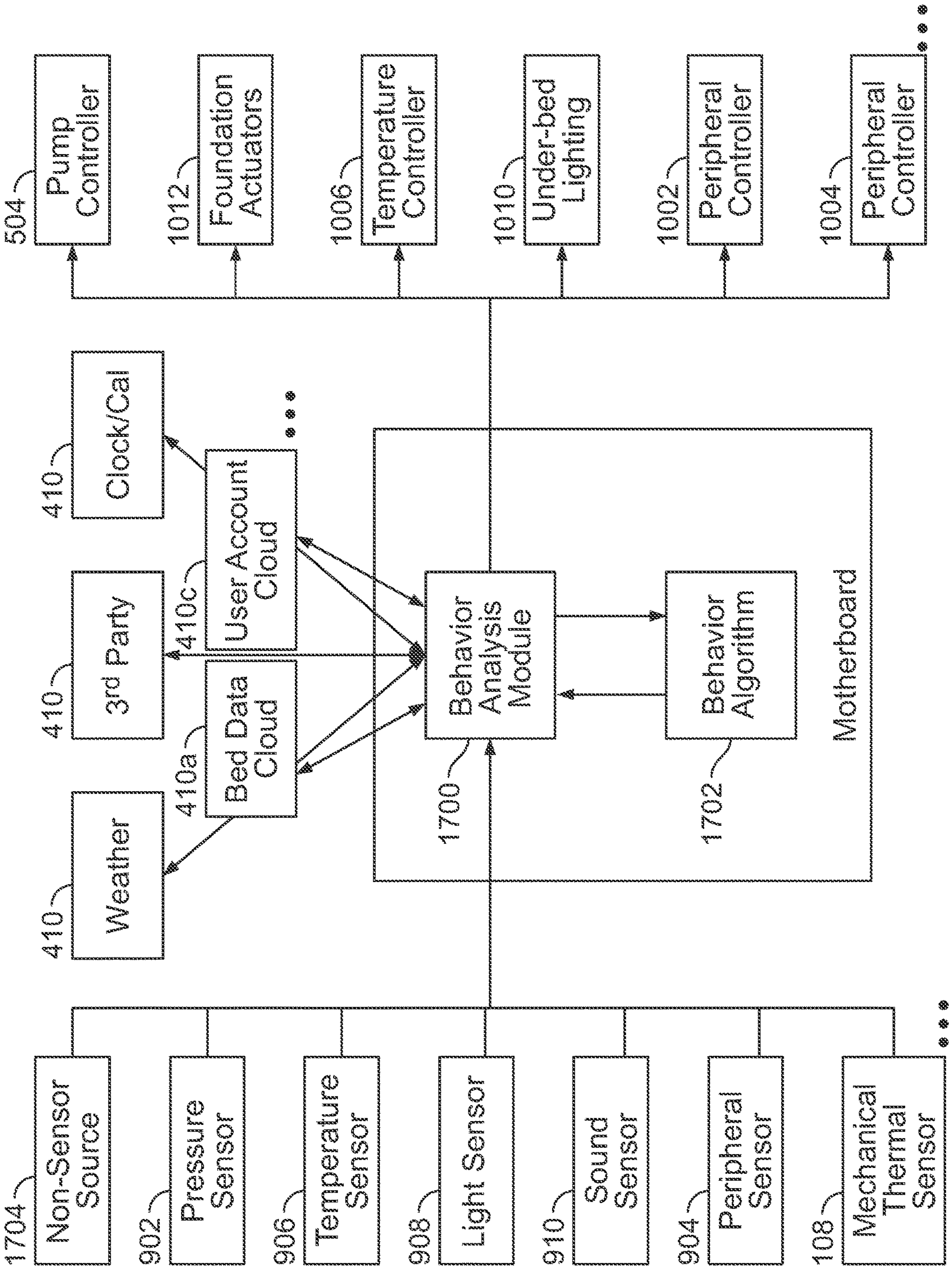
FIG. 17 is a block diagram of an example of using a data processing system that can be associated with a bed to automate peripherals around the bed.

FIG. 17 is a block diagram of an example of using a data processing system associated with a bed to automate peripherals around the bed. Shown here is a behavior analysis module 1700 that runs on the motherboard 402. The behavior analysis module 1700 can be one or more software components stored on the computer memory 512 and executed by the processor 502. In general, the module 1700 can collect data from a variety of sources (e.g., sensors 902, 904, 906, 908, 910, mechanical thermal detector 108, non-sensor local sources 1704, and/or cloud data services 410*a* and/or 410*c*) and use a behavioral algorithm 1702 (e.g., machine learning model(s)) to generate actions to be taken (e.g., commands to send to peripheral controllers, data to send to cloud services, such as the bed data cloud 410*a* and/or the user account cloud 410*c*). This can be useful, for example, in tracking user behavior and automating devices in communication with the user's bed.

The module 1700 can collect data from any technologically appropriate source (e.g., sensors of the sensor array 406) to gather data about features of a bed, the bed's environment, and/or the bed's users. The data can provide the module 1700 with information about a current state of the bed's environment. For example, the module 1700 can access readings from the pressure sensor 902 to determine air chamber pressure in the bed. From this reading, and potentially other data, user presence can be determined. In another example, the module 1700 can access the light sensor 908 to detect the amount of light in the environment. The module 1700 can also access the temperature sensor 906 to detect a temperature in the environment and/or microclimates in the bed. Using this data, the module 1700 can determine whether temperature adjustments should be made to the environment and/or components of the bed to improve the user's sleep quality and overall comfortability. Similarly, the module 1700 can access data from cloud services to make more accurate determinations of user sleep quality, health information, and/or control the bed and/or peripheral devices. For example, the behavior analysis module 1700 can access the bed cloud service 410*a* to access historical sensor data 1212 and/or advanced sleep data 1214. The module 1700 can also access a weather reporting service, a $3^{rd}$ party data provider (e.g., traffic and news data, emergency broadcast data, user travel data), and/or a clock and calendar service. Using data retrieved from the cloud services 410, the module 1700 can accurately determine user sleep quality, health information, and/or control of the bed and/or peripheral devices. Similarly, the module 1700 can access data from non-sensor sources 1704, such as a local clock and calendar service (e.g., a component of the motherboard 402 or of the processor 502). The module 1700 can use this information to determine, for example, times of day that the user is in bed, asleep, waking up, and/or going to bed.

The behavior analysis module 1700 can aggregate and prepare this data for use with one or more behavioral algorithms 1702 (e.g., machine learning models). The behavioral algorithms 1702 can be used to learn a user's behavior and/or to perform some action based on the state of the accessed data and/or the predicted user behavior. For example, the behavior algorithm 1702 can use available data (e.g., pressure sensor, non-sensor data, clock and calendar data) to create a model of when a user goes to bed every night. Later, the same or a different behavioral algorithm 1702 can be used to determine if an increase in air chamber pressure is likely to indicate a user going to bed and, if so, send some data to a third-party cloud service 410 and/or engage a peripheral controller 1002 or 1004, foundation actuators 1012, a temperature controller 1006, and/or an underbed lighting controller 1010.

Here, the module 1700 and the behavioral algorithm 1702 are shown as components of the motherboard 402. Other configurations are also possible. For example, the same or a similar behavioral analysis module 1700 and/or behavioral algorithm 1702 can be run in one or more cloud services, and resulting output can be sent to the pump motherboard 402, a controller in the controller array 408, or to any other technologically appropriate recipient described throughout this document.

Figure 18:
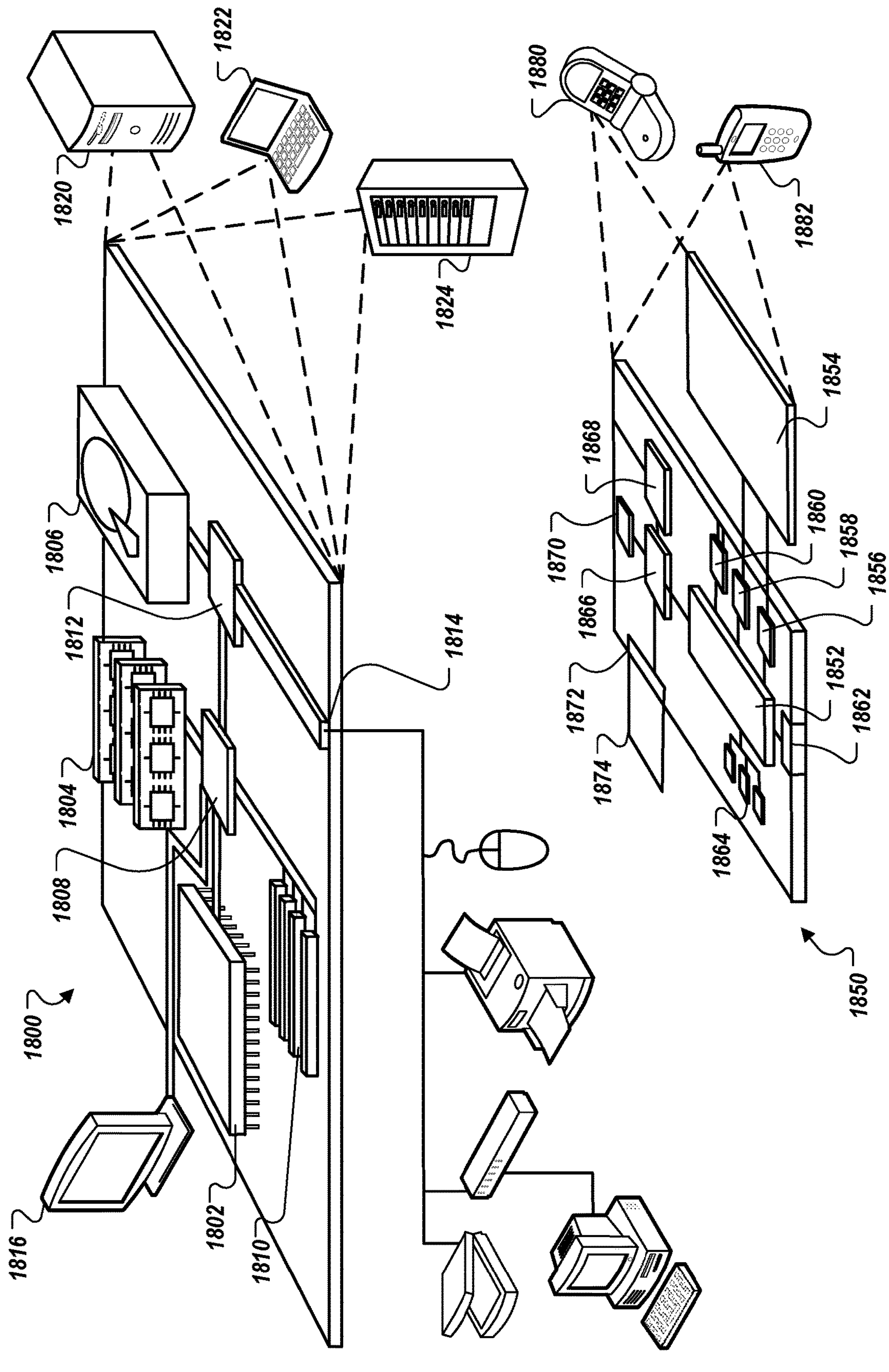
FIG. 18 is a schematic diagram that shows an example of a computing device and a mobile computing device.

FIG. 18 shows an example of a computing device 1800 and an example of a mobile computing device that can be used to implement the techniques described here. The computing device 1800 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 1800 includes a processor 1802, a memory 1804, a storage device 1806, a high-speed interface 1808 connecting to the memory 1804 and multiple high-speed expansion ports 1810, and a low-speed interface 1812 connecting to a low-speed expansion port 1814 and the storage device 1806. Each of the processor 1802, the memory 1804, the storage device 1806, the high-speed interface 1808, the high-speed expansion ports 1810, and the low-speed interface 1812, are interconnected using various busses, and can be mounted on a common motherboard or in other manners as appropriate. The processor 1802 can process instructions for execution within the computing device 1800, including instructions stored in the memory 1804 or on the storage device 1806 to display graphical information for a GUI on an external input/output device, such as a display 1816 coupled to the high-speed interface 1808. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system). The memory 1804 stores information within the computing device 1800. In some implementations, the memory 1804 is a volatile memory unit or units. In some implementations, the memory 1804 is a non-volatile memory unit or units. The memory 1804 can also be another form of computer-readable medium, such as a magnetic or optical disk. The storage device 1806 is capable of providing mass storage for the computing device 1800. In some implementations, the storage device 1806 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 1804, the storage device 1806, or memory on the processor 1802.

The high-speed interface 1808 manages bandwidth-intensive operations for the computing device 1800, while the low-speed interface 1812 manages lower bandwidth-intensive operations. Such allocation of functions is exemplary only. In some implementations, the high-speed interface 1808 is coupled to the memory 1804, the display 1816 (e.g., through a graphics processor or accelerator), and to the high-speed expansion ports 1810, which can accept various expansion cards (not shown). In the implementation, the low-speed interface 1812 is coupled to the storage device 1806 and the low-speed expansion port 1814. The low-speed expansion port 1814, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter. The computing device 1800 can be implemented in a number of different forms, as shown in the figure. For example, it can be implemented as a standard server 1820, or multiple times in a group of such servers. In addition, it can be implemented in a personal computer such as a laptop computer 1822. It can also be implemented as part of a rack server system 1824. Alternatively, components from the computing device 1800 can be combined with other components in a mobile device (not shown), such as a mobile computing device 1850. Each of such devices can contain one or more of the computing device 1800 and the mobile computing device 1850, and an entire system can be made up of multiple computing devices communicating with each other. The mobile computing device 1850 includes a processor 1852, a memory 1864, an input/output device such as a display 1854, a communication interface 1866, and a transceiver 1868, among other components. The mobile computing device 1850 can also be provided with a storage device, such as a micro-drive or other device, to provide additional storage. Each of the processor 1852, the memory 1864, the display 1854, the communication interface 1866, and the transceiver 1868, are interconnected using various buses, and several of the components can be mounted on a common motherboard or in other manners as appropriate.

The processor 1852 can execute instructions within the mobile computing device 1850, including instructions stored in the memory 1864. The processor 1852 can be implemented as a chip set of chips that include separate and multiple analog and digital processors. The processor 1852 can provide, for example, for coordination of the other components of the mobile computing device 1850, such as control of user interfaces, applications run by the mobile computing device 1850, and wireless communication by the mobile computing device 1850. The processor 1852 can communicate with a user through a control interface 1858 and a display interface 1856 coupled to the display 1854. The display 1854 can be, for example, a TFT (Thin-Film-Transistor Liquid Crystal Display) display or an OLED (Organic Light Emitting Diode) display, or other appropriate display technology. The display interface 1856 can comprise appropriate circuitry for driving the display 1854 to present graphical and other information to a user. The control interface 1858 can receive commands from a user and convert them for submission to the processor 1852. In addition, an external interface 1862 can provide communication with the processor 1852, so as to enable near area communication of the mobile computing device 1850 with other devices. The external interface 1862 can provide, for example, for wired communication in some implementations, or for wireless communication in other implementations, and multiple interfaces can also be used.

The memory 1864 stores information within the mobile computing device 1850. The memory 1864 can be implemented as one or more of a computer-readable medium or media, a volatile memory unit or units, or a non-volatile memory unit or units. An expansion memory 1874 can also be provided and connected to the mobile computing device 1850 through an expansion interface 1872, which can include, for example, a SIMM (Single In Line Memory Module) card interface. The expansion memory 1874 can provide extra storage space for the mobile computing device 1850, or can also store applications or other information for the mobile computing device 1850. Specifically, the expansion memory 1874 can include instructions to carry out or supplement the processes described above, and can include secure information also. Thus, for example, the expansion memory 1874 can be provide as a security module for the mobile computing device 1850, and can be programmed with instructions that permit secure use of the mobile computing device 1850. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 1864, the expansion memory 1874, or memory on the processor 1852. In some implementations, the computer program product can be received in a propagated signal, for example, over the transceiver 1868 or the external interface 1862.

The mobile computing device 1850 can communicate wirelessly through the communication interface 1866, which can include digital signal processing circuitry where necessary. The communication interface 1866 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 1868 using a radio-frequency. In addition, short-range communication can occur, such as using a Bluetooth, WiFi, or other such transceiver (not shown). In addition, a GPS (Global Positioning System) receiver module 1870 can provide additional navigation- and location-related wireless data to the mobile computing device 1850, which can be used as appropriate by applications running on the mobile computing device 1850. The mobile computing device 1850 can also communicate audibly using an audio codec 1860, which can receive spoken information from a user and convert it to usable digital information. The audio codec 1860 can likewise generate audible sound for a user, such as through a speaker, e.g., in a handset of the mobile computing device 1850. Such sound can include sound from voice telephone calls, can include recorded sound (e.g., voice messages, music files, etc.) and can also include sound generated by applications operating on the mobile computing device 1850. The mobile computing device 1850 can be implemented in a number of different forms, as shown in the figure. For example, it can be implemented as a cellular telephone 1880. It can also be implemented as part of a smart-phone 1882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input. The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet. The computing system can include clients and servers. A client and server are generally remote from each other and typically interact through a communication network. The relationship of client and server arises by virtue of computer programs running on the respective computers and having a client-server relationship to each other.

FIG. 19 is a schematic diagram of an example bed with an example climate-control system and an example thermal event protection assembly. The bed system 100 has the bed 112 (including at least one mattress), the mattress climate-control system 102, the mechanical thermal detector 108 positioned at the mattress 112, and the controller 110 operatively coupled to the mattress climate-control system 102 to control the mattress climate-control system 102 based on a condition of the mechanical thermal detector 108. In some cases, a thermal event protection assembly 1900 includes the controller 110 and the mechanical thermal detector 108.

The thermal event can be a temperature of the mattress 112 reaching or exceeding a temperature threshold, such as a temperature indicative of a fire, a temperature indicative of a risk of fire, or a temperature indicative of another potentially dangerous thermal event. For example, when the temperature threshold is approximately 190° F., and the temperature of the mattress 112 reaches or exceeds approximately 190° F., the thermal event has occurred. In other cases, the thermal event can be a change in the temperature of the mattress 112 reaching or exceeding a temperature change threshold. For example, when the temperature of the mattress 112 changes from approximately 70° F. to 105° F. (approximately a 35° F. change) and the temperature change threshold is approximately 35° F., then the thermal event has occurred. In yet another example, a presence of smoke can be thermal event.

The mattress climate-control system 102 includes heaters 104 positioned in, near, or operably connected to the mattress 112 to transmit heat into the mattress 112. When the user is on the mattress 112, the user can be heated to increase comfort of the user. The heaters 104 can vary in size, position, and thermal output. For example, in some embodiments the heaters 104 can be a pad or other structure positioned in the mattress 112 at or near a top surface of the mattress. In some such embodiments, the heater 104 can be a pad having a length and a width sized to fit on only one portion of the mattress 112, such as the head portion, the lumbar/waist portion, the leg portion, and/or the foot portion of the mattress 112. In other embodiments, the heater 104 can be larger or smaller as suitable for the application. In still other embodiments, the heater 104 can be designed to heat a fluid (such as air or water) that is delivered to or near a top surface of the mattress 112 to provide heat for a user on the mattress 112. In some of these examples, the heaters 104 can transmit between 20 and 250 watts.

The mattress climate-control system 102 can include one or more fans 106 to move a flow of air through the mattress 112. When the air in the mattress 112 has been heated by the heaters 104, the movement of the air through the mattress 112 by the fans 106 can heat the mattress 112 by circulating heated air to a top 1902 (at top surface of the mattress top 924) of the mattress 112. In some cases, when the air is circulated by the fans 106 through the mattress, the air cools or decreases a temperature of the top 1902 of the mattress 112.

In some implementations, the thermal event protection assembly 1900 includes a smoke detector 1906 coupled to the mechanical thermal detector 108. The smoke detector 1906 can be positioned in the mattress 112. When the smoke detector 1906 senses smoke in the mattress 112, a condition of the smoke detector 1906 changes. The controller 110 senses the change in the condition of the smoke detector 1906 correlating to the thermal event. The controller 110 then sends a command signal to the control box 124 to operate the climate-control system 102.

FIGS. 20A-20M are schematic views of the thermal event protection assembly 1900 of FIG. 19. Referring to FIGS. 1-9A, 17, 19, and 20A-20M, the thermal event protection assembly 1900 includes the mechanical thermal detector 108 and the controller 110.

The mechanical thermal detector 108 is positioned in the mattress 112. A condition of the mechanical thermal detector 108 changes in response to the thermal event at the mattress 112. When the thermal event occurs at the mattress 112, a quantity of heat is transferred into the mechanical thermal detector 108. In some cases, a resistance of the mechanical thermal detector 108 changes in response to the heat transferred into the mechanical thermal detector 108. In some embodiments, the thermal detector 108 can irreversibly change. In some embodiments, the thermal detector 108 can destructively change. For example, at least part of the thermal detector 108 can melt or be otherwise damaged due to the thermal event.

Figure 20A:
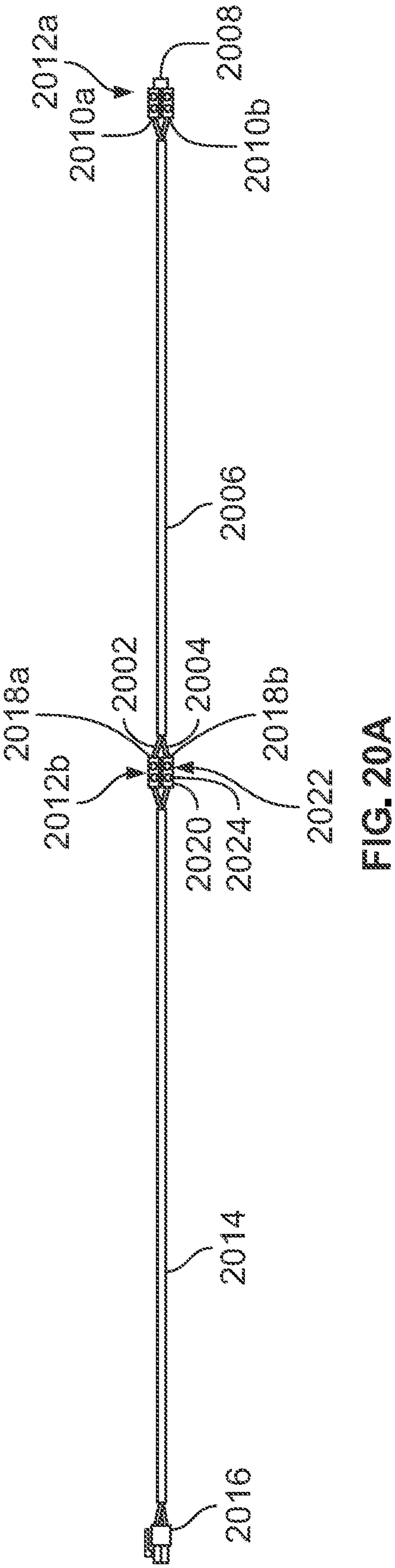
FIG. 20A is a schematic top view of the thermal event protection assembly of FIG. 19.
Figure 20B:
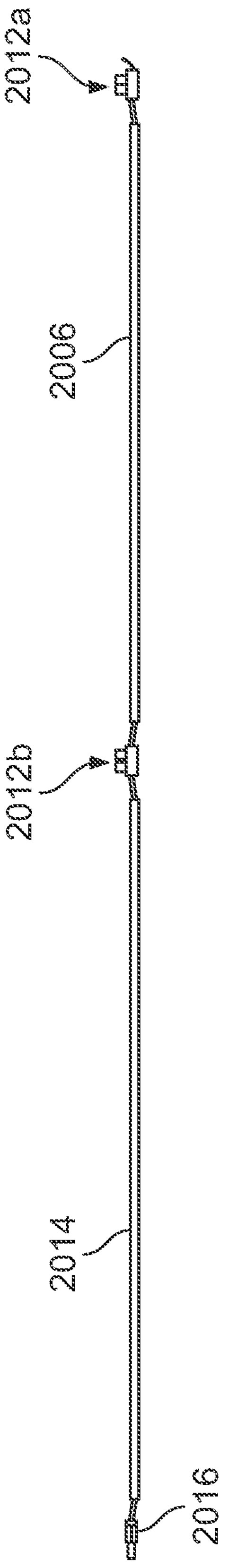
FIG. 20B is a schematic side view of the thermal event protection assembly of FIG. 19.
Figure 20C:
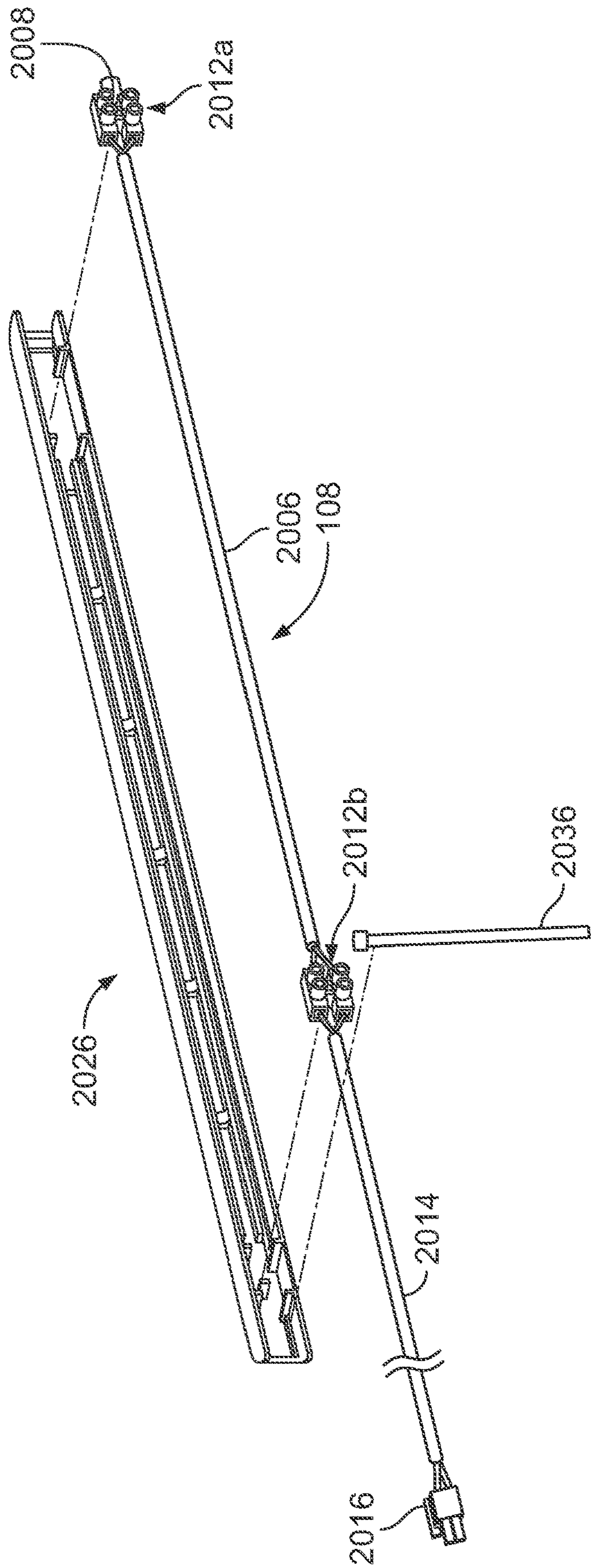
FIG. 20C is a schematic perspective view of the thermal event protection assembly of FIG. 1 installed on a side rail of the air bed system of FIG. 19.
Figure 20D:
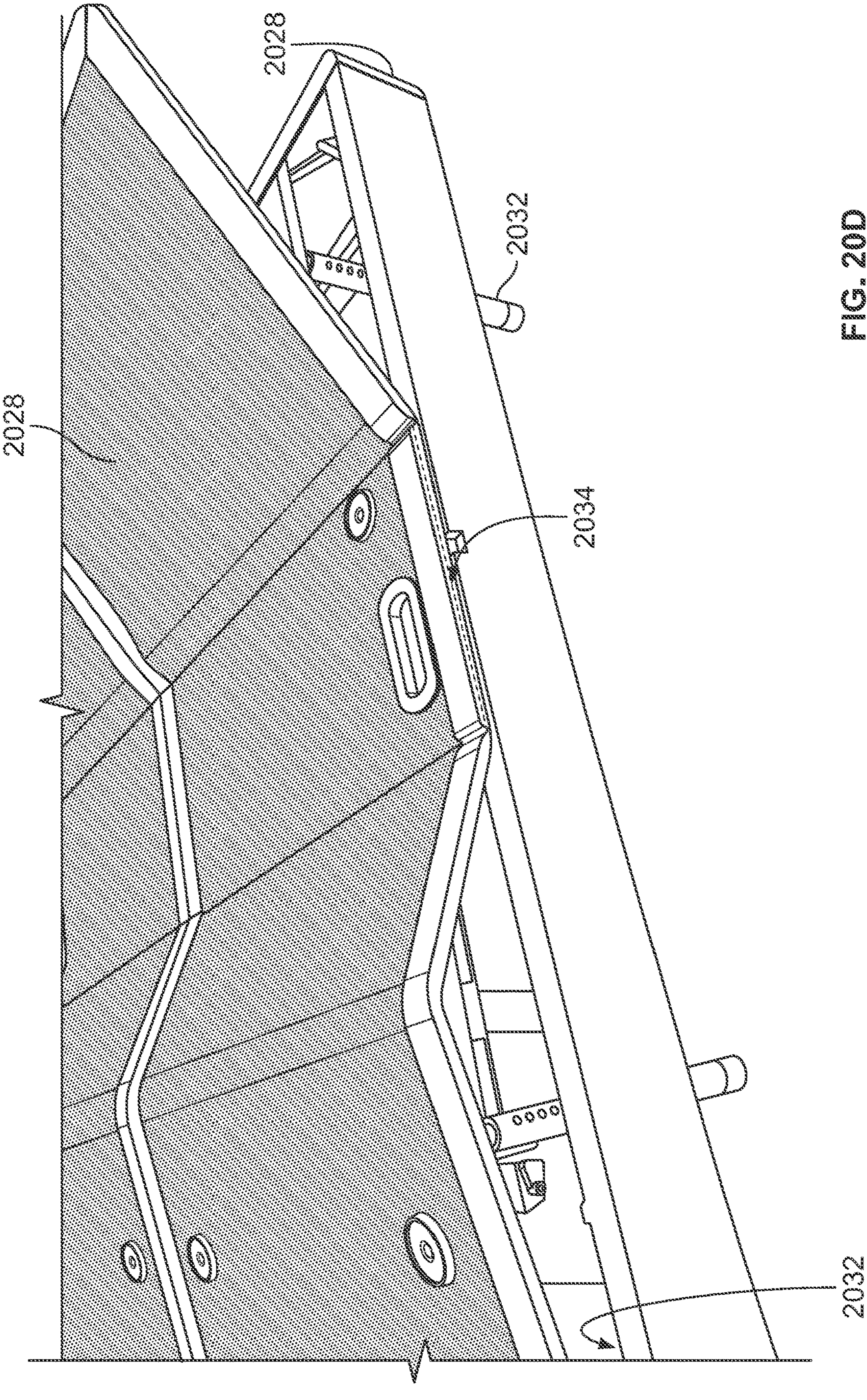
FIG. 20D is a schematic perspective view of the thermal event protection assembly of FIG. 1 installed on the air bed system of FIG. 19.
Figure 20E:
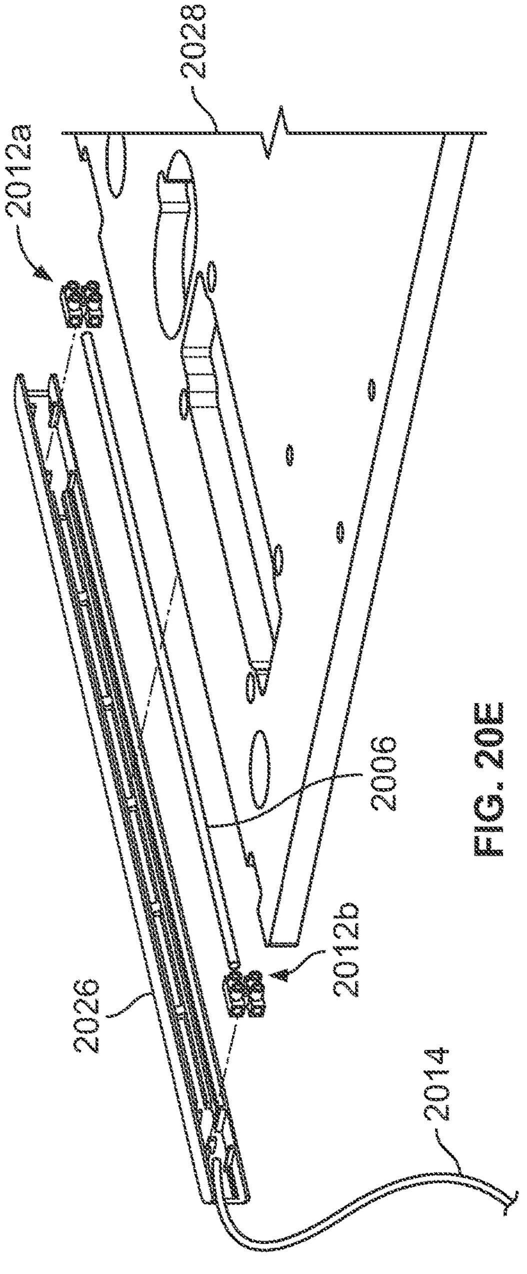
FIGS. 20E-20F are perspective views of the thermal event protection assembly installed relative to the air bed system of FIG. 19.
Figure 20F:
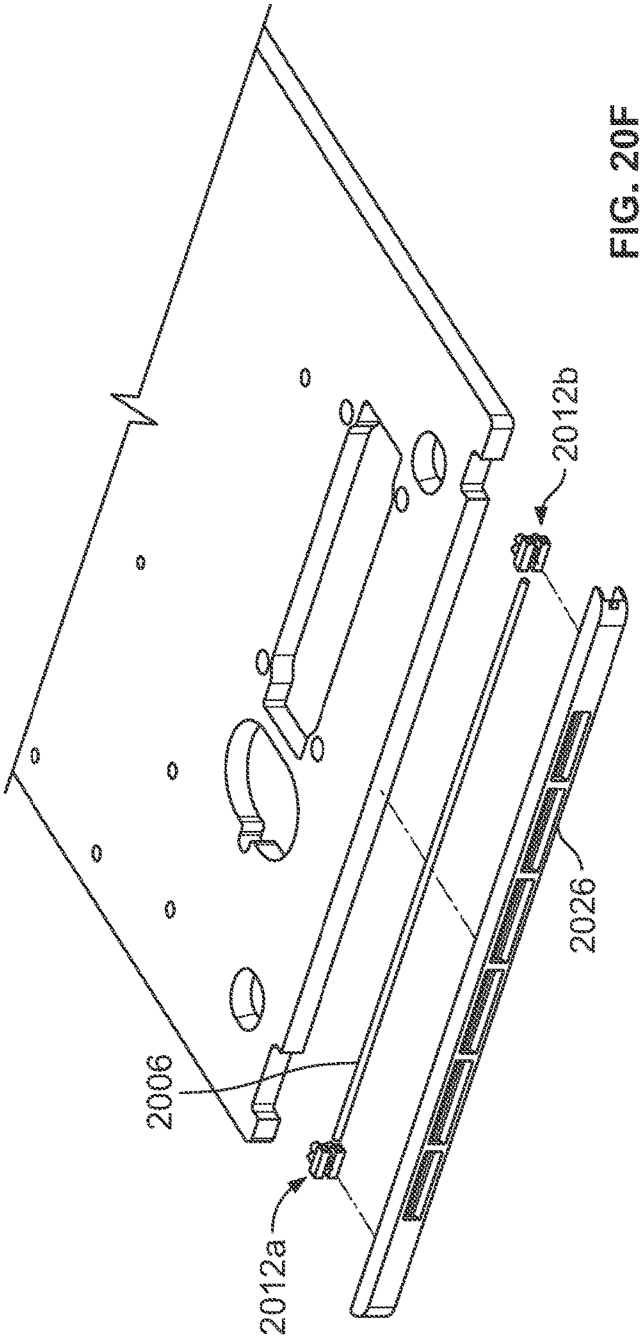
Figure 20I:
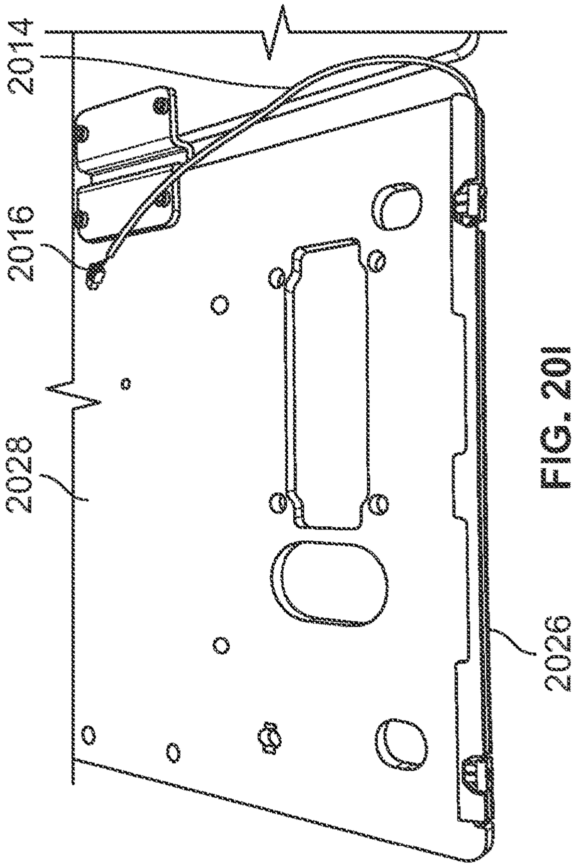
FIG. 20G-20I are schematic perspective views of instillation process of the thermal event protection assembly onto the air bed system of FIG. 19.
Figure 20H:
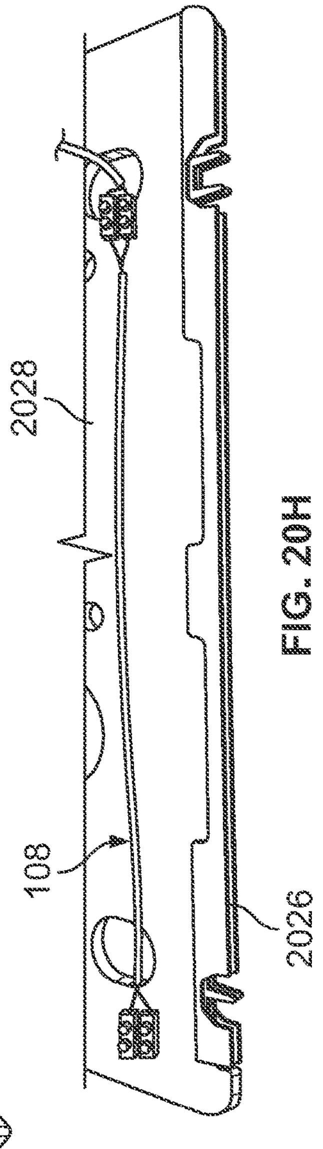
Figure 20G:
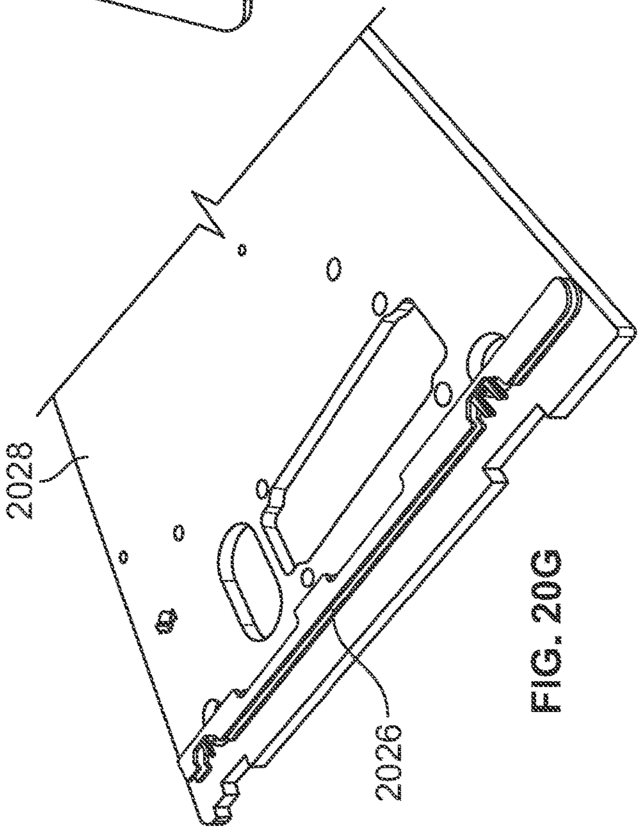
Figure 20J:
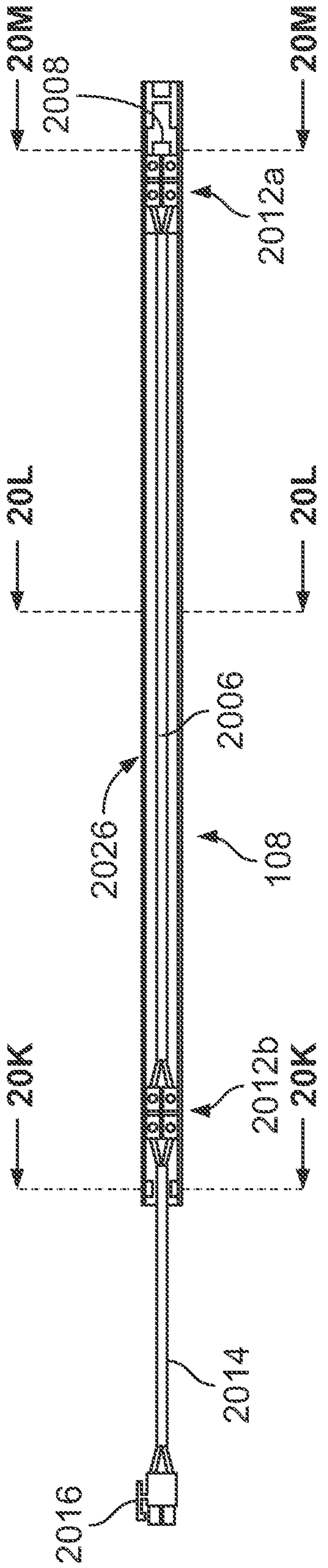
FIG. 20J is another schematic top view of the thermal event protection assembly of FIG. 19.
Figure 20K:
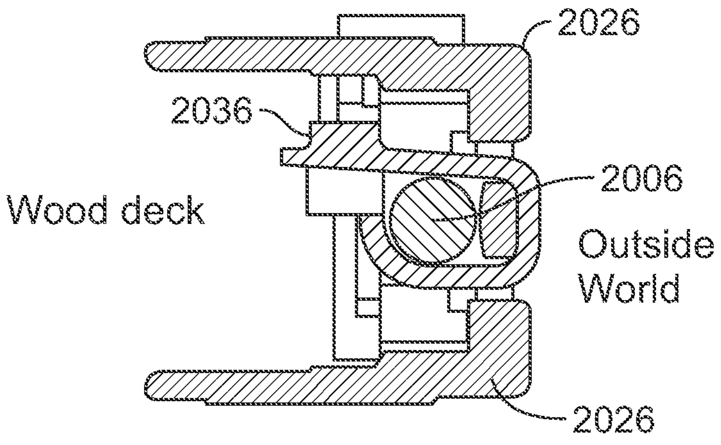
FIGS. 20K-20M are schematic cross-section views of the thermal event protection assembly of FIG. 19.
Figure 20L:
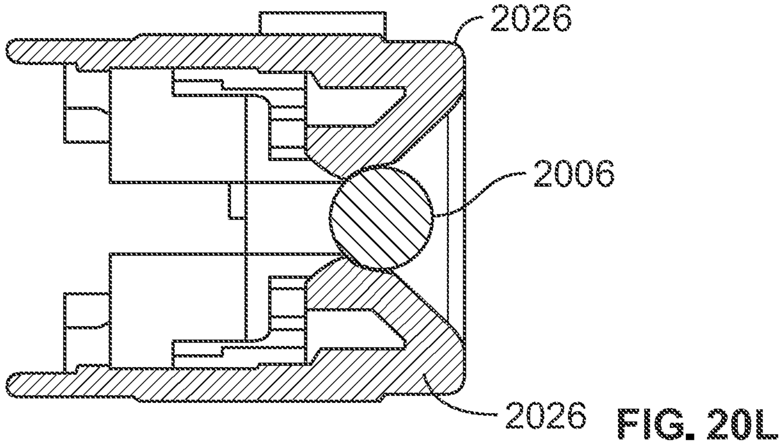
Figure 20M:
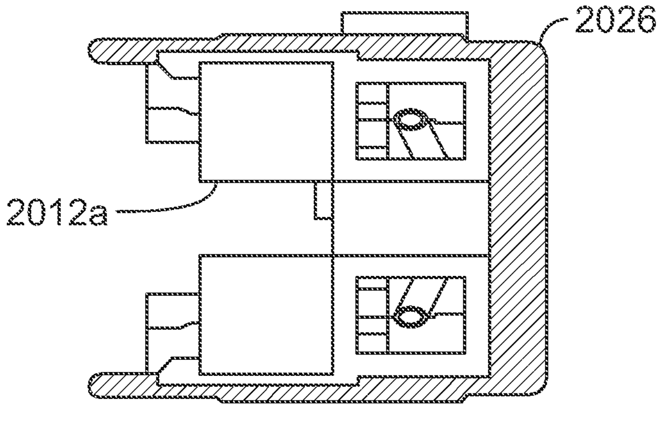

Referring to FIGS. 20A and 20J, the mechanical thermal detector 108 has a first wire 2002, a second wire 2004 spiral wrapped around the first wire 2002, and a coating 2006 separating the first wire 2002 and the second wire 2004. In some embodiments, the coating 2006 can cover one or both of the first wire 2002 and the second wire 2004. The first wire 2002 and the second wire 2004 include a conductive material. For example, the wires 2002, 2004 can be a metal such as copper. The first wire 2002, the second wire 2004 spiral wrapped around the first wire 2002, and the coating 2006 covering and separating the first wire 2002 and the second wire 2004 can be referred to as thermal wire assembly.

The coating 2006 is configured to melt at a temperature. The temperature that the coating 2006 melts is based on the material properties of the coating 2006. In some embodiments, the coating 206 is configured to melt at or near approximately 190° F. In other embodiments, the coating 2006 can be designed and manufactured to melt at another temperature, such as a temperature between approximately 150° F. and 200° F.

When the coating 206 melts, the spiral wrapped wires 2002, 2004 can move, contacting each other. For example, the spiral wrapped wires 2002, 2004 can expand or contract to contact each other. The first wire 2002 and the second wire 2004 contacting each other can cause an electrical short in the mechanical thermal detector 108. In other words, the resistance of the mechanical thermal detector 108 can decrease significantly, that is, below a first resistance threshold indicating a short of the mechanical thermal detector 108. For example, the first resistance threshold can be less than or equal to approximately 800 Ω.

The mechanical thermal detector 108 includes a resistor 2008 electrically coupled between first terminating ends 2010*a*, 2010*b* of the first wire 2002 and the second wire 2004, respectively. In some cases, a resistance of the resistor is between approximately 3.1 and 3.5 kΩ. Such the resistor 2008 provides a known resistance for the mechanical thermal detector 108 which indicates a resistive termination of the mechanical thermal detector 108.

The mechanical thermal detector 108 includes terminal blocks 2012, a conductor wire 2014, and electrical connectors 2016 to electrically couple the various components together. One terminal block 2012*a* is positioned between the first terminating ends 2010*a*, 2010*b* and the resistor 2008. Another terminal block 2012*b* is coupled to second terminating ends 2018*a*, 2018*b* of the first wire 2002 and the second wire 2004, respectively. Each terminal block 2012*a*, 2012*b* has a body 2020 to hold electrical couplers 2022 (such as a copper strip) to conduct electricity, and screws 2024 to secure the components.

The conductor wire 2014 is coupled to the terminal block 2012*b* and conducts electricity from the terminal block 2012*b* to the electrical connector 2016. The electrical connector 2016 couples the mechanical thermal detector 108 to the controller 110.

Referring to FIGS. 20C and 20E-20I, the mechanical thermal detector 108 snaps into a carrier body 2026. The carrier body 2026 holds and protects the mechanical thermal detector 108. The mechanical thermal detector 108 can be secured to the carrier body 2026 by fasteners such as zip ties 2036. The carrier body 2026 also couples the mechanical thermal detector 108 to a deck 2028 of a foundation 2032 (shown in FIGS. 20D-20I). The carrier body 2026 can be plastic. The deck 2028 support the mattress 112.

Referring to FIG. 20D, the foundation 2032 can include the deck 2028 and a frame 2030, with the deck 2028 resting on top (above) the frame 2030. The deck 2028 can be a multiple panel deck that can actuate one or more panels to position the user's body as previously described. The carrier body 2026 may be position on a side 2034 of the deck 2028 above the frame 2028.

Figure 21:
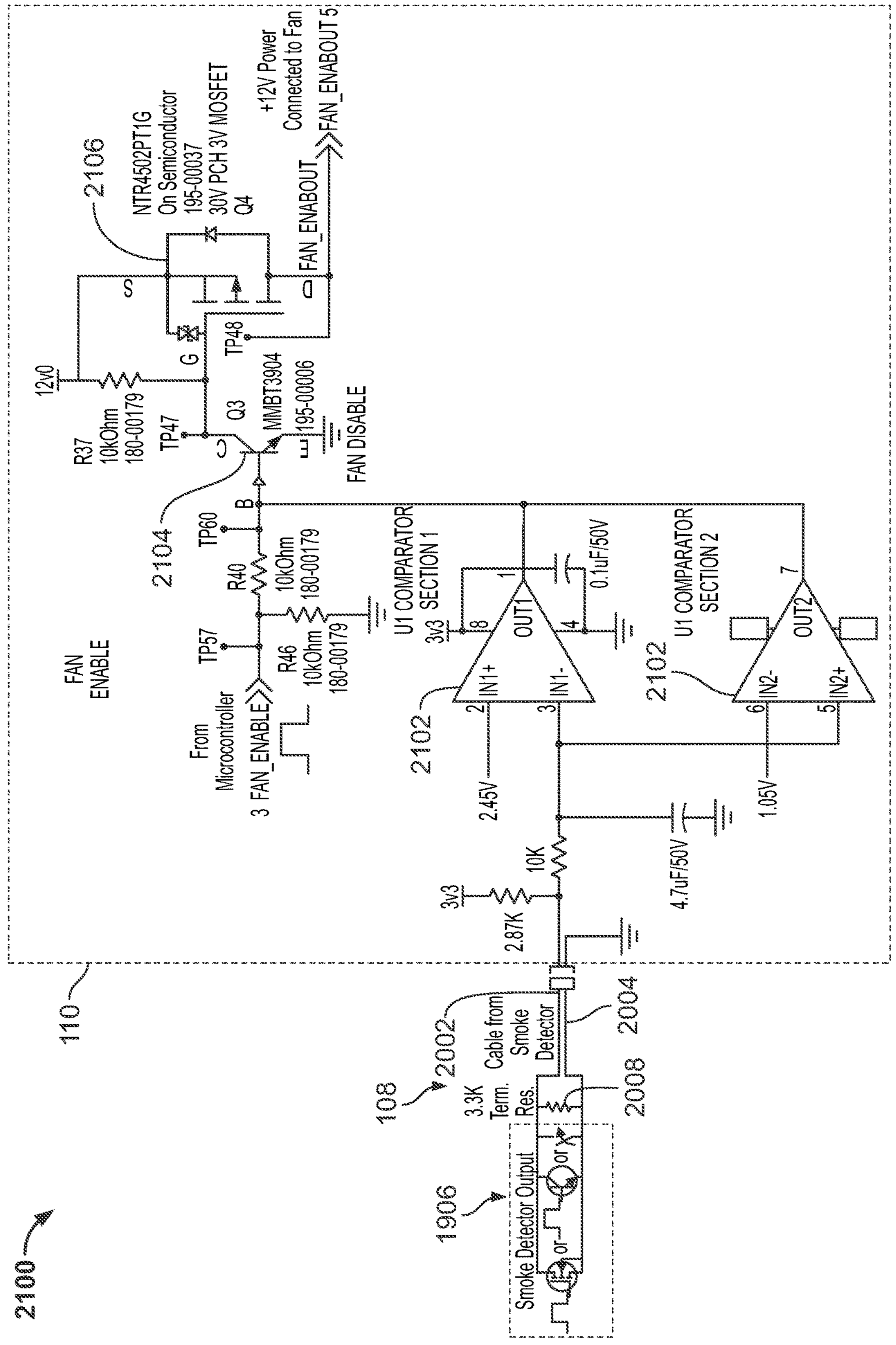
FIG. 21 is a diagram of a control circuit of the thermal event protection assembly with a fan of the air bed system of FIG. 19.
Figure 22:
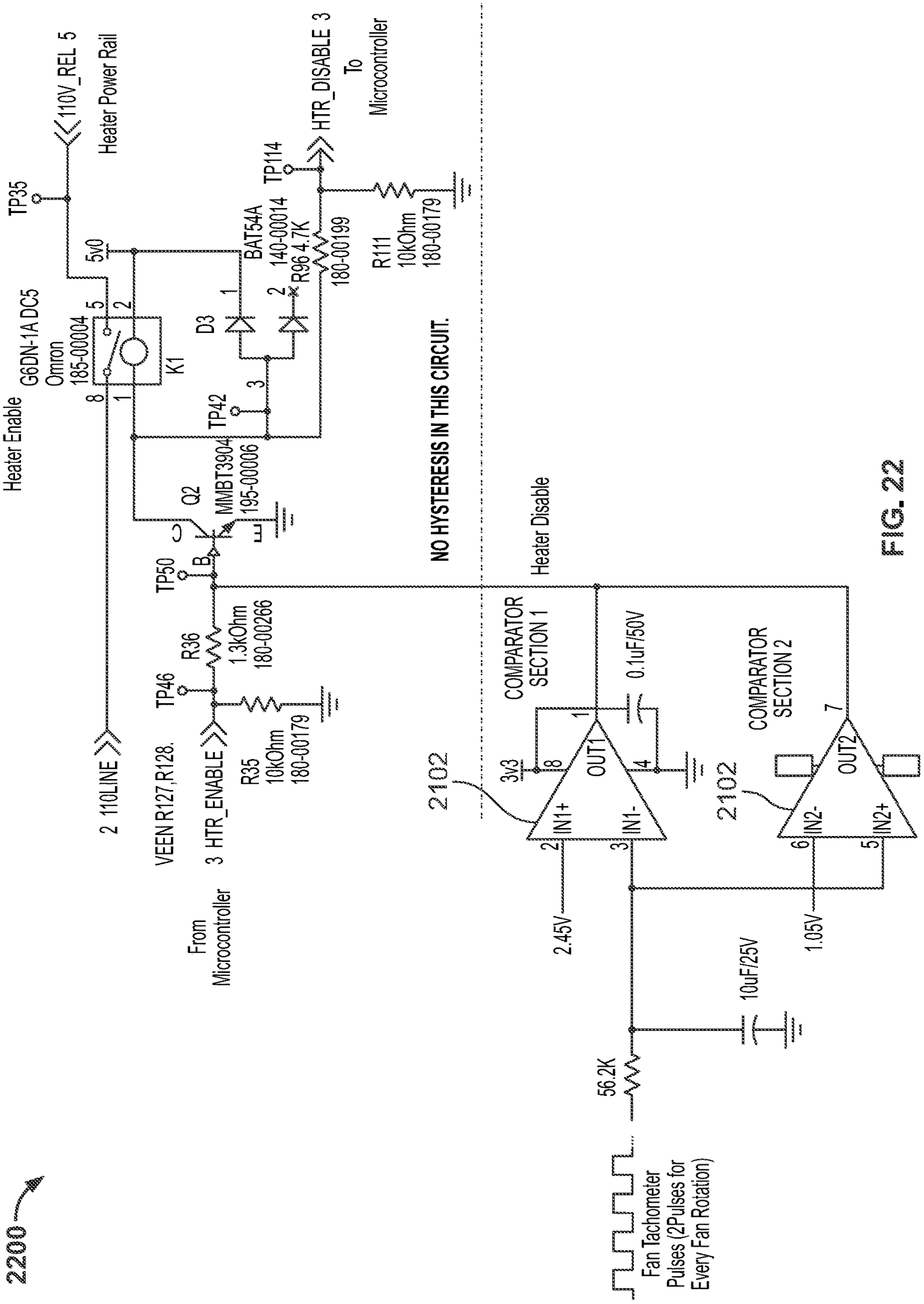
FIG. 22 is a diagram of a control circuit of the thermal event protection assembly with a heater of the air bed system of FIG. 19.

FIG. 21 is a diagram of a control circuit of the thermal event protection assembly with a fan of the air bed system of FIG. 19. FIG. 22 is a diagram of a control circuit of the thermal event protection assembly with the heater of the air bed system of FIG. 19.

Referring to FIGS. 21-22, the control circuits 2100 and 2200 detect the conditions of the mechanical thermal detector 108 and the smoke detector 1906. Based on the condition of the mechanical thermal detector 108 and the condition of the smoke detector 1906, the control circuits 2100 and 2200 operate the mattress climate-control system 102 (including the heaters 104 and the fans 106). The controller 110 detects the condition of the mechanical thermal detector which, in this case, is the resistance of the thermal wire assembly (the first wire 2002, the second wire 2004 spiral wrapped around the first wire, and the coating 2006 separating the first wire 2002 and the second wire 2004), the resistor 2008, and the smoke detector 1906. When the resistance is less than a first resistance threshold, the control circuits 2100 and 2200 disable the mattress climate-control system 102. The first resistance threshold represents that the mechanical thermal detector 108 and/or the smoke detector 1906 is short-circuited. In other words, the thermal event has occurred emitting smoke detected by the smoke detector 1906 or a fire has occurred transmitting heat in the mattress 112 to the mechanical thermal detector 108 melting the coating 2006 and expanding the first wire 2002 to contact the second wire 2004.

When the resistance reaches or exceeds a second resistance threshold, such as when the mechanical thermal detector 108 and/or the smoke detector 1906 is disconnected (an open circuit), the control circuits 2100 and 2200 detect the open circuit condition and disables the mattress climate-control system 102.

When the resistance of the smoke detector 1906 and the mechanical thermal detector 108 is between the first resistance threshold and the second resistance threshold (normal operation), the control circuit may enable the mattress climate-control system 102. In other words, the user can send command signals from the remote control 122 to operate the heaters 104 and the fans 106. In some cases, the first resistance threshold is approximately 800Ω and the second resistance threshold is approximately 4 kΩ. Any suitable resistance threshold may be used.

For example, the control circuits 2100 and 2200 apply a voltage using comparators 2102 to determine the change in resistances of the smoke detector 1906 and the mechanical thermal detector 108. The control circuits 2100 and 2200 determine that a voltage based on the resistance of the thermal wire assembly 108, the resistor 2008, and the smoke detector 1906. When the voltage is between approximately 1.05 and 2.45 V, the control circuits 2100 and 2200 enable operation of the fans 106 and the heater 104 by a user. When the voltage is less than approximately 1.05 V, the control circuits 2100 and 2200 disable operation of the fans 106 and the heaters 104. When the voltage is greater than approximately 2.45 V, the control circuits 2100 and 2200 disable operation of the fans 106 and the heaters 104. As may be appreciated, any suitable voltage threshold may be used.

Continuing with this example, the comparator 2102 (window comparator U1) detects the voltage at its inputs. As long as a voltage divider at an input of the comparator U1 2012 provides voltage between approximately 1.05 and 2.45 volts, fans 106 and heaters 104 are enabled, that is, can be operated by the user. This state occurs when the mechanical thermal detector 108 is terminated with by the approximately 3.3 kΩ resistor 2008.

Comparator 2102 (window comparator U1) has open drain outputs which are a high impedance when voltage at the inputs is between approximately 1.05 and 2.45 volts, which allows fan control transistors Q3 2104 and Q4 2106 outputs to operate normally, that is, fans 106 and heaters 104 are enabled, that is, can be operated by the user.

A short condition at the inputs of the comparator 2102 pulls the voltage down to approximately 0 volts, which disables operation of the fan 106 and the heaters 104 because window comparator U1 2102 output switches to low impedance keeping fan control transistors Q3 and Q4 outputs in high-impedance state.

An open condition at inputs of the comparator 2102 indicates that the mechanical thermal detector 108 has been damaged or become disconnected. Voltage at inputs of the comparator 2102 gets pulled up to approximately 3.3 volts. The open condition at inputs of the comparator 2102 allows a pullup resistor to pull the voltage high to approximately 3.3 volts, which disables fans 106 and heaters 104 because window comparator U1 2102 output switches to low impedance keeping fan control transistors Q3 2104 and Q4 2106 outputs in high-impedance state.

Disabling the fan control transistors Q3 2104 and Q4 2106 removes a +12V from the fan 106, disabling the fan 106, which also disables the heater relay because the fan tachometer pulses are no longer present. The heater relay provides 110 VAC to the 2 heater elements when enabled but removes 110 VAC to the two heater elements when it is disabled, as shown in FIG. 22.

In some implementations, the controller 110 may be configured to transmit a report indicating an occurrence of the thermal event from the controller and to a user computing device, such as the remote control 122 or user device 310 such as a tablet, personal computer, laptop, a smartphone, a smart television (e.g., a television 312), or a home automation device.

Figure 23:
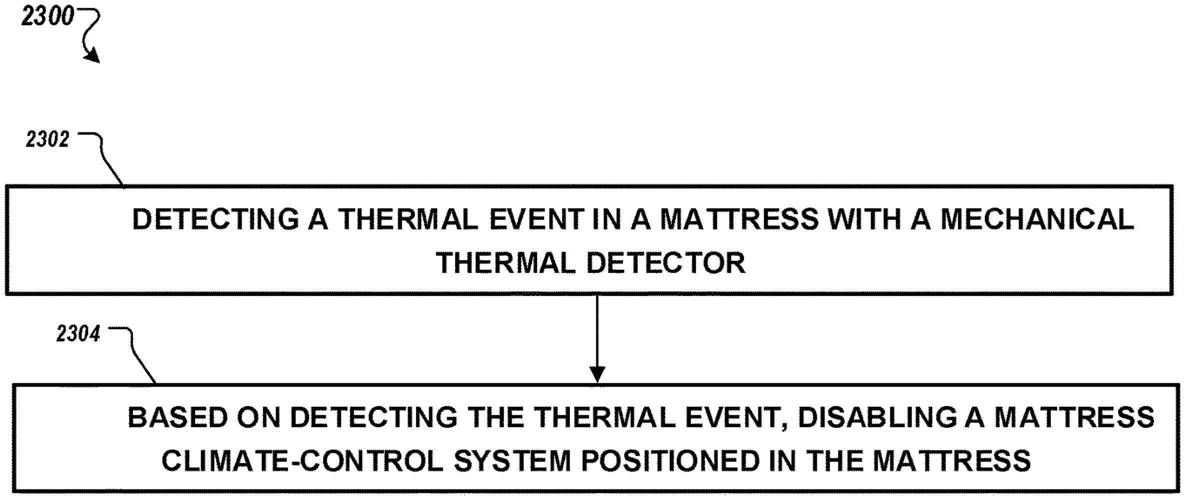
FIG. 23 is a diagram of an example process for controlling mattress components based on a thermal event.

FIG. 23 is a diagram of an example process 2300 for controlling a mattress climate-control system based on thermal event. For clarity, the process 2300 is being described with reference to components of the data processing system 400. However, other system or systems can be used to perform the same or a similar process.

The process 2300 can begin, for example, when, at 2302, a thermal event in a mattress is detected with a mechanical thermal detector. In some implementations, detecting the thermal event includes sensing a condition of the thermal event. In some cases, the condition of the thermal event is a change in a resistance of the mechanical thermal detector including a thermal wire assembly with two spiral wound wires with first ends terminating on opposite ends of a resistor.

The process 2300 continues at 2304, when, based on detecting the thermal event, a mattress climate-control system positioned in the mattress is disabled. In some implementations, disabling the mattress climate-control system includes disabling a mattress climate-control system based on the change in the resistance indicating that the thermal wire assembly is short-circuited. In some implementations, disabling the mattress climate-control system includes disabling a mattress climate-control system based on the change in resistance indicating that the thermal wire assembly is open-circuited.

In some implementations, the process 2300 continues when the change in the resistance indicates resistive termination, the mattress climate-control system operation by a user is enabled. In some cases, the resistance indicating resistive termination of the thermal wire assembly is between approximately 3.1 kΩ and 3.5 kΩ.

In some implementations, the process 2300 continues when a signal indicating an occurrence of thermal event is transmitted to a user computing device.

Figure 24:
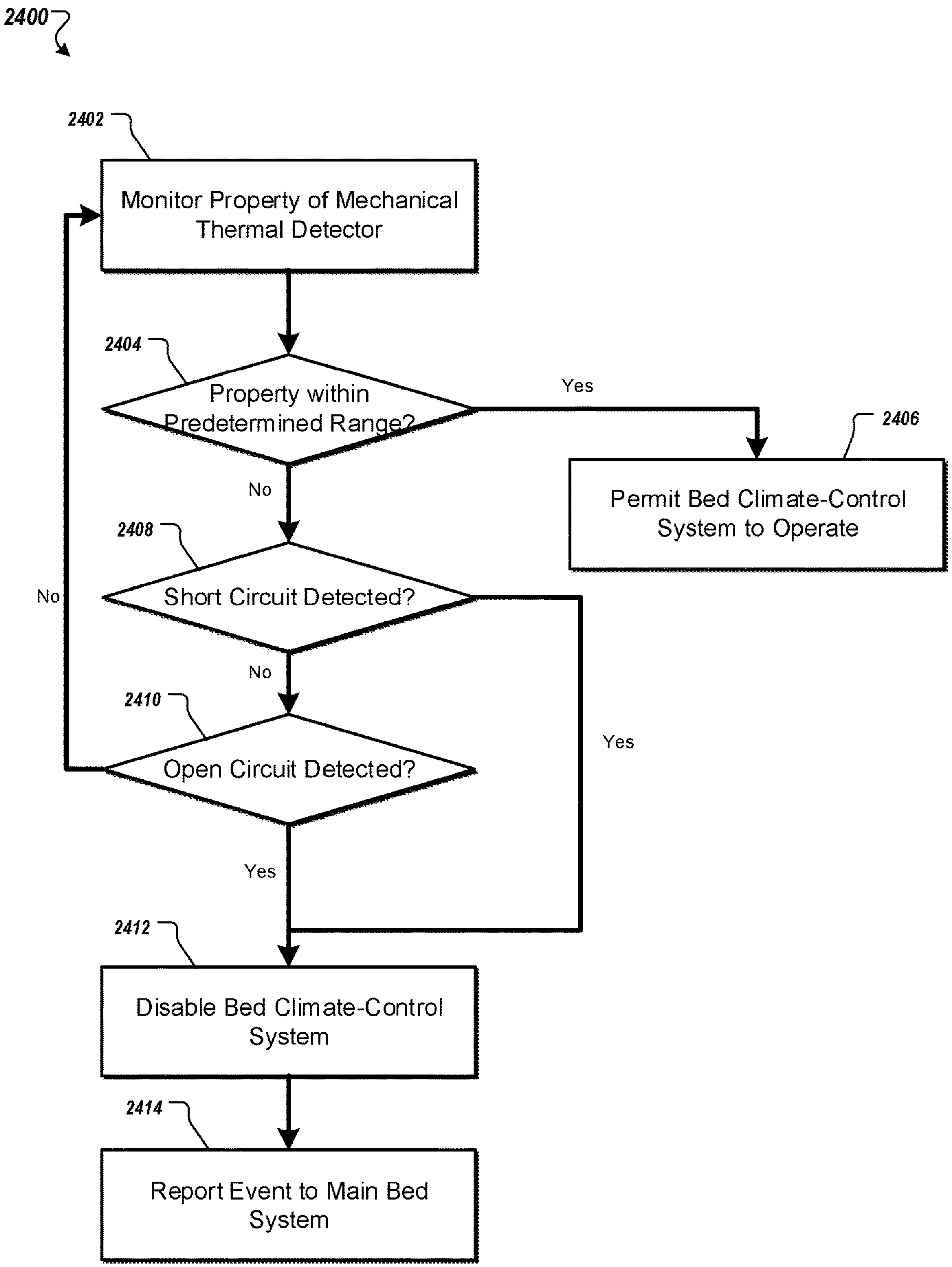
FIG. 24 is a flowchart of an example process for controlling mattress components based on a thermal event.

FIG. 24 is a flowchart of an example process for controlling mattress components based on a thermal event. At 2402, a property of a mechanical thermal detector is monitored. For example, the property of the mechanical thermal detector 108 can be a resistance of the mechanical thermal detector 108. The controller 110 can detect the resistance and a change in the resistance of the mechanical thermal detector 108.

At 2404, it is determined if the property is within a predetermined range. For example, the controller 110 including the control circuits 2100, 2200 determine that the voltage, based on resistance of the mechanical thermal detector 108 is within an acceptable range. For example, the resistance can be between approximately 800Ω and approximately 3.3 kΩ. For example, the resistance can be within approximately 800 Ω±0.2 kΩ and approximately 3.3 kΩ±0.2 kΩ.

At 2406, when the property is within the predetermined range, the bed climate-control system is permitted to operate. In other words, if a "YES" state is determined, indicated that the resistance of the mechanical thermal detector 108 is in the normal operating range, operation of the climate-control system 102 is enabled. For example, the control circuits 2100, 2200 transmit enable states allowing the user inputs to control the heaters 104 and the fans 106.

At 2408, when the property is outside the predetermine range, it is determined if a short circuit condition is exists (i.e., if a short circuit is detected). For example, the control circuits 2100, 2200 detect when the resistance of the mechanical thermal detector 108 decreases less than the first resistance threshold, indicating a short circuit. The short circuit condition can occur when the first and second wires 2002, 2004 contact in response to the thermal event melting the coating 2006 or the smoke detector 1906 detecting smoke from the thermal event. When the resistance indicates that a short condition is not detected (i.e., a NO state), the process 2400 continues to 2410. When the resistance indicates that a short condition is detected, that is a short has occurred (i.e., a YES state), the process 2400 continues to step 2412.

At 2410, when the property is outside the predetermine range, and a short circuit has not been detected (i.e., at 2408), it is determined if an open circuit condition is exists (i.e., if an open circuit is detected). For example, the control circuits 2100, 2200 detect when the resistance of the mechanical thermal detector 108 increases greater than or equal to the second resistance threshold, indicating an open circuit. The open circuit condition can occur when the mechanical thermal detector 108 is electrically disconnected from the controller 110. When the resistance indicates that the open condition is not detected (i.e., a NO state), the process 2400 continues to 2402 where the property of the mechanical thermal detector 108 is monitored. When the resistance indicates that the open condition is detected, that is, an open has occurred (i.e., a YES state), the process 2400 continues to step 2412.

At 2412, the bed climate-control system is disabled. For example, when the short circuit condition has been detected (2408) indicating the thermal event has occurred or when the open circuit condition has been detected (2410) indicating the mechanical thermal detector 108 is electrically disconnected from the controller 110, the heaters 104 and the fans 106 are disabled.

The process 2400 continues at 2414, where the occurrence of the thermal event is reported. For example, the controller 110 can transmit the report indicating an occurrence of the thermal event to the user computing device, such as the remote control 122 or user device 310 such as a tablet, personal computer, laptop, a smartphone, a smart television (e.g., a television 312), or a home automation device.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Accordingly, various features have been described above in the feature groups for clarity and organization purposes, however, it will be understood that features from the various feature groups can be beneficially combined together in a common system. Accordingly, various embodiments are specifically intended to include features of more than one, and sometimes many, feature groups. Moreover, although features may be described above as acting in certain combinations and even initially claimed as such, one or more features from a claimed combination can in some cases be excised from the combination, and the claimed combination may be directed to a sub-combination or variation of a sub-combination.

As used herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

As used herein, the term "approximately" refers to a condition or parameter which can have a value or threshold value generally within acceptable engineering, machining, measurement, or manufacturing tolerances. For example, the parameter value or threshold value can be considered approximately met when the value is within 5% of the actual parameter value or threshold value. For example, the parameter value can be considered to be equal to the threshold value when the parameter value is within 5% of the threshold value. However, different approximations for different parameter values or threshold values may be used in different embodiments.

What is claimed is:

1. A bed system comprising:

a mattress;

a mattress climate-control system configured to control a climate at the mattress;

a thermal event protection assembly comprising:

a mechanical thermal detector positioned at the mattress, the mechanical thermal detector comprising a thermal wire assembly comprising:

a first wire;

a second wire that is spiral-wrapped about the first wire; and a coating separating the first wire from the second wire, the coating configured to melt responsive to a thermal event, wherein the mechanical thermal detector is configured to change between a normal operating configuration and a thermal event operating configuration in response to a thermal event, wherein when in the mechanical thermal detector is in the normal operating configuration, the first wire is separated from the second wire by the coating and a resistance of the mechanical thermal detector is greater than a first resistance threshold, wherein when the mechanical thermal detector is in the thermal event operating configuration, whereby the coating has melted responsive to the thermal event, the first wire and the second wire are in contact to short-circuit the mechanical thermal detector and the resistance of the mechanical thermal detector is less than or equal to the first resistance threshold; and a controller operatively coupled to the mattress climate-control system, the controller configured to perform operations, based on the resistance of the mechanical thermal detector, comprising:

based on the resistance being equal to or greater than the first resistance threshold indicating the mechanical thermal detector is in the normal operating configuration enabling operation of the mattress climate-control system; and based on the resistance being less than the first resistance threshold, the first resistance threshold representing that the mechanical thermal detector is short-circuited, disabling the mattress climate-control system.

2. The bed system of claim 1, wherein the mattress climate-control system includes one or more of:

a heater coupled to the mattress and configured to heat at least a portion of the mattress; and a fan coupled to the mattress and configured to supply or draw air to a top of the mattress.

3. The bed system of claim 1, wherein the thermal wire assembly is configured to, based on a temperature of the mattress exceeding approximately 190° F., cause the first wire and the second wire to contact each other.

4. The bed system of claim 3, wherein the coating is configured to melt when a temperature of the coating exceeds approximately 190° F.

5. The bed system of claim 1, wherein the mechanical thermal detector comprises a resistor electrically coupled between terminating ends of the first wire and the second wire.

6. The bed system of claim 5, wherein operating the mattress climate-control system comprises based on the resistance exceeding a second resistance threshold, the second resistance threshold greater than the first resistance threshold, disabling the mattress climate-control system.

7. The bed system of claim 6, wherein the second resistance threshold represents that the mechanical thermal detector is open-circuited indicating the mechanical thermal detector has been disconnected from the thermal event protection assembly.

8. The bed system of claim 6, wherein the second resistance threshold is greater than the first resistance threshold, operating the mattress climate-control system comprises, based on the resistance exceeding the first resistance threshold and being less than the second resistance threshold, enabling operation of the mattress climate-control system.

9. The bed system of claim 1, wherein the thermal event protection assembly further comprises a smoke detector positioned at the mattress, the smoke detector configured to:

detect a smoke condition at the mattress; and transmit a signal representing the smoke condition to the controller; and the controller is further configured to perform operations comprising:

based on the smoke condition indicating no smoke, enabling operation of the mattress climate-control system by a user;

based on the smoke condition indicating a presence of smoke, disabling operation of the mattress climate-control system; and based on the smoke condition indicating the smoke detector is not operating, disabling operation of the mattress climate-control system.

* * * * *